(12) United States Patent
Kanai

(10) Patent No.: US 8,109,663 B2
(45) Date of Patent: Feb. 7, 2012

(54) VEHICULAR LAMP

(75) Inventor: Norifumi Kanai, Osaka (JP)

(73) Assignee: Nalux Co., Ltd., Osaka (JP)

( * ) Notice: Subject to any disclaimer, the term of this patent is extended or adjusted under 35 U.S.C. 154(b) by 471 days.

(21) Appl. No.: 12/379,674

(22) Filed: Feb. 26, 2009

(65) Prior Publication Data
US 2009/0310377 A1 Dec. 17, 2009

Related U.S. Application Data

(63) Continuation-in-part of application No. PCT/JP2008/065586, filed on Aug. 29, 2008.

(30) Foreign Application Priority Data

Aug. 30, 2007 (JP) .................... PCT/JP2007/066931

(51) Int. Cl.
*B60Q 1/04* (2006.01)
(52) U.S. Cl. ........................................ 362/539; 362/538
(58) Field of Classification Search .................. 362/538, 362/539
See application file for complete search history.

(56) References Cited

U.S. PATENT DOCUMENTS

| | | |
|---|---|---|
| 4,562,519 A | 12/1985 | Deves |
| 7,387,413 B2 * | 6/2008 | Brinkmann et al. .......... 362/539 |
| 2005/0052742 A1 | 3/2005 | Brinkmann et al. |
| 2005/0254254 A1 | 11/2005 | Moseler et al. |

FOREIGN PATENT DOCUMENTS

| | | |
|---|---|---|
| JP | 60-062001 | 4/1985 |
| JP | 1-113903 | 7/1989 |
| JP | 03-122902 | 5/1991 |
| JP | 2003-123509 | 4/2003 |
| JP | 2005-44804 | 2/2005 |
| JP | 2005-302718 | 10/2005 |
| WO | WO 2006/088184 | 8/2006 |

* cited by examiner

*Primary Examiner* — David V Bruce
(74) *Attorney, Agent, or Firm* — Squire, Sanders & Dempsey (US) LLP

(57) ABSTRACT

A vehicular lamp includes a light source, a reflector, a shade, and the projector lens. Light emitted from the light source is reflected by the reflector, and the light is partially blocked by the shade. Light which is not blocked is transmitted through the projector lens, and an object ahead of a vehicle is irradiated with the light. A diffraction grating is provided in a region including an end portion of a light passing region of at least one surface in the projector lens in order to reduce color separation.

20 Claims, 70 Drawing Sheets

FIG. 1
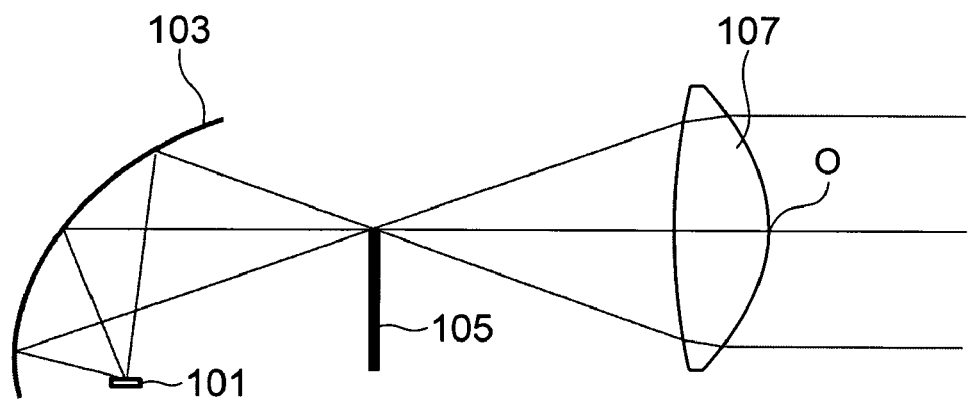
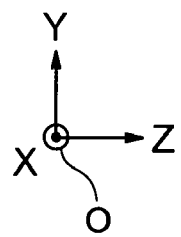

INTENSITY DISTRIBUTION PATTERN

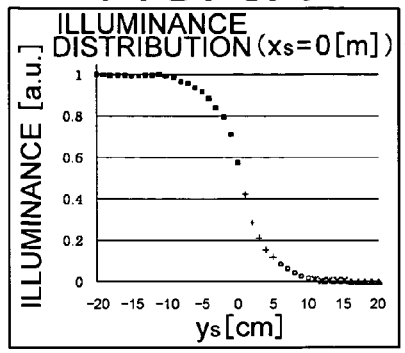
FIG. 3A
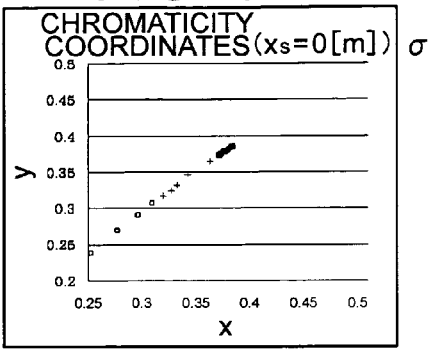
FIG. 3E  $\sigma^2$=2.66E-04
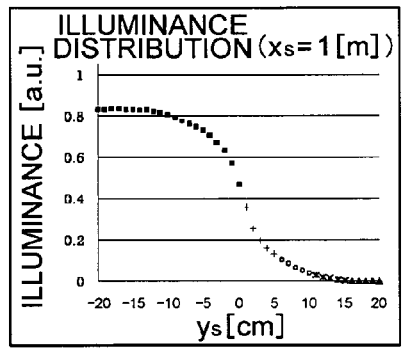
FIG. 3B
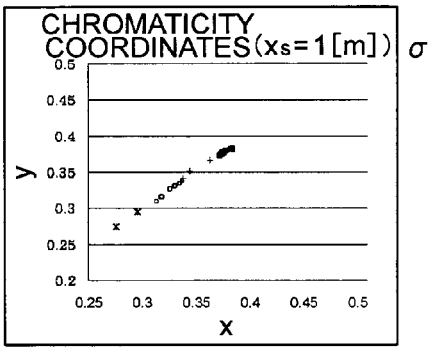
FIG. 3F  $\sigma^2$=1.81E-04
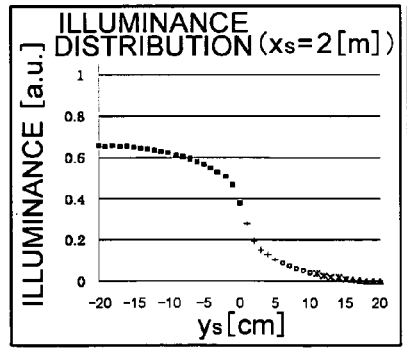
FIG. 3C
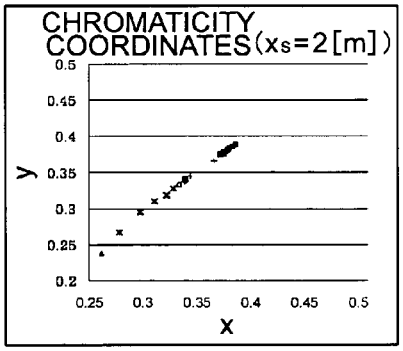
FIG. 3G  $\sigma^2$=1.33E-04
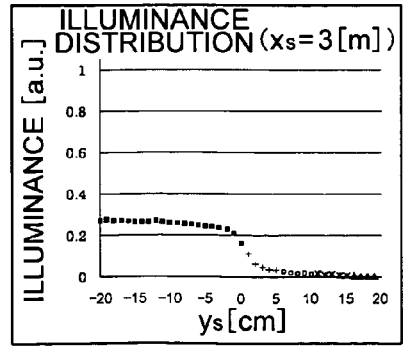
FIG. 3D
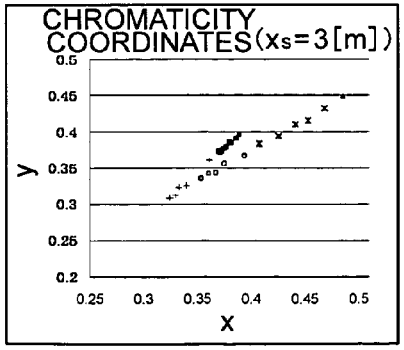
FIG. 3H  $\sigma^2$=5.59E-05

$\sigma^2 = 2.66\text{E-}05$ $\sigma^2 = 2.03\text{E-}05$ $\sigma^2 = 1.64\text{E-}05$ $\sigma^2 = 6.33\text{E-}06$ $\sigma^2$ =3.20E-05

$\sigma^2$ =2.45E-05

$\sigma^2$ =1.71E-05

$\sigma^2$ =5.99E-05

VEHICULAR LAMP

BACKGROUND OF THE INVENTION

1. Field of the Invention

The present invention relates to a vehicular lamp.

2. Background Art

An HID lamp (High Intensity Discharge lamp), a halogen lamp, an LED (Light Emitting Diode), and the like are used as a light source of the vehicular lamp (such as a headlamp). In an optical system of a projection-type vehicular lamp, light emitted from the light source is reflected by a reflector, the light passes through a shade so as to form a cut-off line, and an object ahead a vehicle is irradiated with the light transmitted through a projector lens. In any light source, the light transmitted through the projector lens generates color separation derived from color aberration of the projector lens near an edge of a light distribution pattern. This is a common problem irrespective of a type of the light source.

A white LED that is of the light source has a strong spectrum in a specific wavelength region like an LED (a blue LED and a yellow fluorescent material are used) having a strong spectral distribution in blue and yellow and an LED (an ultraviolet LED and blue, green, and red fluorescent materials are used, or the blue LED and the red and green fluorescent materials are used) having the strong spectral distribution in blue, green, and red. Accordingly, the color separation is prominently and easily exerted when the white LED is used as the light source of the vehicular lamp.

Regardless of whether the light source has the strong spectral distribution in the specific wavelength region, unfortunately the color separation is generated in a direction in which the red is further strengthened in the light source whose correlated color temperature is low (reddish), or the color separation is generated in a direction in which the blue is further strengthened in the light source whose correlated color temperature is high (bluish).

In order to improve the problem with the color separation, for example, there is proposed a method for texturing a lens surface (see Japanese Patent Application Laid-Open (JP-A) No. 8-17045). In the method disclosed in JP-A No. 8-17045, because a luminous intensity pattern is smudged by utilizing a light scattering effect of the texturing performed to the whole of the lens surface, unfortunately deterioration of transmittance cannot be avoided and a lens characteristic is easily fluctuated according to a feature of the texturing.

SUMMARY OF THE INVENTION

Accordingly, there is a need for the vehicular lamp, in which the decrease in transmittance of the projector lens and the decrease in light quantity due to the decrease in transmittance are suppressed to the minimum and the color separation is reduced without losing the optical characteristic in consideration of the characteristic of the light source.

In accordance with a first aspect of the invention, a vehicular lamp includes a light source, a reflector, a shade, and a projector lens, wherein light emitted from the light source is reflected by the reflector, the light is partially blocked by the shade, the light not blocked is transmitted through the projector lens, and an object ahead a vehicle is irradiated with the light, a diffraction grating is provided in a region including an end portion of a light passing region of at least one surface in the projector lens in order to reduce color separation, and magnitude of $f_D/f$/Abbe and a position of the shade on an optical axis are determined according to a correlated color temperature of the light source so as to reduce the color separation caused by a characteristic of the light source, where f is a focal distance of the projector lens, the focal distance of the projector lens being determined by a marginal ray passing through the end portion, $f_D$ is a focal distance caused by a grating pitch of a diffraction surface, the focal distance caused by the grating pitch being determined by the marginal ray passing through the end portion, and Abbe is an Abbe number.

In the vehicular lamp according to the first aspect of the invention, the magnitude of $f_D/f$/Abbe and the position of the shade on the optical axis are determined according to the correlated color temperature of the light source so as to reduce the color separation in consideration of the characteristic of the light source. Therefore, residual color separation can be controlled in the center direction of the normalized region on the chromaticity coordinate plane, and the degree of color separation can securely be reduced. At this point, the residual color separation shall mean color separation that cannot be removed by the diffraction grating.

In accordance with a second aspect of the invention, a vehicular lamp includes a light source having a substantial surface shape and a projector lens, wherein light emitted from the light source is transmitted through the projector lens, and an object ahead a vehicle is irradiated with the light, a diffraction grating is provided in a region including an end portion of a light passing region of at least one surface in the projector lens in order to reduce color separation, and magnitude of $f_D/f$/Abbe and a position of a surface of the light source on an optical axis are determined according to a correlated color temperature of the light source so as to reduce the color separation caused by a characteristic of the light source, where f is a focal distance of the projector lens, the focal distance of the projector lens being determined by a marginal ray passing through the end portion, $f_D$ is a focal distance caused by a grating pitch of a diffraction surface, the focal distance caused by the grating pitch being determined by the marginal ray passing through the end portion, and Abbe is an Abbe number.

In the vehicular lamp according to the second aspect of the invention, the magnitude of $f_D/f$/Abbe and the position of the surface of the light source on the optical axis are determined according to the correlated color temperature of the light source so as to reduce the color separation in consideration of the characteristic of the light source. Therefore, the residual color separation can be controlled in the center direction of the normalized region on the chromaticity coordinate plane, and the degree of color separation can securely be reduced. Further, in the vehicular lamp according to the second aspect of the invention, the reflector and the shade are not required, so that the compact vehicular lamp can be formed.

BRIEF DESCRIPTION OF THE DRAWINGS

FIG. 1 illustrates an example of a configuration of a projection-type vehicular lamp;

FIGS. 3A to 3H illustrate light intensity distributions on the luminous intensity plane and light distributions on the chromaticity coordinate plane;

DETAILED DESCRIPTION OF THE INVENTION

Figure 2:
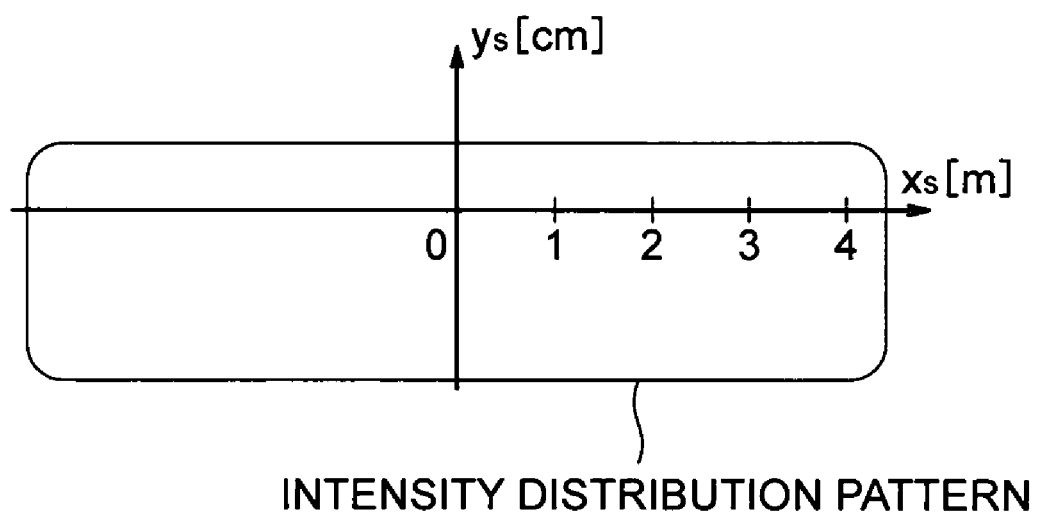
FIG. 2 illustrates a coordinate system of a luminous intensity plane.

FIG. 1 illustrates an example of a configuration of a projection-type vehicular lamp.

The light emitted from a light source 101 is reflected by a reflector 103, and the light is partially blocked by a shade 105. Then the light is collimated by a projector lens 107, and an object ahead is irradiated with the light. The shade 105 is used to form a cut-off line. The cut-off line means a boundary line between a light portion and a dark portion on a luminous intensity plane.

At this point, a coordinate system is defined such that an optical axis of the projector lens 107 is set to a Z-axis, such that a direction that is perpendicular to and level to the Z-axis is set to an X-axis, and such that a vertical direction is set to a Y-axis. An origin O is set to an intersection point of the Z-axis and an outgoing surface of the projector lens 107. The reflector 103, the shade 105, and the projector lens 107 are disposed along the Z-axis. The shade 105 is disposed in a region, where Y is equal to or lower than a predetermined value, such that an end portion is located near Y=0.

A front face (reflector side) of the shade 105 has an aspherical cylinder shape in which a curvature is located in an X-axis direction. This is because an off-axis ray passing through the neighborhood of Y=0 at a shade position is collimated in a Y-direction to form the horizontal, straight cut-off line after passing through the projector lens.

A sag of the lens and a phase difference function $\Phi$ of a diffraction grating are given as follows:

$$sag = \frac{cr^2}{1 + \sqrt{1 - (1+k)c^2r^2}} + \sum_i \alpha_{2i} r^{2i} \quad (1)$$

$$\Phi = M \sum_i \beta_{2i} r^{2i} \quad (2)$$

where c is a curvature and c=1/R (R is a curvature radius), k is an elliptical coefficient, $\alpha_{2i}$ is an aspherical coefficient, $\beta_{2i}$ is a phase difference function coefficient, and r is a radial distance from a lens center.

The lens data is as follows. In the lens data, a unit of length is millimeter. PMMA of a material indicates a methyl methacrylate resin.

TABLE 1

| SHADE FRONT FACE/PROJECTOR LENS TOP | 33.25 |
|---|---|
| PROJECTOR LENS MATERIAL | PMMA |
| PROJECTOR LENS CENTER THICKNESS | 13.00 |
| PROJECTOR LENS EFFECTIVE DIAMETER | Φ 40.00 |

| SHADE FRONT FACE | | | | | |
|---|---|---|---|---|---|
| sag | | | | | |
| R = 1/c | k | $\alpha_4$ | $\alpha_6$ | $\alpha_8$ | $\alpha_{10}$ |
| 37.000 | 0.000 | 2.480E−05 | 1.825E−08 | −3.221E−11 | −2.260E−13 |

TABLE 1-continued

PROJECTOR LENS INCIDENT SURFACE (WHOLE SPHERICAL SURFACE)

| R = 1/c | k |
|---------|---|
| 85.000  | 0.000 |

PROJECTOR LENS OUTGOING SURFACE (WHOLE ASPHERICAL PORTION)

| | | | Sag | | |
|---|---|---|---|---|---|
| R = 1/c | k | $\alpha_4$ | $\alpha_6$ | $\alpha_8$ | $\alpha_{10}$ |
| −24.487 | −0.435 | 4.153E−06 | 5.154E−09 | 4.269E−12 | −3.420E−16 |

In order to evaluate color separation of the vehicular lamp, the luminous intensity plane perpendicular to the Z-axis is provided at a position of Z=10 m.

FIG. 2 illustrates a coordinate system of the luminous intensity plane. In the coordinate system of FIG. 2, an intersection point of the luminous intensity plane and the Z-axis is set to an origin, a direction parallel to the X-axis on the luminous intensity plane is set to an $x_s$-axis, a direction parallel to the Y-axis on the luminous intensity plane is set to a $y_s$-axis. FIG. 2 also illustrates a light distribution pattern on the luminous intensity plane.

FIGS. 3A to 3D illustrate a light intensity distributions on the luminous intensity plane, which are obtained by simulations using geometric ray tracing. Points in FIGS. 3A to 3D are expressed by different markers in each of ranges (−20 to 0), (1 to 5), (6 to 10), (11 to 15), and (16 to 20) of $y_s$. FIGS. 3E to 3H correspond respectively to FIGS. 3A to 3D, and FIGS. 3E to 3H illustrate light distributions on the chromaticity coordinate plane of the points shown in FIGS. 3A to 3D, which are obtained by simulations. The chromaticity coordinate system is one of color specification methods defined by an international commission on illumination (CIE). A degree of the color separation is increased with increasing a variation on the chromaticity coordinate plane. A chromaticity dispersion degree defined by the following equation is also illustrated on the right of FIGS. 3E to 3H. The chromaticity dispersion degrees are computed according to the following equation from values illustrated in FIGS. 3A and 3E, FIGS. 3B and 3F, FIGS. 3C and 3G, and FIGS. 3D and 3H.

The chromaticity dispersion degree is used to evaluate a difference between a color of the light source and a color near an edge of a light distribution pattern, and the chromaticity dispersion degree is defined as follows:

$$\sigma^2 = \frac{1}{n}\sum_{sy} I_{relative}(x_s, y_s) D^2_{relative}(x_s, y_s) \quad (3)$$

At this point, $$I_{relative}(x_s, y_s) \quad (4)$$

is a ratio of an intensity at luminous intensity plane coordinates $(x_s, y_s)$ to the maximum intensity of the light distribution pattern, and the intensity ratio $I_{relative}(x_s, y_s)$ ranges from 0 to 1.

$$D_{relative}(x_s, y_s) \quad (5)$$

is a distance between the chromaticity coordinates of the light source and the chromaticity coordinates of the point at the luminous intensity plane coordinates $(x_s, y_s)$, and n is the number of evaluated points. A degree of chromatic dispersion (color separation) in which intensity is considered is decreased with decreasing a value of $\sigma^2$.

Referring to FIGS. 3E to 3H, a deviation of the chromaticity coordinates of the light source is increased in the region of $y_s \geq 0$. This means that the color separation is generated in the region of $y_s \geq 0$. On the other hand, the color separation that becomes troublesome is not generated in a region of $y_s < 0$. Accordingly, in order to deal with the color separation, only the region of $y_s \geq 0$ may be considered. Referring to FIG. 1, on the luminous intensity plane, the region corresponding to $y_s \geq 0$ is a region of $Y \geq 0$ of the projector lens 107.

Figure 4:
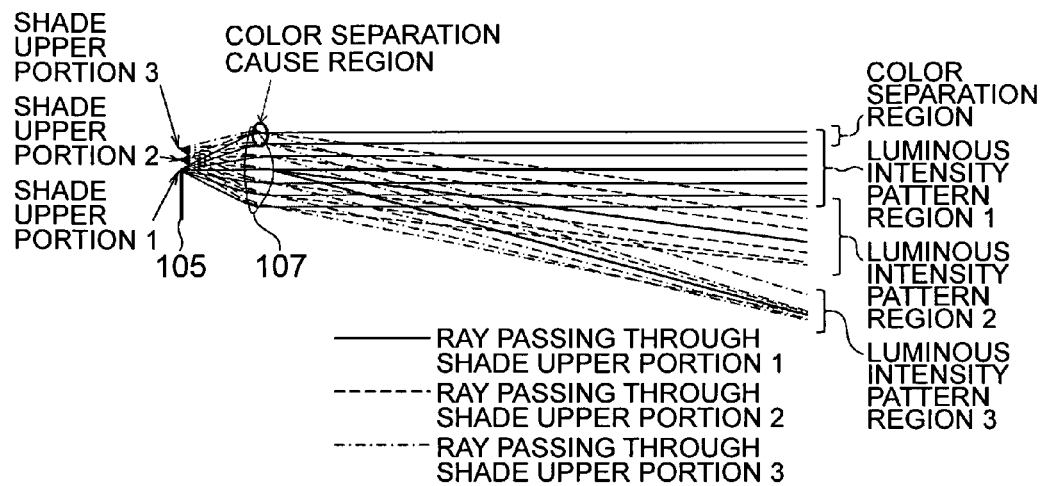
FIG. 4 is a side view illustrating a shade and a projector lens.

FIG. 4 is a side view illustrating the shade 105 and the projector lens 107.

Figure 5:
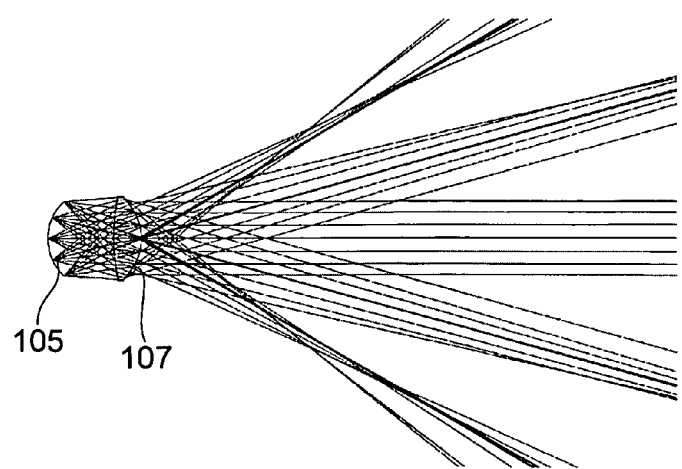
FIG. 5 is a top view illustrating the shade and the projector lens.

FIG. 5 is a top view illustrating the shade 105 and the projector lens 107.

As illustrated in FIG. 4, an upper portion (luminous intensity pattern region 1) of a luminous intensity pattern is irradiated with a ray passing immediately above the shade (shade upper region 1), a luminous intensity pattern region 2 located below the luminous intensity pattern region 1 is irradiated with a ray passing through a shade upper region 2 located above the shade upper region 1, and a luminous intensity pattern region 3 located below the luminous intensity pattern region 2 is irradiated with a ray passing through a shade upper region 3 located above the shade upper region 2.

Actually, in rays passing through the neighborhood of the shade upper region 1, the ray passing through the region of $Y \geq 0$ of the projector lens 107 mainly causes the color separation. Therefore, the region through which the ray mainly causing the color separation passes is referred to as color separation cause region (FIG. 4). The color separation cause region includes an end portion of a light passing region of the projector lens 107. The color separation that is caused by the lens in the light passing through the shade upper region 2 and the shade upper region 3 does not become troublesome, because the color separation is evenly relieved to obtain a color close to that of the light source by the light passing below the shade upper region 2 and the shade upper region 3.

Therefore, in a predetermined surface of the projector lens 107, the color separation may be dealt with in a region of $Y \geq Y_0$ including the separation cause region. $Y_0$ is a predetermined constant, and a method for determining $Y_0$ is described later. In order to deal with the color separation, a color separation reducing diffraction grating is provided in the region in the predetermined surface of the projector lens 107.

Figure 6:
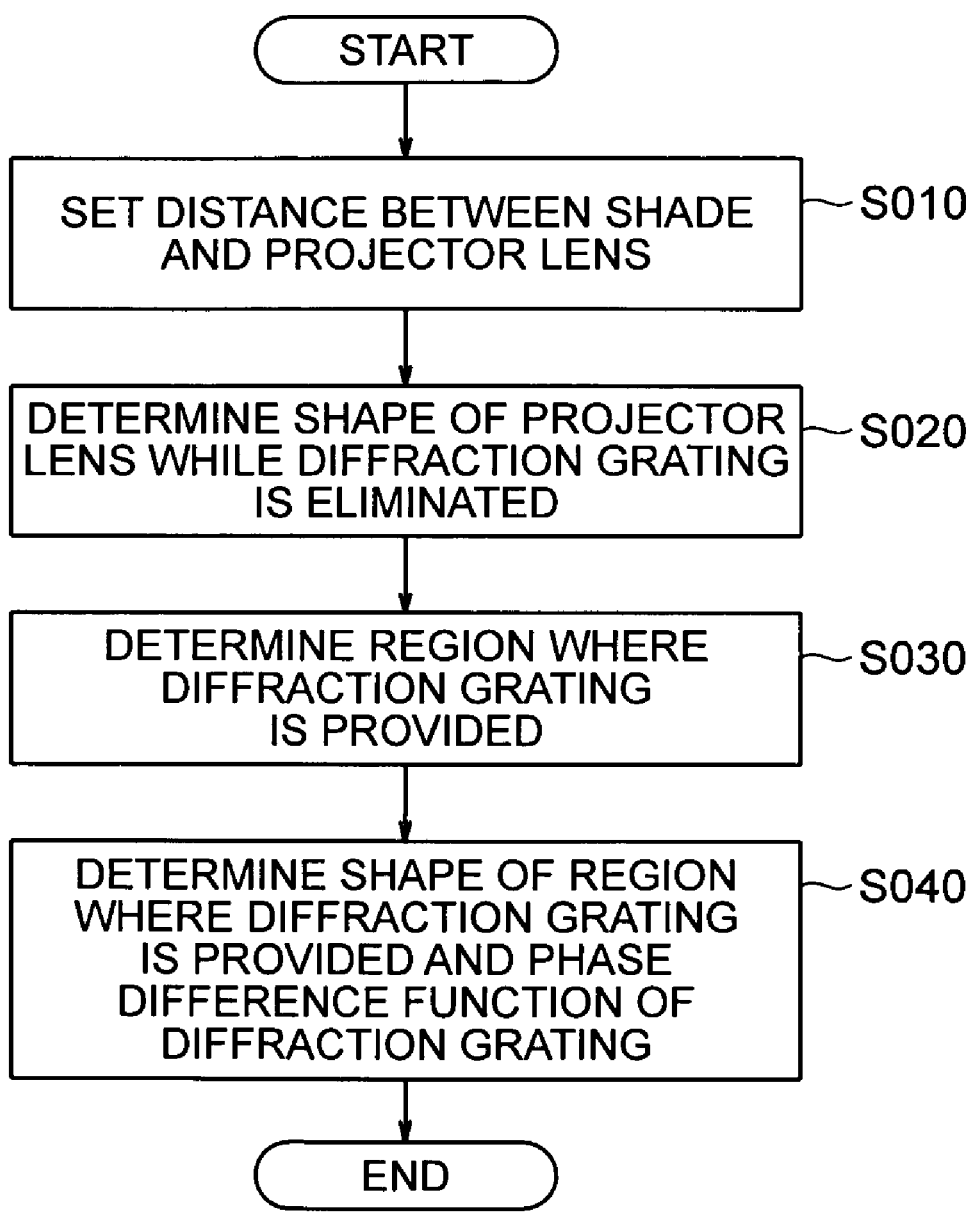
FIG. 6 is a flowchart illustrating a procedure for designing an optical system including the projector lens.

FIG. 6 is a flowchart illustrating a procedure for designing an optical system including the projector lens.

Referring to FIG. 6, a distance between the shade 105 and the projector lens 107 is set in Step S010.

In Step S020, the shape of the surface of the projector lens 107 is determined without providing the diffraction grating.

In Step S030, the region where the diffraction grating is provided is determined in the surface of the projector lens 107. At this point, the diffraction grating is provided in the region of $Y \geq Y_0$ in the outgoing surface (aspherical surface) of the projector lens 107.

The method for determining $Y_0$ will be described below.

Because the light reaching the region ($y_s \geq 0$) where the color separation is generated in the luminous intensity plane is only the light passing through the region of $Y \geq 0$ of the lens, it is not necessary to provide the diffraction grating in the region of $Y < 0$. Accordingly, the value of $Y_0$ is equal to or more than zero. The value of $Y_0$ is lower than an effective radius of the projector lens 107.

The color separation reducing effect is decreased when the value of $Y_0$ is brought close to the value of the effective radius of the projector lens 107 from zero, and the region where the diffraction grating is provided is eliminated when the value of $Y_0$ is set to the value of the effective radius of the projector lens 107. Therefore, the color separation reducing effect is eliminated. On the other hand, because transmittance is lowered in the region where the diffraction grating of the projector lens 107 is provided as described later, desirably the region where the diffraction grating is provided is minimized as much as possible in order to prevent lowering of a light quantity of the vehicular lamp. Therefore, the value of $Y_0$ is determined such that the color separation reducing effect is sufficiently obtained in a range, in which the value of $Y_0$ is equal to or more than zero and the value of $Y_0$ is smaller than the effective radius of the projector lens 107. As described later with reference to FIGS. 8 and 10, the color separation reducing effect may be evaluated by a simulation to determine the value of $Y_0$.

In Step S040 of FIG. 6, the shape of the surface of the region where the diffraction grating of the projector lens 107 is provided and the phase difference function of the diffraction grating are determined. The diffraction grating is designed as follows. A base (aspherical) shape and the phase difference function of the diffraction grating are simultaneously determined such that color aberration generated by a dispersion characteristic possessed by a normal lens material is cancelled by an inverse dispersion characteristic of the diffraction grating. In which color direction a hue is brought from the light source color is determined by the base (aspherical) shape and the phase difference function of the diffraction grating.

A metallic mold is produced, and the projector lens that is designed by the above-described method may be produced with the metallic mold by injection molding.

Figure 7:
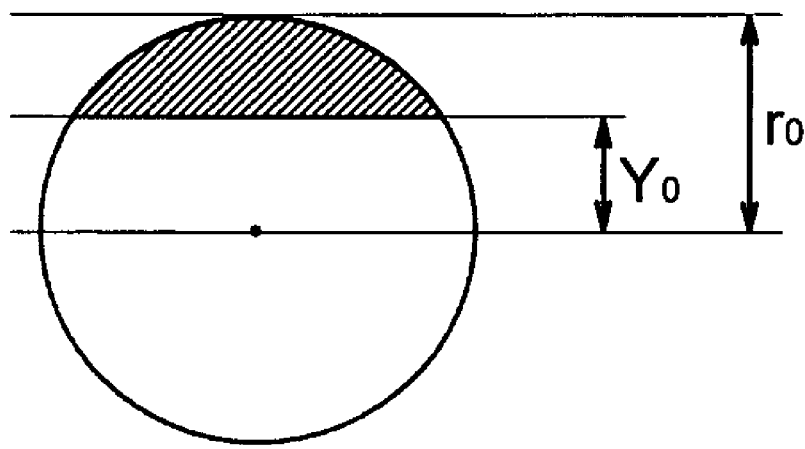
FIG. 7 illustrates a surface in which a grating of the projector lens according to an embodiment is provided.
Figure 8A:
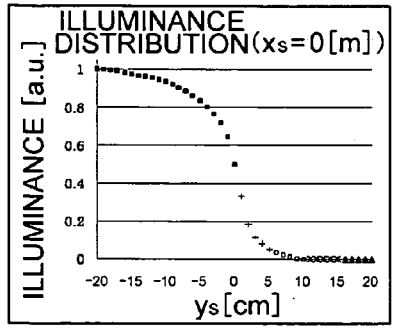
FIGS. 8A to 8H illustrate light intensity distributions on the luminous intensity plane and light distributions on the chromaticity coordinate plane when the projector lens of FIG. 7 is used.
Figure 8E:
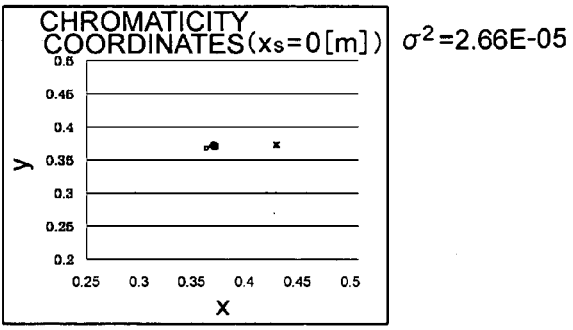
Figure 8B:
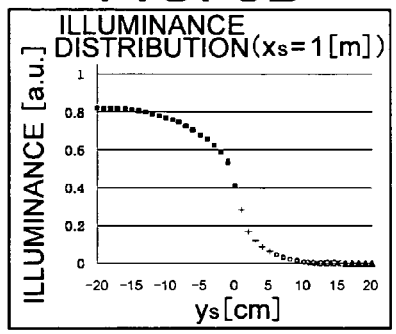
Figure 8F:
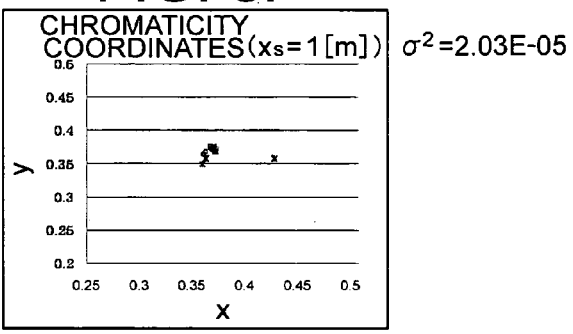
Figure 8C:
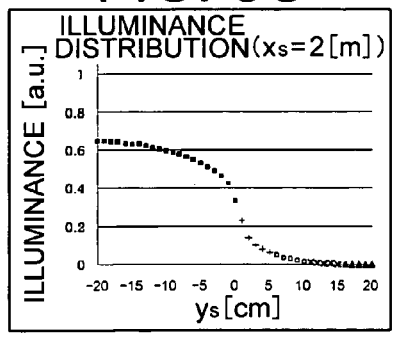
Figure 8G:
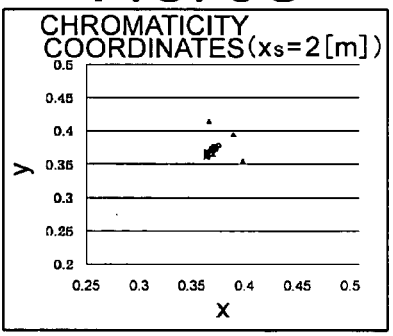
Figure 8D:
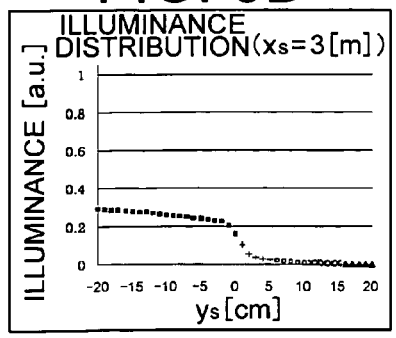
Figure 8H:
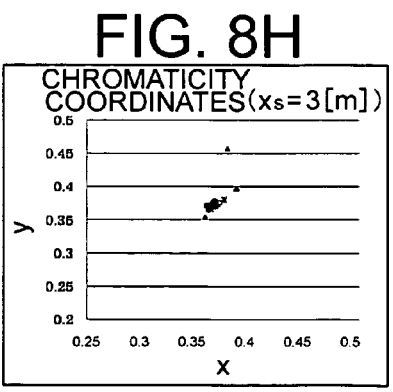

FIG. 7 illustrates a surface in which the grating of the projector lens according to the embodiment is provided. In FIG. 7, diagonal lines indicate the region where the grating is provided. $Y_0$ is a half of the effective radius $r_0$ of the projector lens. Specifically, the effective radius $r_0$ of the projector lens is 20 millimeters, and $Y_0$ is 10 millimeters.

A front face shape of the shade 105 is an aspherical cylinder shape in which a curvature exists in an X-axis direction. The incident surface of the projector lens 107 is an overall spherical surface, and the outgoing surface is an overall aspherical surface. The lens data is as follows

TABLE 2

| SHADE FRONT FACE/PROJECTOR LENS TOP | 32.5 |
|---|---|
| PROJECTOR LENS MATERIAL | PMMA |
| PROJECTOR LENS CENTER THICKNESS | 13.00 |
| PROJECTOR LENS EFFECTIVE DIAMETER | Φ 40.00 |

| SHADE FRONT FACE |
|---|

| sag |
|---|

| $R = 1/c$ | k | $\alpha_4$ | $\alpha_6$ | $\alpha_8$ | $\alpha_{10}$ |
|---|---|---|---|---|---|
| 37.000 | 0.000 | 2.480E−05 | 1.825E−08 | −3.221E−11 | −2.260E−13 |

| PROJECTOR LENS INCIDENT SURFACE (SPHERICAL SURFACE) |
|---|

| $R = 1/c$ | k |
|---|---|
| 85.000 | 0.000 |

| PROJECTOR LENS OUTGOING SURFACE (PORTION IN WHICH DIFFRACTION GRATING IS ELIMINATED: y < 1) |
|---|

| sag |
|---|

| $R = 1/c$ | k | $\alpha_4$ | $\alpha_6$ | $\alpha_8$ | $\alpha_{10}$ |
|---|---|---|---|---|---|
| −24.487 | −0.435 | 4.153E−06 | 5.154E−09 | 4.269E−12 | −3.420E−16 |

| PROJECTOR LENS OUTGOING SURFACE (DIFFRACTION GRATING PORTION: Y ≥ 10) |
|---|

| sag |
|---|

| $R = 1/c$ | k | $\alpha_4$ | $\alpha_6$ | $\alpha_8$ | $\alpha_{10}$ |
|---|---|---|---|---|---|
| −26.831 | −0.492 | 3.381E−06 | 4.166E−09 | 2.085E−12 | −1.182E−15 |

| DIFFRACTION ORDER | PHASE DIFFERENCE FUNCTION | | | |
|---|---|---|---|---|
| M | $\beta_2$ | $\beta_4$ | $\beta_6$ | $\beta_8$ |
| 1 | −7.648E+00 | −1.532E−03 | −1.031E−06 | 3.101E−09 |

FIGS. 8A to 8D illustrate light intensity distributions on the luminous intensity plane, which are obtained by simulations using the geometric ray tracing, when the projector lens of FIG. 7 is used. Points in FIGS. 8A to 8D are indicated by different markers in each of ranges (−20 to 0), (1 to 5), (6 to 10), (11 to 15), and (16 to 20) $y_s$.

FIGS. 8E to 8H correspond respectively to FIGS. 8A to 8D, and FIGS. 8E to 8H illustrate a distribution of the chromaticity coordinates of the points shown in FIGS. 8A to 8D, which are obtained by simulations. The chromaticity dispersion degrees defined by the following equation are also illustrated on the right of FIGS. 8E to 8H.

In FIGS. 8E to 8H, variations on the chromaticity coordinate plane are largely reduced compared with those shown in FIGS. 3E to 3H. The chromaticity dispersion degrees shown in FIGS. 8E to 8H are reduced to a fraction of the chromaticity dispersion degrees shown in FIGS. 3E to 3H.

Figure 9:
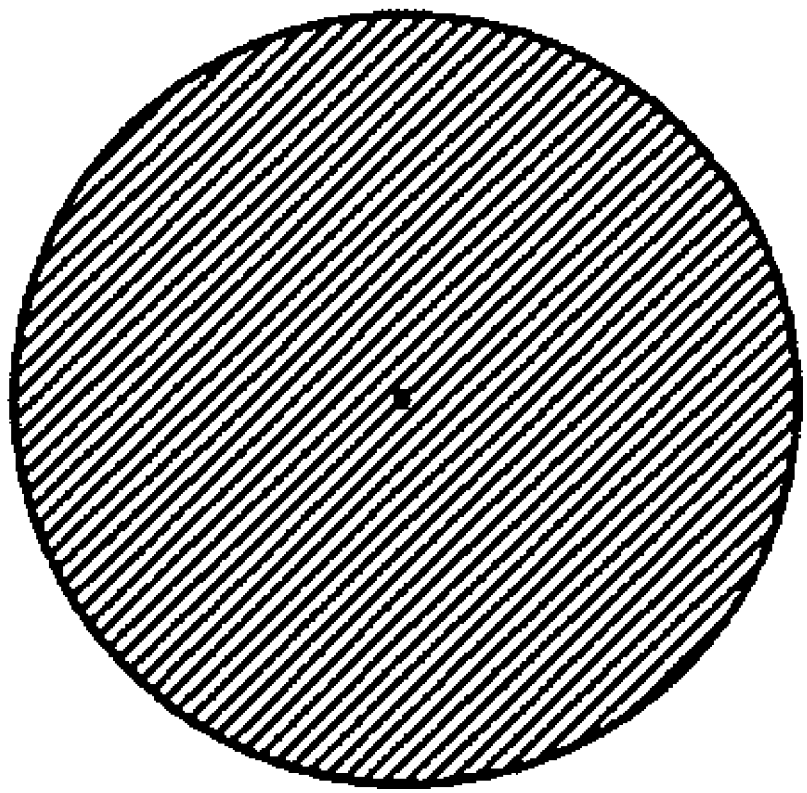
FIG. 9 illustrates a surface of a projector lens according to a comparative example in which a diffraction grating is provided in a whole surface.
Figure 10A:
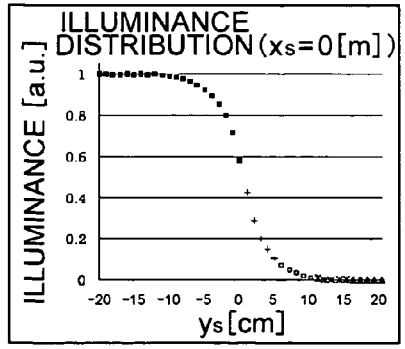
FIGS. 10A to 10H illustrate light intensity distributions on the luminous intensity plane and light distributions on the chromaticity coordinate plane when the projector lens of FIG. 9 is used.
Figure 10E:
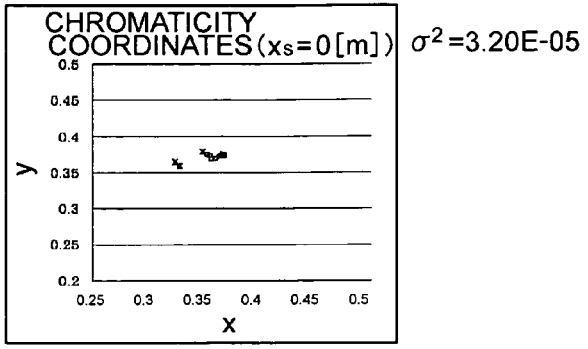
Figure 10B:
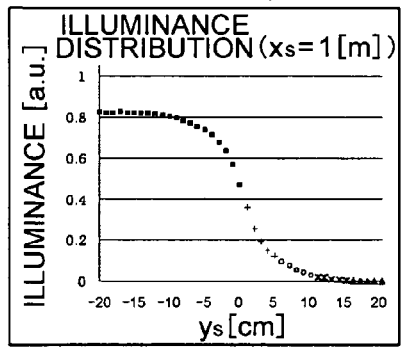
Figure 10F:
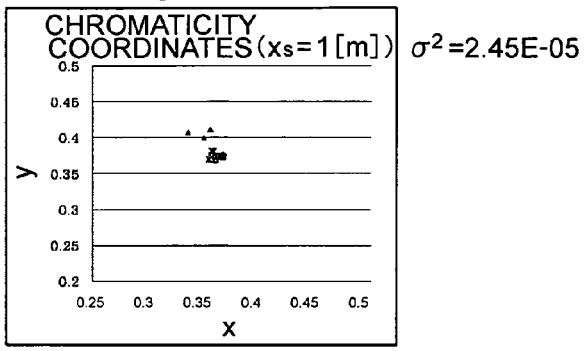
Figure 10C:
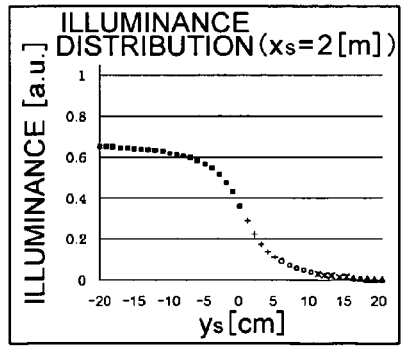
Figure 10G:
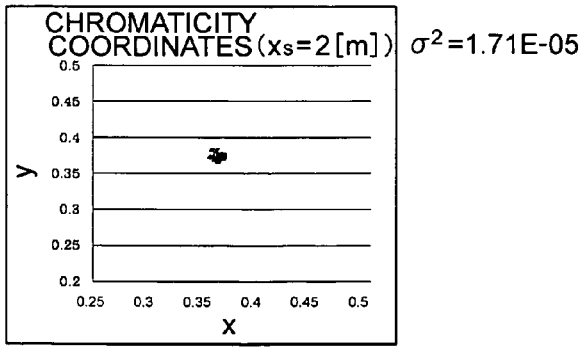
Figure 10D:
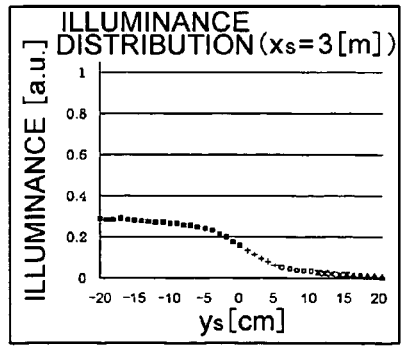
Figure 10H:
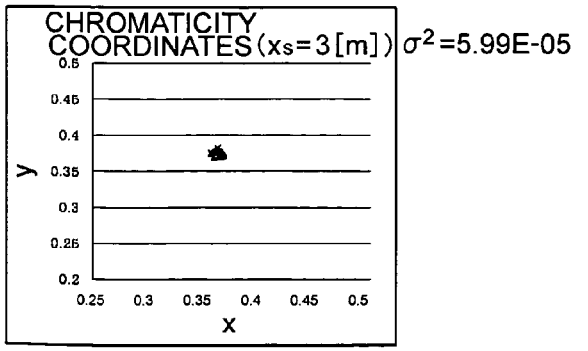

FIG. 9 illustrates a surface of a projector lens according to a comparative example in which the diffraction grating is provided in a whole surface.

The front face shape of the shade 105 is an aspherical cylinder shape in which the curvature exists in the X-axis direction. The incident surface of the projector lens 107 is the overall spherical surface, and the outgoing surface is the overall aspherical surface. The lens data is as follows:

TABLE 3

| SHADE FRONT FACE/PROJECTOR LENS TOP | 33.5 |
| --- | --- |
| PROJECTOR LENS MATERIAL | PMMA |
| PROJECTOR LENS CENTER THICKNESS | 15.00 |
| PROJECTOR LENS EFFECTIVE DIAMETER | Φ 40.00 |

SHADE FRONT FACE sag

| R = 1/c | k | $\alpha_4$ | $\alpha_6$ | $\alpha_8$ | $\alpha_{10}$ |
| --- | --- | --- | --- | --- | --- |
| 37.000 | 0.000 | 2.480E−05 | 1.825E−08 | −3.221E−11 | −2.260E−13 |

PROJECTOR LENS INCIDENT SURFACE (WHOLE SPHERICAL SURFACE)

| R = 1/c | k |
| --- | --- |
| 85.000 | 0.000 |

PROJECTOR LENS OUTGOING SURFACE (WHOLE DIFFRACTION GRATING)

sag

| R = 1/c | k | $\alpha_4$ | $\alpha_6$ | $\alpha_8$ | $\alpha_{10}$ |
| --- | --- | --- | --- | --- | --- |
| −26.831 | −0.492 | 3.381E−06 | 4.136E−09 | 2.085E−12 | −1.182E−15 |

| DIFFRACTION ORDER | PHASE DIFFERENCE FUNCTION | | | |
| --- | --- | --- | --- | --- |
| M | $\beta_2$ | $\beta_4$ | $\beta_6$ | $\beta_8$ |
| 1 | −7.648E+00 | −1.532E−03 | −1.031E−06 | 3.101E−09 |

FIGS. 10A to 10D illustrate light intensity distributions on the luminous intensity plane, which are obtained by simulations using the geometric ray tracing, when the projector lens of FIG. 9 is used. Points in FIGS. 10A to 10D are indicated by different markers in each of ranges (−20 to 0), (1 to 5), (6 to 10), (11 to 15), and (16 to 20) $y_s$.

FIGS. 10E to 10H correspond respectively to FIGS. 10A to 10D, and FIGS. 10E to 10H illustrate distributions of the chromaticity coordinates of the points shown in FIGS. 10A to 10D, which are obtained by simulations. The chromaticity dispersion degrees defined by the following equation are also illustrated on the right of FIGS. 10E to 10H.

The variations on the chromaticity coordinate plane and the chromaticity dispersion degrees shown in FIGS. 10E to 10H are substantially equal to those shown in FIGS. 8E to 8H. That is, even if the diffraction grating is provided overall surface as illustrated in FIG. 9, the color separation reducing effect is substantially similar to that of the case in which the diffraction grating is provided in the region of $Y \geq Y_0$ as illustrated in FIG. 7. This is because the color aberration correction with the diffraction grating of the projector lens of FIG. 7 is enough to reduce the color separation.

In order to prevent the decrease in the light quantity of the vehicular lamp, desirably the region where the diffraction grating is provided is minimized as much as possible on the projector lens. Therefore, while the value of $Y_0$ is increased from zero, the simulation is performed to obtain the color separation reducing effect, and the maximum value at which the desired color separation reducing effect is achieved may be set at the value of $Y_0$.

Figure 11:
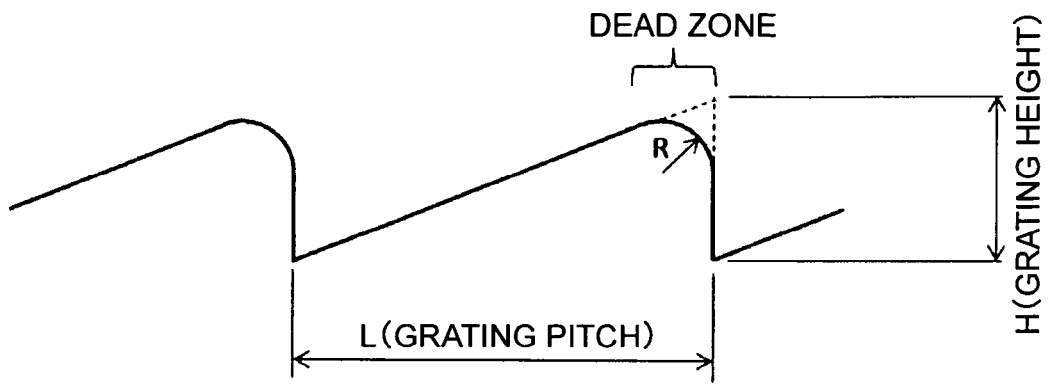
FIG. 11 illustrates an example of a diffraction grating shape.

FIG. 11 illustrates an example of the diffraction grating shape. As illustrated in FIG. 11, a dead zone is generated in the diffraction grating through a production process, and the dead zone is a region which deviates from a design shape.

Figure 12:
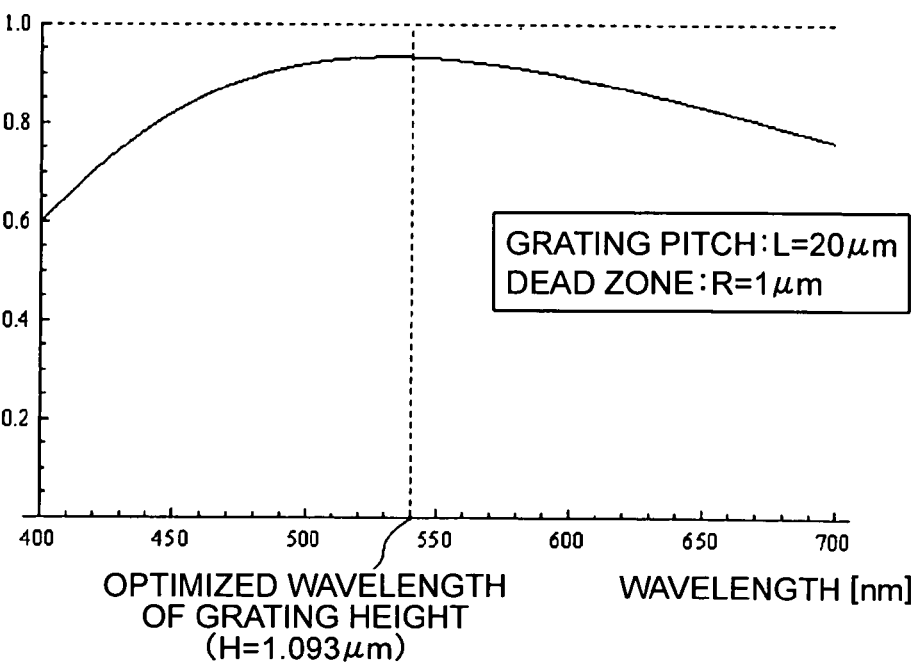
FIG. 12 illustrates an example of a relationship of a transmittance to a wavelength of the diffraction grating.

FIG. 12 illustrates an example of a relationship of a transmittance to a wavelength of the diffraction grating. The transmittance to the optimized wavelength (540 nm) is about 0.93, and the transmittance to the wavelength of 400 nm is 0.6.

Figure 13:
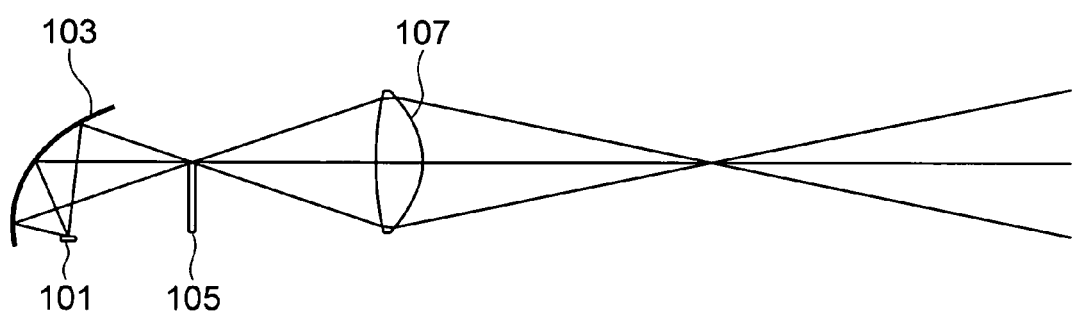
FIG. 13 illustrates another example of a configuration of a projection-type vehicular lamp.

FIG. 13 illustrates another example of a configuration of a projection-type vehicular lamp.

The light emitted from the light source 101 is reflected by the reflector 103, and the light is partially blocked by the shade 105. Then the light is collimated by the projector lens 107, and the object ahead is irradiated with the light. The shade 105 is used to form the cut-off line.

In the configuration of FIG. 13, the color separation cause region illustrated in FIG. 4 is the region including the end portion of Y<0 of the light passing region of the projector lens 107.

Accordingly, the diffraction grating is provided in the region of $Y \leq -Y_0$ in the outgoing surface (aspherical surface) of the projector lens 107.

The value of $Y_0$ is determined in the range from zero to the value of the effective radius in consideration of the color separation reducing effect and the transmittance.

The light having the wavelength whose focal distance becomes shorter is largely bent by the projector lens. Accordingly, as illustrated in FIG. 1, when the projector lens is used on the condition that the light is not collected, the light having the wavelength whose focal distance is shorter travels in parallel with an optical axis, and the light having the wavelength whose focal distance is longer travels in a direction in which the light is slightly moved away from the optical axis. Therefore, the light having the wavelength whose focal distance is longer reaches the neighborhood of the outermost portion of the spot at the position of the luminous intensity plane. On the other hand, as illustrated in FIG. 13, when the projector lens is used on the condition that the light is collected (condition that the light is collected once between the projector lens and the luminous intensity plane), the light having the wavelength whose focal distance is shorter reaches the luminous intensity plane while being collected with an angle larger than that of the light having the wavelength whose focal distance is longer. Therefore, the light having the wavelength whose focal distance is shorter reaches the neighborhood of the outermost portion of the spot at the position of the luminous intensity plane. The hue of the color separation can be changed near the spot edge of the luminous intensity plane by selecting the collection condition and the non-collection condition, so that the region where the hue can be controlled is extended. As a result, the control of the hue and the decrease in color separation can simultaneously be realized by combining the selection of the collection condition and the non-collection condition and the diffraction grating.

In the above description, the normal lens is used as the projector lens. Alternatively a Fresnel lens can be used as the projector lens.

Sometimes heat derived from the light source becomes troublesome in the vehicular lamp. In cases where the normal resin cannot be used, a heat-resistant resin such as a heat-resistant acryl can be used. Although the heat-resistant resin is inferior to the glass in a heat-resistant property, the heat-resistant resin can sufficiently withstand the heat of the vehicular lamp, and the heat-resistant resin is superior to the glass in moldability of the diffraction grating.

Other embodiments of the invention will be described below. The vehicular lamps of other embodiments are formed in consideration of a correlated color temperature of the light source. A correlated color temperature of an object is a temperature of a blackbody indicating color coordinates of blackbody radiation closest to the color coordinates of the object on a chromaticity diagram (uv-coordinate system) of CIE 1976 UCS.

f and $f_D$

It is assumed that f is a focal distance of the projector lens, $f_D$ is a focal distance of a diffraction surface included in the projector lens, and Abbe is an Abbe number. A method for determining f and $f_D$ will be described below.

Figure 14:
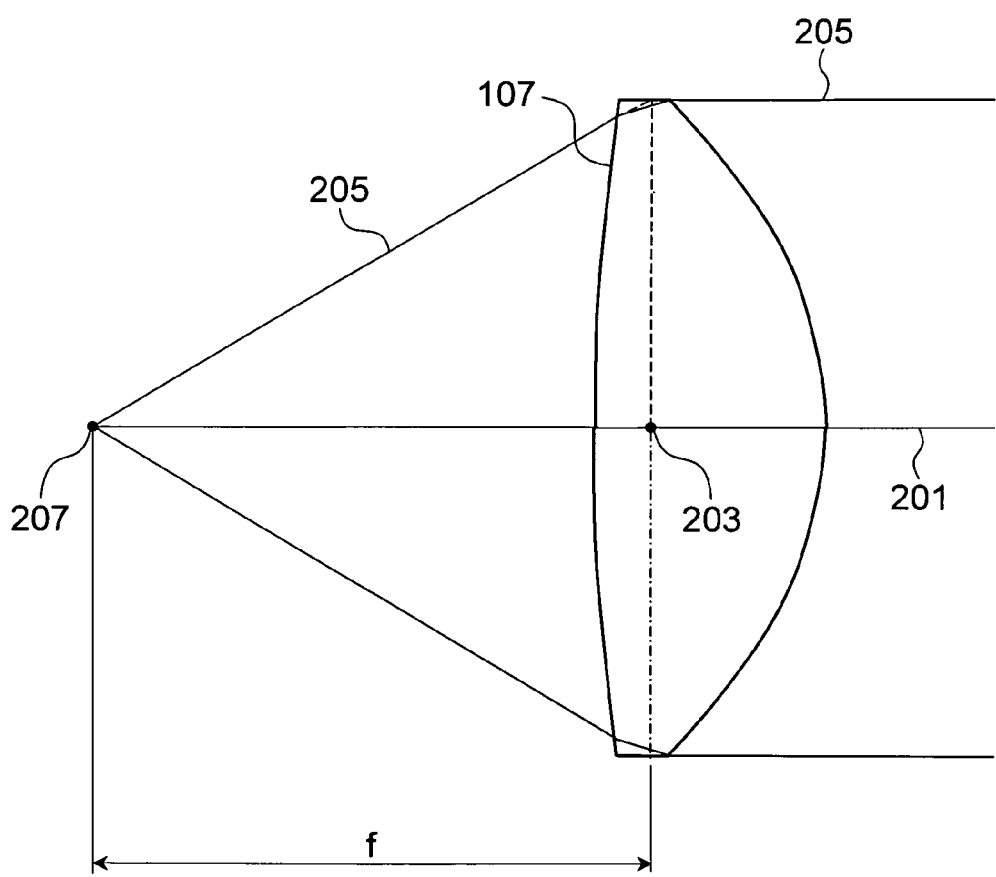
FIG. 14 is a view for explaining a method for determining a focal distance f.

FIG. 14 is a view for explaining a method for determining the focal distance f. The focal distance f of the projector lens 107 is a distance between a principal point 203 determined by tracing of a marginal ray 205 and a point 207 at which the marginal ray 205 intersects an optical axis 201. A parallel ray with a full effective diameter of the projector lens 107 is incident from the opposite side to the shade, and computation is performed on the condition that the parallel light is collected on the shade side. The ray tracing is performed to the light having the wavelength of 589.3 nm.

Figure 15:
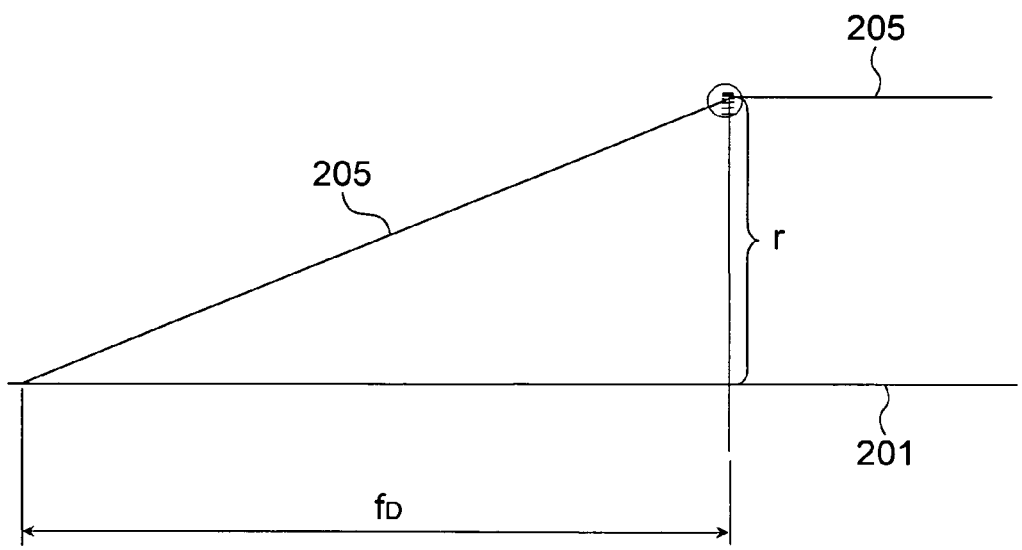
FIG. 15 is a view for explaining a method for determining a focal distance $f_D$.

FIG. 15 is a view for explaining a method for determining the focal distance $f_D$. The focal distance $f_D$ of the diffraction surface included in the projector lens is determined by a position on the diffraction surface through which the marginal ray 205 passes and a diffraction grating pitch at the position. Assuming that r is a distance between the optical axis and the point on the diffraction surface through which the marginal ray 205 passes, d is the grating pitch at the point on the diffraction surface through which the marginal ray 205 passes, m is a diffraction order, and λ is a wavelength of the light, the following equation is obtained:

$$f_D = r/\tan(\arcsin(m\lambda/d))$$

The ray tracing is performed to the light having the wavelength of 589.3 nm.

Embodiment A

Figure 16:
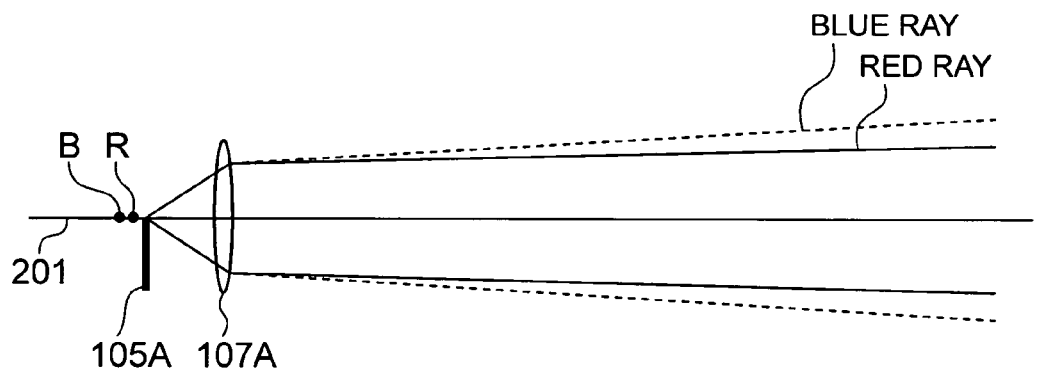
FIG. 16 illustrates a configuration of a vehicular lamp according to Embodiment A.

FIG. 16 illustrates a configuration of a vehicular lamp according to Embodiment A. In Embodiment A, the light passing through a projector lens 107A is not collected.

In Embodiment A, the correlated color temperature of the light source is lower than 3200 K Hereinafter the light source whose correlated color temperature is lower than 3200 K is referred to as low-temperature light source. In Embodiment A, the following expression holds:

$$f_D/f/\text{Abbe} < 0.29$$

That is, a focal position B to the blue light of the portion in which the diffraction surface of the projector lens 107A is provided is located on the light source side of a focal position R to the red light of the portion by relatively strengthening a power of the diffraction surface. A position of a shade 105A on the optical axis is located closer to the projector lens 107A than the focal position closest to the projector lens 107A in the focal positions to the light having the wavelength of 450 nm to 700 nm. In Embodiment A, a blue ray is generated in the circumferential portion of the light flux with which the object ahead is irradiated through the projector lens 107A. Although the low-temperature light source is reddish, the color separation toward the lower temperature side can be prevented by generating the blue ray in the circumferential portion.

Embodiment B

Figure 17:
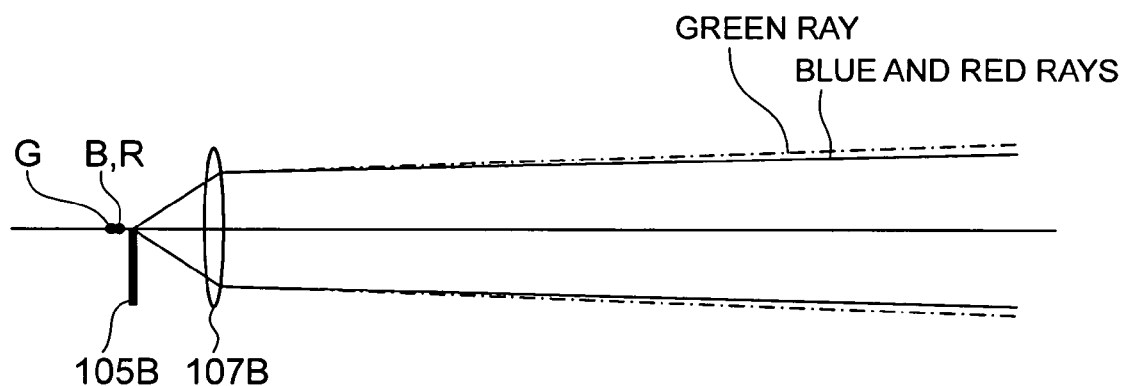
FIG. 17 illustrates a configuration of a vehicular lamp according to Embodiment B.

FIG. 17 illustrates a configuration of a vehicular lamp according to Embodiment B. In Embodiment B, the light passing through a projector lens 107B is not collected.

In Embodiment B, the correlated color temperature of the light source ranges from 3200 K to 6500 K. Hereinafter the light source whose correlated color temperature ranges from 3200 K to 6500 K is referred to as intermediate-temperature light source. In Embodiment B, the following expression holds:

$$0.28 < f_D/f/\text{Abbe} < 0.36$$

That is, the focal position B to the blue light of the portion in which the diffraction surface of the projector lens 107B is provided is substantially matched with the focal position R to the red light of the portion by adjusting the power of the diffraction surface. A position of a shade 105B on the optical axis is located closer to the projector lens 107B than the focal position closest to the projector lens 107B in the focal positions to the light having the wavelength of 450 nm to 700 nm. In Embodiment B, the intermediate-temperature light source is seemed to be substantially white, so that the color separation can be reduced by suppressing the color aberration of the projector lens 107B as much as possible.

Embodiment C

Figure 18:
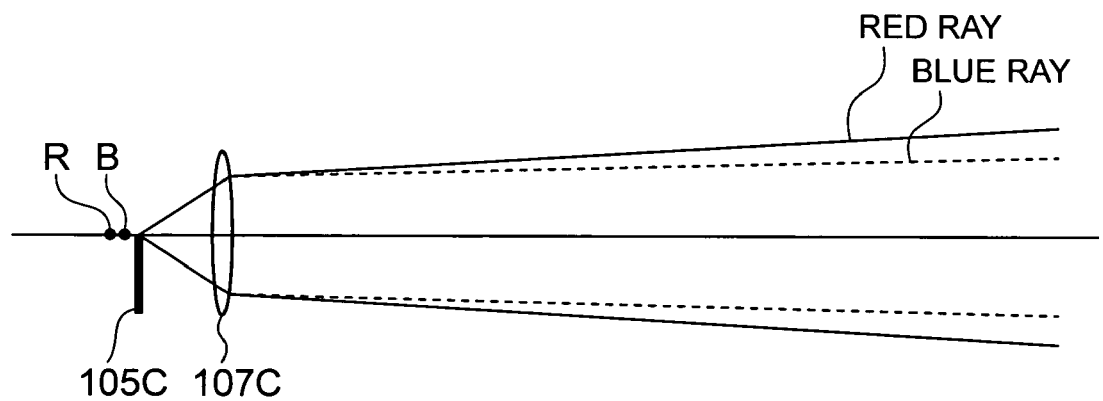
FIG. 18 illustrates a configuration of a vehicular lamp according to Embodiment C.

FIG. 18 illustrates a configuration of a vehicular lamp according to Embodiment C. In Embodiment C, the light passing through a projector lens 107C is not collected.

In Embodiment C, the correlated color temperature of the light source is higher than 6500 K. Hereinafter the light source whose correlated color temperature is higher than 6500 K is referred to as high-temperature light source. In Embodiment C, the following expression holds:

$$0.33 < f_D/f/\text{Abbe}$$

That is, the focal position R to the red light of the portion in which the diffraction surface of the projector lens 107C is provided is located on the light source side of the focal position B to the blue light of the portion by relatively weakening the power of the diffraction surface. A position of a shade 105C on the optical axis is located closer to the projector lens 107C than the focal position closest to the projector lens 107C in the focal positions to the lights having the wavelength of 450 nm to 700 nm. In Embodiment C, a red ray is generated in the circumferential portion of the light flux with which the object ahead is irradiated through the projector lens 107C. Although the high-temperature light source is bluish, the color separation toward the higher temperature side can be prevented by generating the red ray in the circumferential portion.

Embodiment D

Figure 19:
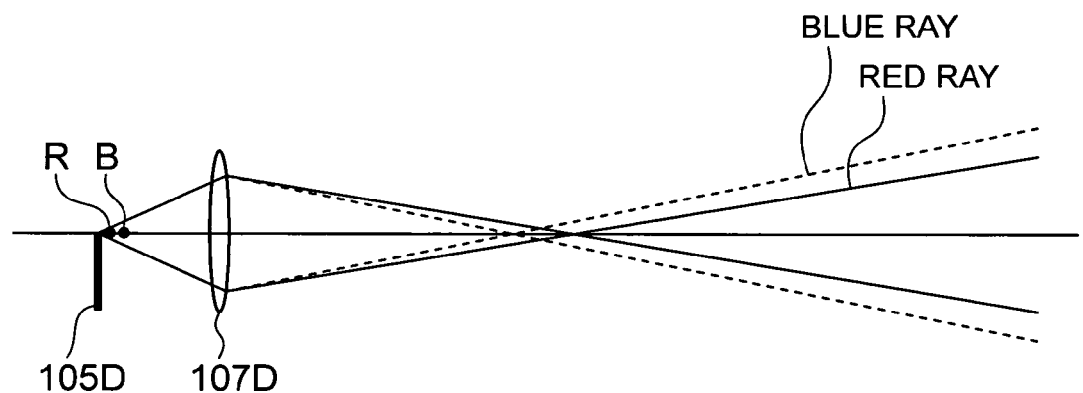
FIG. 19 illustrates a configuration of a vehicular lamp according to Embodiment D.

FIG. 19 illustrates a configuration of a vehicular lamp according to Embodiment A. In Embodiment D, the light passing through a projector lens 107D is collected.

In Embodiment D, the light source is the low-temperature light source. In Embodiment D, the following expression holds:

$$0.34 < f_D/f/\text{Abbe}$$

That is, the focal position R to the red light of the portion in which the diffraction surface of the projector lens 107D is provided is located on the light source side of the focal position B to the blue light of the portion by relatively weakening the power of the diffraction surface. A position of a shade 105D on the optical axis is kept farther away from the projector lens 107D than the focal position farthest away from the projector lens 107D in the focal positions to the lights having the wavelength of 450 nm to 700 nm. In Embodiment D, the blue ray is generated in the circumferential portion of the light flux with which the object ahead is irradiated through the projector lens 107D. Although the low-temperature light source is reddish, the color separation toward the lower temperature side can be prevented by generating the blue ray in the circumferential portion.

Embodiment E

Figure 20:
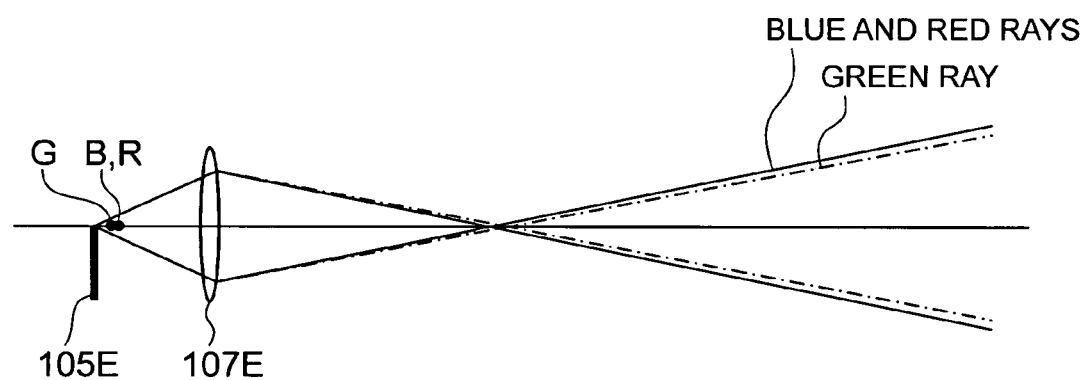
FIG. 20 illustrates a configuration of a vehicular lamp according to Embodiment E.

FIG. 20 illustrates a configuration of a vehicular lamp according to Embodiment E. In Embodiment E, the light passing through a projector lens 107E is collected.

In Embodiment E, the light source is the intermediate-temperature light source. In Embodiment E, the following expression holds:

$$0.28 < f_D/f/\text{Abbe} < 0.36$$

That is, the focal position B to the blue light of the portion in which the diffraction surface of the projector lens 107E is provided is substantially matched with the focal position R to the red light of the portion by adjusting the power of the diffraction surface. A position of a shade 105E on the optical axis is kept farther away from the projector lens 107E than the focal position farthest away from the projector lens 107E in the focal positions to the lights having the wavelength of 450 nm to 700 nm. In Embodiment E, the intermediate-temperature light source is seemed to be substantially white, so that the color separation can be reduced by suppressing the color aberration of the projector lens 107E as much as possible.

Embodiment F

Figure 21:
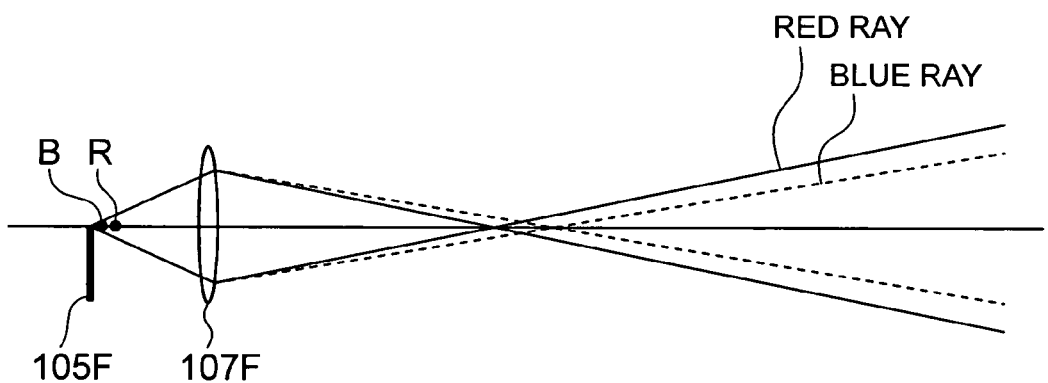
FIG. 21 illustrates a configuration of a vehicular lamp according to Embodiment F.

FIG. 21 illustrates a configuration of a vehicular lamp according to Embodiment F. In Embodiment F, the light passing through a projector lens 107F is collected.

In Embodiment F, the light source is the high-temperature light source. In Embodiment F, the following expression holds:

$$f_D/f/\text{Abbe} < 0.29$$

That is, the focal position B to the blue light of the portion in which the diffraction surface of the projector lens 107F is provided is located on the light source side of the focal position R to the red light of the portion by relatively strengthening the power of the diffraction surface. A position of a shade 105F on the optical axis is kept farther away from the projector lens 107F than the focal position farthest away from the projector lens 107F in the focal positions to the lights having the wavelength of 450 nm to 700 nm. In Embodiment F, the red ray is generated in the circumferential portion of the light flux with which the object ahead is irradiated through the projector lens 107F. Although the high-temperature light source is bluish, the color separation toward the higher temperature side can be prevented by generating the red ray in the circumferential portion.

Embodiment with Surface Light Source

The light sources, reflectors, and shades of Embodiments A to F can be replaced with a surface light source that is placed at the position of the shade. In the surface light source, light-emitting elements such as an LED are arrayed in a substantially flat substrate.

Figure 22:
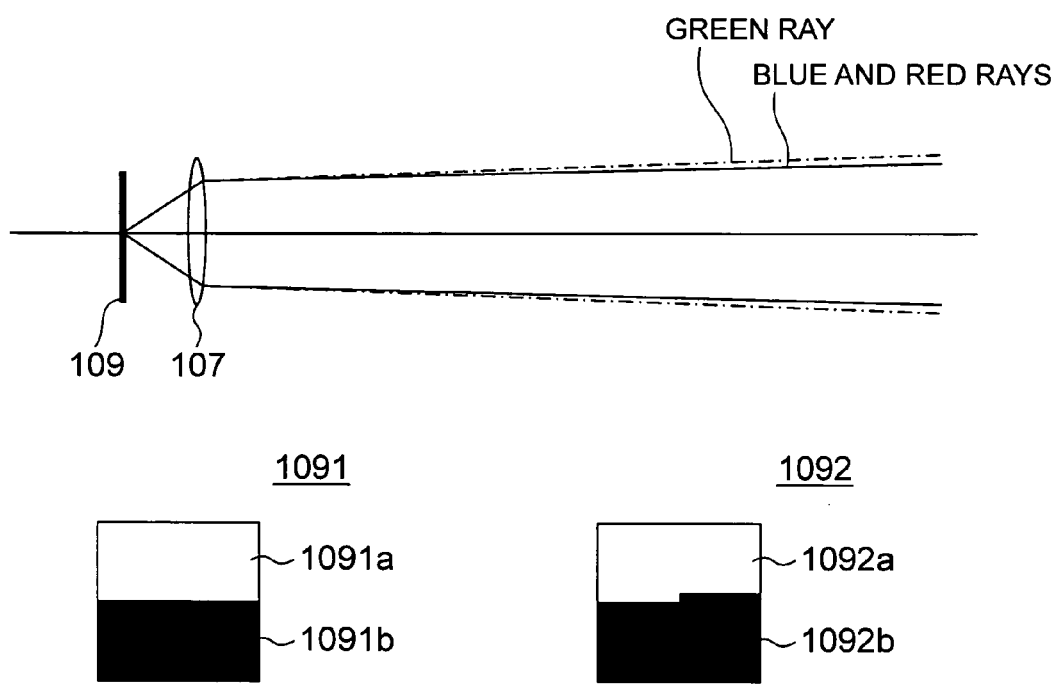
FIG. 22 illustrates a configuration of a vehicular lamp in which a surface light source is used.

FIG. 22 illustrates a configuration of a vehicular lamp in which the surface light source is used. The vehicular lamp of FIG. 22 corresponds to that of Embodiment B by way of example. A surface light source 109 is disposed at the position of the shade 107B of FIG. 17. Variant front views of the surface light source 109 are shown with numerals 1091 and 1092. Light-emitting portions of the surface light source are shown with numerals 1091a and 1092a. Non-light-emitting portions of the surface light source are shown with numerals 1091b and 1092b, which correspond to the shade. A step at a boundary between the light-emitting portion and the non-light-emitting portion in the surface light source 1092 is provided to change irradiation distances on the right and left of the vehicular lamp. Similarly embodiments, in which the surface light sources are provided, are obtained by disposing the surface light sources at the positions of the shades of other embodiments.

In FIGS. 1, 13, and 22, the normal lens is used as the projector lens. The Fresnel lens or cylindrical lens may be used as the projector lens.

DESCRIPTION OF EXAMPLES

Examples corresponding to the embodiments will be described below. First the examples will be described. The shape of the lens and the shape of the diffraction grating are expressed by the equations (1) and (2). The evaluation function (6) in which averaging is not performed is used as the color separation evaluation function:

$$\sigma^2 = \sum_{sy} I_{relative}(h, v) D_{relative}^2(h, v) \qquad (6)$$

where $x_s$ is expressed by h and $y_s$ is expressed by v. $I_{relative}$(h, v) is relative illuminance normalized in h=0 and v=−40 (cm) with illuminance of 1. $D_{relative}$(h,v) is a distance between the chromaticity coordinates of the intermediate-temperature light source and the chromaticity coordinates of the color in (h,v). For example, the evaluation function of the equation (6) to h=0 is obtained by adding values of points in each of 1 cm in a positive direction of v from v=−40 (cm) until the value of the illuminance becomes zero. The chromaticity coordinates of a point at luminous intensity plane coordinates (h,v) are determined by the light incident to a square having the side of 3 cm and the center of the point (h,v). The color separation is reduced as the value of the evaluation function is decreased in the equation (6).

The examples are obtained by the simulation with geometric ray tracing. In the simulation with the geometric ray tracing, the illuminance distribution and the chromaticity coordinates are obtained from a distribution in which the rays having the wavelengths reach an observation surface disposed at the position 10 meters ahead of the lens on the conditions determined as below. The conditions are determined such that the light source having the surface shape is set at the shade position, the ray is generated toward a random direction from a random position of the surface light source, and the whole surface of the projector lens is substantially evenly irradiated. Accordingly, the following examples can be regarded as those both for the embodiment in which the shade is used and for the embodiment in which the surface light source is used.

The following tables illustrate wavelength distributions of the light source used in the simulation.

The chromaticity coordinates of the intermediate-temperature light source are x=0.352 and y=0.353, and the temperature is about 4850 K.

TABLE 4

| WAVELENGTH [nm] | INTENSITY RATIO |
| --- | --- |
| 750 | 0.020 |
| 745 | 0.022 |
| 740 | 0.024 |
| 735 | 0.026 |
| 730 | 0.028 |
| 725 | 0.030 |
| 720 | 0.033 |
| 715 | 0.036 |
| 710 | 0.040 |
| 705 | 0.045 |
| 700 | 0.050 |
| 695 | 0.060 |
| 690 | 0.075 |
| 685 | 0.080 |
| 680 | 0.090 |
| 675 | 0.100 |
| 670 | 0.125 |
| 665 | 0.140 |
| 660 | 0.160 |
| 655 | 0.175 |
| 650 | 0.200 |
| 645 | 0.225 |
| 640 | 0.255 |
| 635 | 0.290 |
| 630 | 0.320 |
| 625 | 0.350 |
| 620 | 0.390 |
| 615 | 0.425 |
| 610 | 0.455 |
| 605 | 0.490 |
| 600 | 0.525 |
| 595 | 0.550 |
| 590 | 0.575 |
| 585 | 0.600 |
| 580 | 0.615 |
| 575 | 0.620 |
| 570 | 0.615 |
| 565 | 0.600 |
| 560 | 0.575 |
| 555 | 0.550 |
| 550 | 0.500 |
| 545 | 0.450 |
| 540 | 0.400 |
| 535 | 0.340 |
| 530 | 0.290 |
| 525 | 0.250 |
| 520 | 0.190 |
| 515 | 0.175 |
| 510 | 0.170 |
| 505 | 0.185 |
| 500 | 0.210 |
| 495 | 0.300 |
| 490 | 0.380 |
| 485 | 0.500 |
| 480 | 0.650 |
| 475 | 0.800 |
| 470 | 0.900 |
| 465 | 1.000 |
| 460 | 0.800 |
| 455 | 0.500 |
| 450 | 0.300 |
| 445 | 0.140 |
| 440 | 0.055 |

The chromaticity coordinates of the low-temperature light source are x=0.439 and y=0.417, and the temperature is about 3150 K.

TABLE 5

| WAVELENGTH [nm] | INTENSITY RATIO |
| --- | --- |
| 750 | 1.000 |
| 745 | 0.995 |
| 740 | 0.990 |
| 735 | 0.980 |
| 730 | 0.970 |
| 725 | 0.955 |
| 720 | 0.950 |
| 715 | 0.940 |
| 710 | 0.930 |
| 705 | 0.920 |
| 700 | 0.910 |
| 695 | 0.900 |
| 690 | 0.890 |
| 685 | 0.880 |
| 680 | 0.870 |
| 675 | 0.860 |

TABLE 5-continued

| WAVELENGTH [nm] | INTENSITY RATIO |
|---|---|
| 670 | 0.845 |
| 665 | 0.830 |
| 660 | 0.820 |
| 655 | 0.810 |
| 650 | 0.800 |
| 645 | 0.785 |
| 640 | 0.770 |
| 635 | 0.755 |
| 630 | 0.740 |
| 625 | 0.730 |
| 620 | 0.720 |
| 615 | 0.700 |
| 610 | 0.680 |
| 605 | 0.670 |
| 600 | 0.655 |
| 595 | 0.645 |
| 590 | 0.630 |
| 585 | 0.610 |
| 580 | 0.595 |
| 575 | 0.580 |
| 570 | 0.570 |
| 565 | 0.550 |
| 560 | 0.535 |
| 555 | 0.520 |
| 550 | 0.505 |
| 545 | 0.490 |
| 540 | 0.470 |
| 535 | 0.455 |
| 530 | 0.440 |
| 525 | 0.430 |
| 520 | 0.415 |
| 515 | 0.400 |
| 510 | 0.380 |
| 505 | 0.365 |
| 500 | 0.350 |
| 495 | 0.340 |
| 490 | 0.320 |
| 485 | 0.300 |
| 480 | 0.290 |
| 475 | 0.270 |
| 470 | 0.260 |
| 465 | 0.250 |
| 460 | 0.240 |
| 455 | 0.220 |
| 450 | 0.210 |
| 445 | 0.200 |
| 440 | 0.190 |

The chromaticity coordinates of the high-temperature light source are x=0.312 and y=0.329, and the temperature is about 6600 K.

TABLE 6

| WAVELENGTH [nm] | INTENSITY RATIO |
|---|---|
| 750 | 0.120 |
| 745 | 0.140 |
| 740 | 0.140 |
| 735 | 0.140 |
| 730 | 0.160 |
| 725 | 0.170 |
| 720 | 0.170 |
| 715 | 0.170 |
| 710 | 0.200 |
| 705 | 0.230 |
| 700 | 0.280 |
| 695 | 0.250 |
| 690 | 0.300 |
| 685 | 0.300 |
| 680 | 0.320 |
| 675 | 0.350 |
| 670 | 0.320 |
| 665 | 0.300 |
| 660 | 0.300 |
| 655 | 0.300 |
| 650 | 0.330 |
| 645 | 0.330 |
| 640 | 0.350 |
| 635 | 0.350 |
| 630 | 0.350 |
| 625 | 0.350 |
| 620 | 0.350 |
| 615 | 0.350 |
| 610 | 0.370 |
| 605 | 0.370 |
| 600 | 0.350 |
| 595 | 0.550 |
| 590 | 0.430 |
| 585 | 0.360 |
| 580 | 0.360 |
| 575 | 0.360 |
| 570 | 0.370 |
| 565 | 0.370 |
| 560 | 0.380 |
| 555 | 0.380 |
| 550 | 0.400 |
| 545 | 0.430 |
| 540 | 0.600 |
| 535 | 0.560 |
| 530 | 0.390 |
| 525 | 0.420 |
| 520 | 0.420 |
| 515 | 0.400 |
| 510 | 0.400 |
| 505 | 0.400 |
| 500 | 0.420 |
| 495 | 0.400 |
| 490 | 0.380 |
| 485 | 0.380 |
| 480 | 0.400 |
| 475 | 0.500 |
| 470 | 0.760 |
| 465 | 0.820 |
| 460 | 1.000 |
| 455 | 0.760 |
| 450 | 0.650 |
| 445 | 0.400 |
| 440 | 0.400 |

Examples 1 to 14, examples 14A and 14B, and comparative examples 1 to 6 will be described below. Examples 1 to 14, Examples 14A and 14B, and Comparative Examples 1 to 6 include the specifications of the shade and projector lens and the value of evaluation function.

In Examples 1 to 14, 14A and 14B, and comparative examples 1 to 6, the lens is made of the methyl methacrylate resin. In the following description, PMMA indicates the methyl methacrylate resin. The methyl methacrylate resin used in the examples has the Abbe number of 57.44.

Example 1

Example 1 in which the intermediate-temperature light source is used corresponds to Embodiment B.

Table 7 illustrates the specifications of the shade and projector lens and the evaluation function of Example 1.

Figure 23:
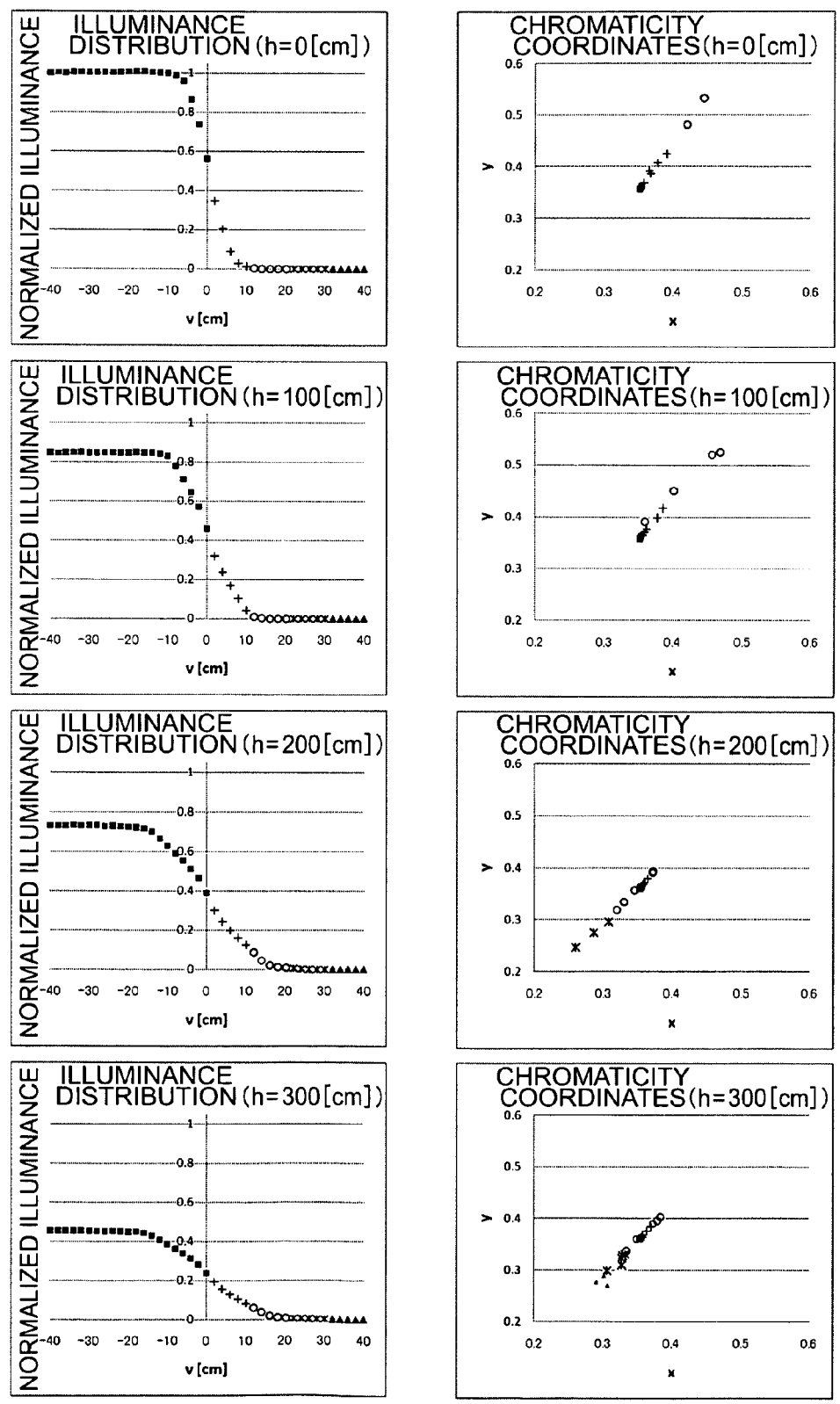
FIG. 23 illustrates light intensity distributions on the luminous intensity plane and distributions on the chromaticity coordinate plane of Example 1.

FIG. 23 illustrates light intensity distributions on the luminous intensity plane and distributions on the chromaticity coordinate plane of Example 1.

TABLE 7

| LENS DATA | |
|---|---|
| DISTANCE BETWEEN SHADE SURFACE AND SOURCE SIDE SURFACE OF PROJECTOR LENS [mm] | 25.25 |
| PROJECTOR LENS MATERIAL | PMMA |

TABLE 7-continued

| PROJECTOR LENS CENTER THICKNESS [mm] | 15.21 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 24.000 | −0.255 | 5.25E−05 | −2.52E−09 | −4.29E−10 | 0.00E+00 |

PROJECTOR LENS INCIDENT SURFACE sag

| R |
|---|
| 150.000 |

PROJECTOR LENS OUTGOING SURFACE (DIFFRACTION GRATING REGION: WHOLE SURFACE)

sag

| R | k | $\alpha_4$ | $\alpha_6$ | $\alpha_8$ | $\alpha_{10}$ |
|---|---|---|---|---|---|
| −19.823 | −0.719 | −1.59E−06 | 4.07E−09 | 9.55E−13 | 3.43E−15 |

$\phi$

| M | $\beta_2$ | $\beta_4$ | $\beta_6$ | $\beta_8$ | $\beta_{10}$ |
|---|---|---|---|---|---|
| 1.000 | −8.307 | −5.73E−04 | −1.64E−05 | 2.27E−08 | 0.00E+00 |

PROJECTOR LENS FOCAL DISTANCE AND DIFFRACTION SURFACE FOCAL DISTANCE

| f | $f_D$ | $f_D$/f/Abbe |
|---|---|---|
| 28.36 | 494.13 | 0.303 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0055 | 0.0048 | 0.0045 | 0.0031 | 0.0179 |

Example 2

Example 2 in which the intermediate-temperature light source is used corresponds to Embodiment E.

Table 8 illustrates the specifications of the shade and projector lens and the evaluation function of Example 2.

Figure 24:
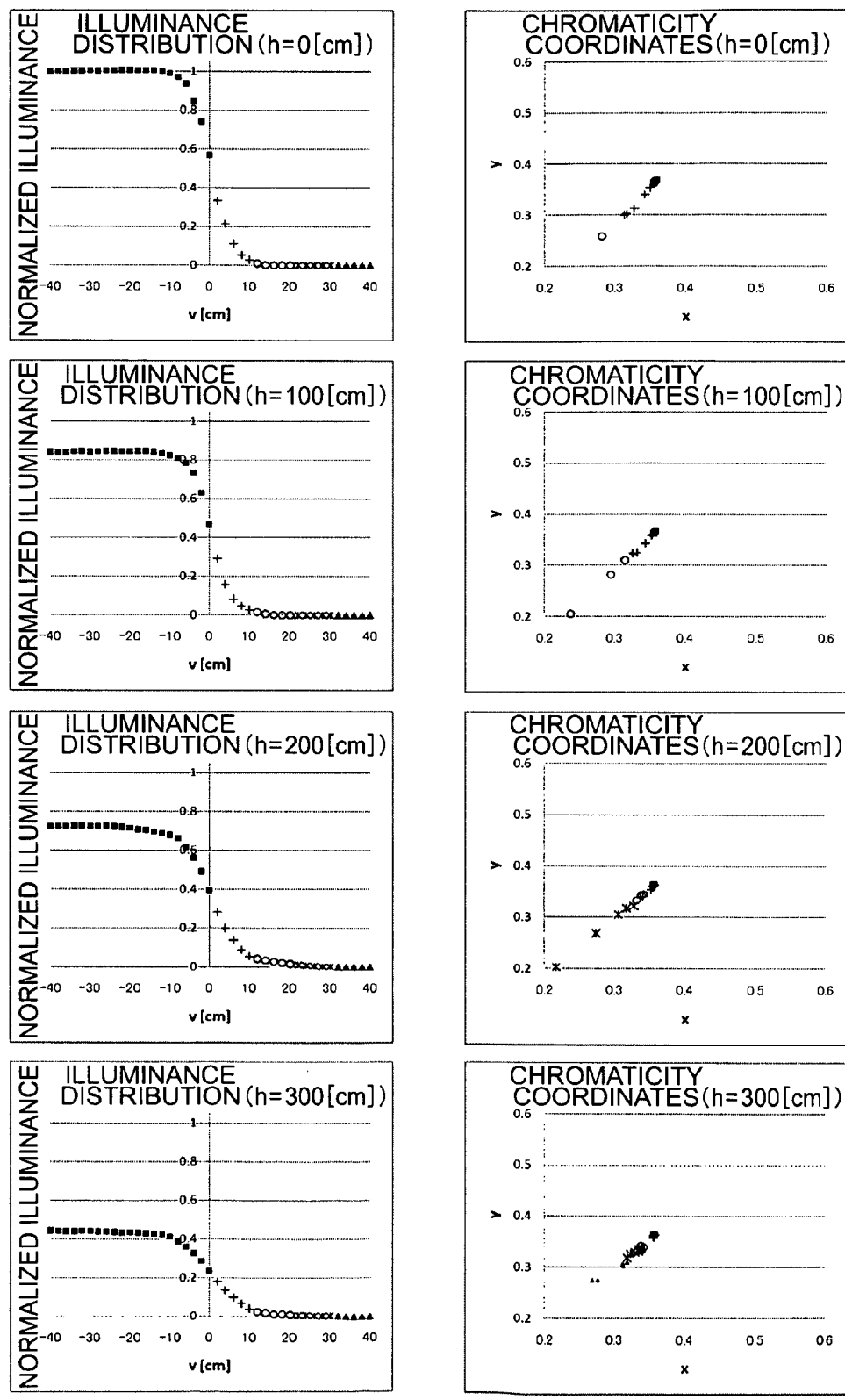
FIG. 24 illustrates light intensity distributions on the luminous intensity plane and distributions on the chromaticity coordinate plane of Example 2.

FIG. 24 illustrates light intensity distributions on the luminous intensity plane and distributions on the chromaticity coordinate plane of Example 2.

TABLE 8

LENS DATA

| DISTANCE BETWEEN SHADE SURFACE AND SOURCE SIDE SURFACE OF PROJECTOR LENS [mm] | 25.90 |
| PROJECTOR LENS MATERIAL | PMMA |
| PROJECTOR LENS CENTER THICKNESS [mm] | 15.21 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 24.000 | −0.255 | 5.25E−05 | −2.52E−09 | −4.29E−10 | 0.00E+00 |

TABLE 8-continued

PROJECTOR LENS INCIDENT SURFACE sag

| R |
|---|
| 150.000 |

PROJECTOR LENS OUTGOING SURFACE (DIFFRACTION GRATING REGION: WHOLE SURFACE)

sag

| R | k | $\alpha_4$ | $\alpha_6$ | $\alpha_8$ | $\alpha_{10}$ |
|---|---|---|---|---|---|
| −19.823 | −0.719 | −1.59E−06 | 4.07E−09 | 9.55E−13 | 3.43E−15 |

$\phi$

| M | $\beta_2$ | $\beta_4$ | $\beta_6$ | $\beta_8$ | $\beta_{10}$ |
|---|---|---|---|---|---|
| 1.000 | −8.307 | −5.73E−04 | −1.64E−05 | 2.27E−08 | 0.00E+00 |

PROJECTOR LENS FOCAL DISTANCE AND DIFFRACTION SURFACE FOCAL DISTANCE

| f | $f_D$ | $f_D$/f/Abbe |
|---|---|---|
| 28.36 | 494.13 | 0.303 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0070 | 0.0048 | 0.0040 | 0.0026 | 0.0185 |

Example 3

Example 3 in which the intermediate-temperature light source is used corresponds to Embodiment B.

Table 9 illustrates the specifications of the shade and projector lens and the evaluation function of Example 3.

Figure 25:
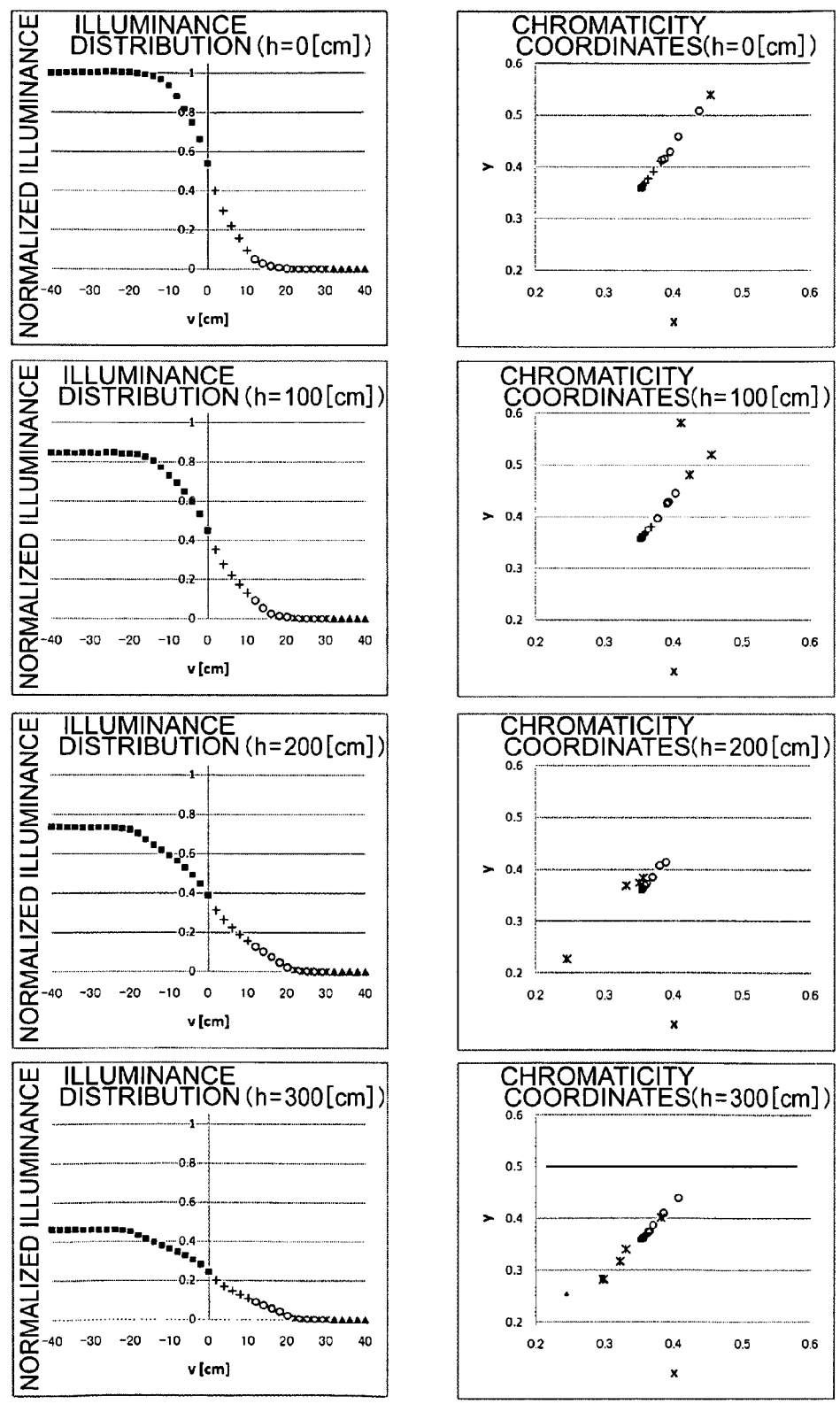
FIG. 25 illustrates light intensity distributions on the luminous intensity plane and distributions on the chromaticity coordinate plane of Example 3.

FIG. 25 illustrates light intensity distributions on the luminous intensity plane and distributions on the chromaticity coordinate plane of Example 3.

TABLE 9

LENS DATA

| DISTANCE BETWEEN SHADE SURFACE AND SOURCE SIDE SURFACE OF PROJECTOR LENS [mm] | 25.90 |
| PROJECTOR LENS MATERIAL | PMMA |
| PROJECTOR LENS CENTER THICKNESS [mm] | 15.21 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 24.000 | −0.255 | 5.25E−05 | −2.52E−09 | −4.29E−10 | 0.00E+00 |

PROJECTOR LENS INCIDENT SURFACE sag

| R |
|---|
| 150.000 |

TABLE 9-continued

PROJECTOR LENS OUTGOING SURFACE (DIFFRACTION GRATING REGION: WHOLE SURFACE)

sag

| R | k | $\alpha_4$ | $\alpha_6$ | $\alpha_8$ | $\alpha_{10}$ |
|---|---|---|---|---|---|
| −19.823 | −0.719 | −1.59E−06 | 4.07E−09 | 9.55E−13 | 3.43E−15 |

φ

| M | $\beta_2$ | $\beta_4$ | $\beta_6$ | $\beta_8$ | $\beta_{10}$ |
|---|---|---|---|---|---|
| 1.000 | −8.307 | −5.73E−04 | −1.64E−05 | 2.27E−08 | 0.00E+00 |

PROJECTOR LENS FOCAL DISTANCE AND DIFFRACTION SURFACE FOCAL DISTANCE

| f | $f_D$ | $f_D$/f/Abbe |
|---|---|---|
| 28.36 | 494.13 | 0.303 |

σ VALUE

| EVALUATION FUNCTION | h = 0 cm | h = 100 cm | h = 200 cm | h = 300 cm | TOTAL |
|---|---|---|---|---|---|
| σ(h)² | 0.0068 | 0.0055 | 0.0040 | 0.0034 | 0.0197 |

Example 4

Example 4 in which the intermediate-temperature light source is used corresponds to Embodiment B.

Table 10 illustrates the specifications of the shade and projector lens and the evaluation function of Example 4.

Figure 26:
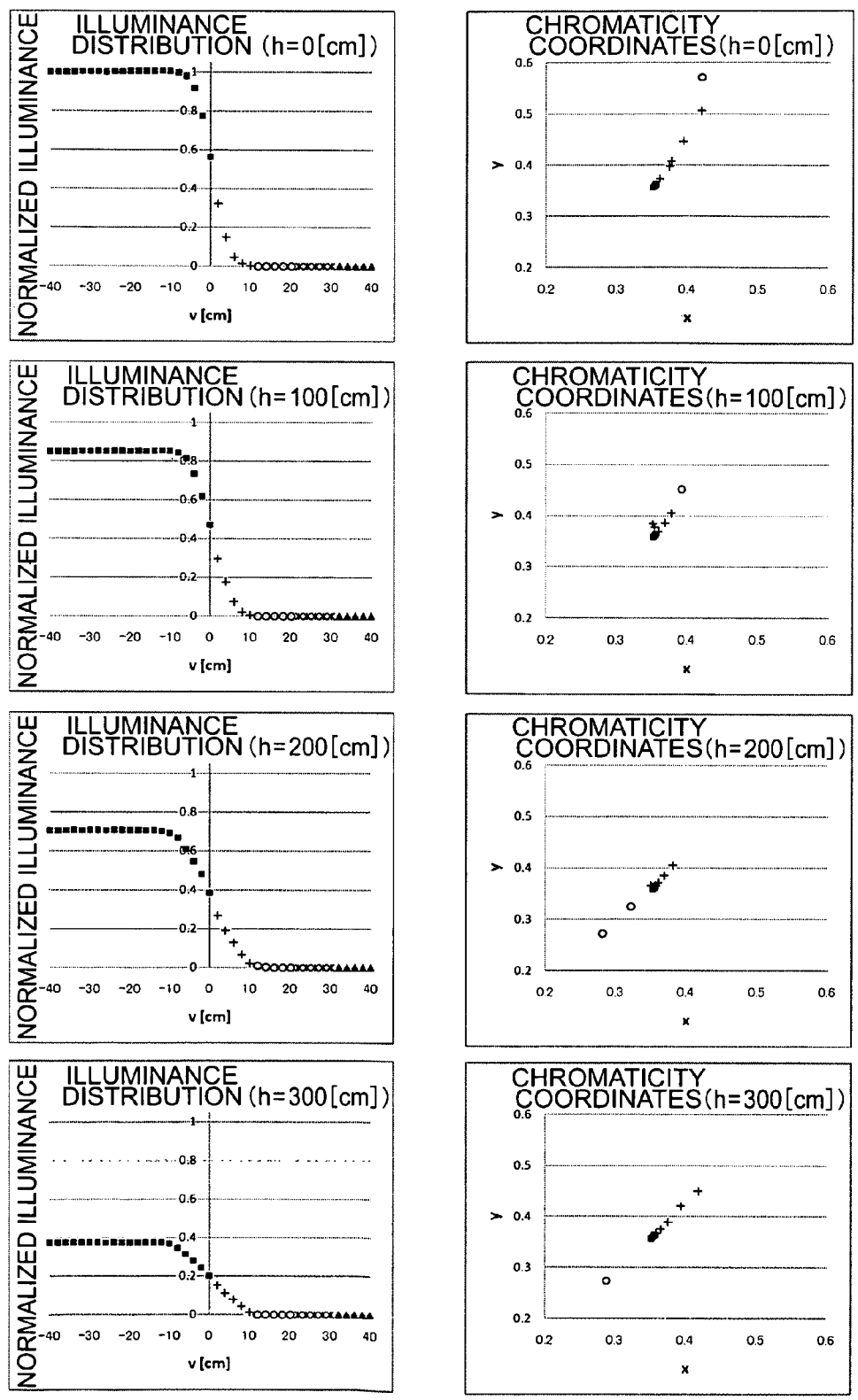
FIG. 26 illustrates light intensity distributions on the luminous intensity plane and distributions on the chromaticity coordinate plane of Example 4.

FIG. 26 illustrates light intensity distributions on the luminous intensity plane and distributions on the chromaticity coordinate plane of Example 4.

TABLE 10

LENS DATA

| | |
|---|---|
| DISTANCE BETWEEN SHADE SURFACE AND SOURCE SIDE SURFACE OF PROJECTOR LENS [mm] | 29.80 |
| PROJECTOR LENS MATERIAL | PMMA |
| PROJECTOR LENS CENTER THICKNESS [mm] | 13.76 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 27.000 | −0.863 | 1.68E−05 | −1.29E−07 | −3.99E−10 | 0.00E+00 |

PROJECTOR LENS INCIDENT SURFACE sag

R 150.000

PROJECTOR LENS OUTGOING SURFACE (DIFFRACTION GRATING REGION: WHOLE SURFACE)

sag

| R | k | $\alpha_4$ | $\alpha_6$ | $\alpha_8$ | $\alpha_{10}$ |
|---|---|---|---|---|---|
| −22.291 | −0.744 | −6.81E−07 | 2.14E−09 | 1.52E−12 | 4.46E−16 |

φ

| M | $\beta_2$ | $\beta_4$ | $\beta_6$ | $\beta_8$ | $\beta_{10}$ |
|---|---|---|---|---|---|
| 1.000 | −7.401 | −1.66E−03 | −5.21E−06 | 7.44E−09 | 0.00E+00 |

PROJECTOR LENS FOCAL DISTANCE AND DIFFRACTION SURFACE FOCAL DISTANCE

| f | $f_D$ | $f_D$/f/Abbe |
|---|---|---|
| 32.99 | 573.29 | 0.303 |

σ VALUE

| EVALUATION FUNCTION | h = 0 cm | h = 100 cm | h = 200 cm | h = 300 cm | TOTAL |
|---|---|---|---|---|---|
| σ(h)² | 0.0063 | 0.0049 | 0.0046 | 0.0034 | 0.0192 |

Example 5

Example 5 in which the intermediate-temperature light source is used corresponds to Embodiment E.

Table 11 illustrates the specifications of the shade and projector lens and the evaluation function of Example 5.

Figure 27:
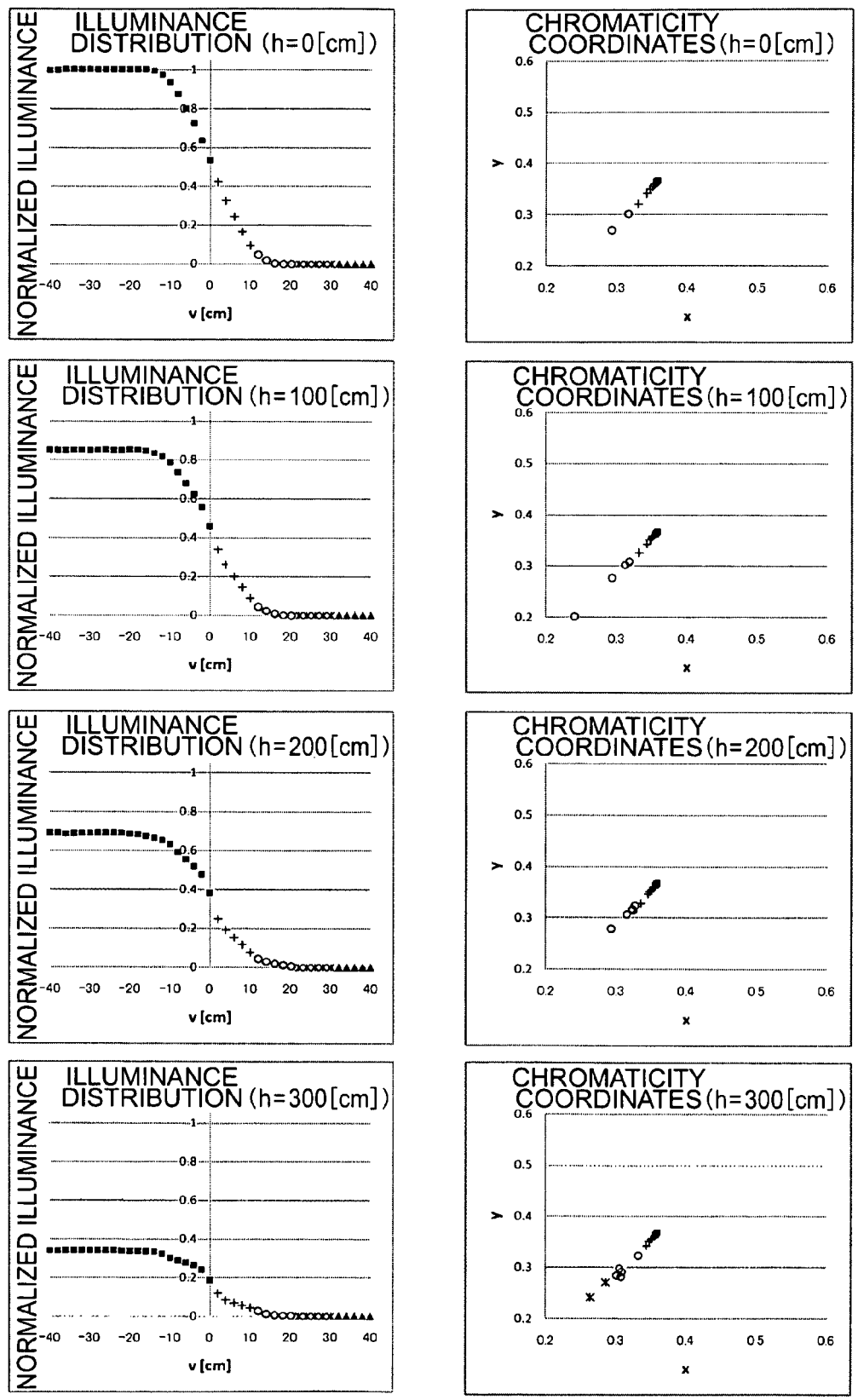
FIG. 27 illustrates light intensity distributions on the luminous intensity plane and distributions on the chromaticity coordinate plane of Example 5.

FIG. 27 illustrates light intensity distributions on the luminous intensity plane and distributions on the chromaticity coordinate plane of Example 5.

TABLE 11

LENS DATA

| | |
|---|---|
| DISTANCE BETWEEN SHADE SURFACE AND SOURCE SIDE SURFACE OF PROJECTOR LENS [mm] | 31.00 |
| PROJECTOR LENS MATERIAL | PMMA |
| PROJECTOR LENS CENTER THICKNESS [mm] | 13.76 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 27.000 | −0.863 | 1.68E−05 | 1.29E−07 | −3.99E−10 | 0.00E+00 |

PROJECTOR LENS INCIDENT SURFACE sag

R 150.000

PROJECTOR LENS OUTGOING SURFACE (DIFFRACTION GRATING REGION: WHOLE SURFACE)

sag

| R | k | $\alpha_4$ | $\alpha_6$ | $\alpha_8$ | $\alpha_{10}$ |
|---|---|---|---|---|---|
| −22.291 | −0.744 | −6.81E−07 | 2.14E−09 | 1.52E−12 | 4.46E−16 |

φ

| M | $\beta_2$ | $\beta_4$ | $\beta_6$ | $\beta_8$ | $\beta_{10}$ |
|---|---|---|---|---|---|
| 1.000 | −7.401 | −1.66E−03 | −5.21E−06 | 7.44E−09 | 0.00E+00 |

PROJECTOR LENS FOCAL DISTANCE AND DIFFRACTION SURFACE FOCAL DISTANCE

| f | $f_D$ | $f_D$/f/Abbe |
|---|---|---|

TABLE 11-continued

| 32.99 | 573.29 | 0.303 |
|---|---|---|

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0074 | 0.0061 | 0.0052 | 0.0029 | 0.0217 |

Example 6

Example 6 in which the intermediate-temperature light source is used corresponds to Embodiment B.

Table 12 illustrates the specifications of the shade and projector lens and the evaluation function of Example 6.

Figure 28:
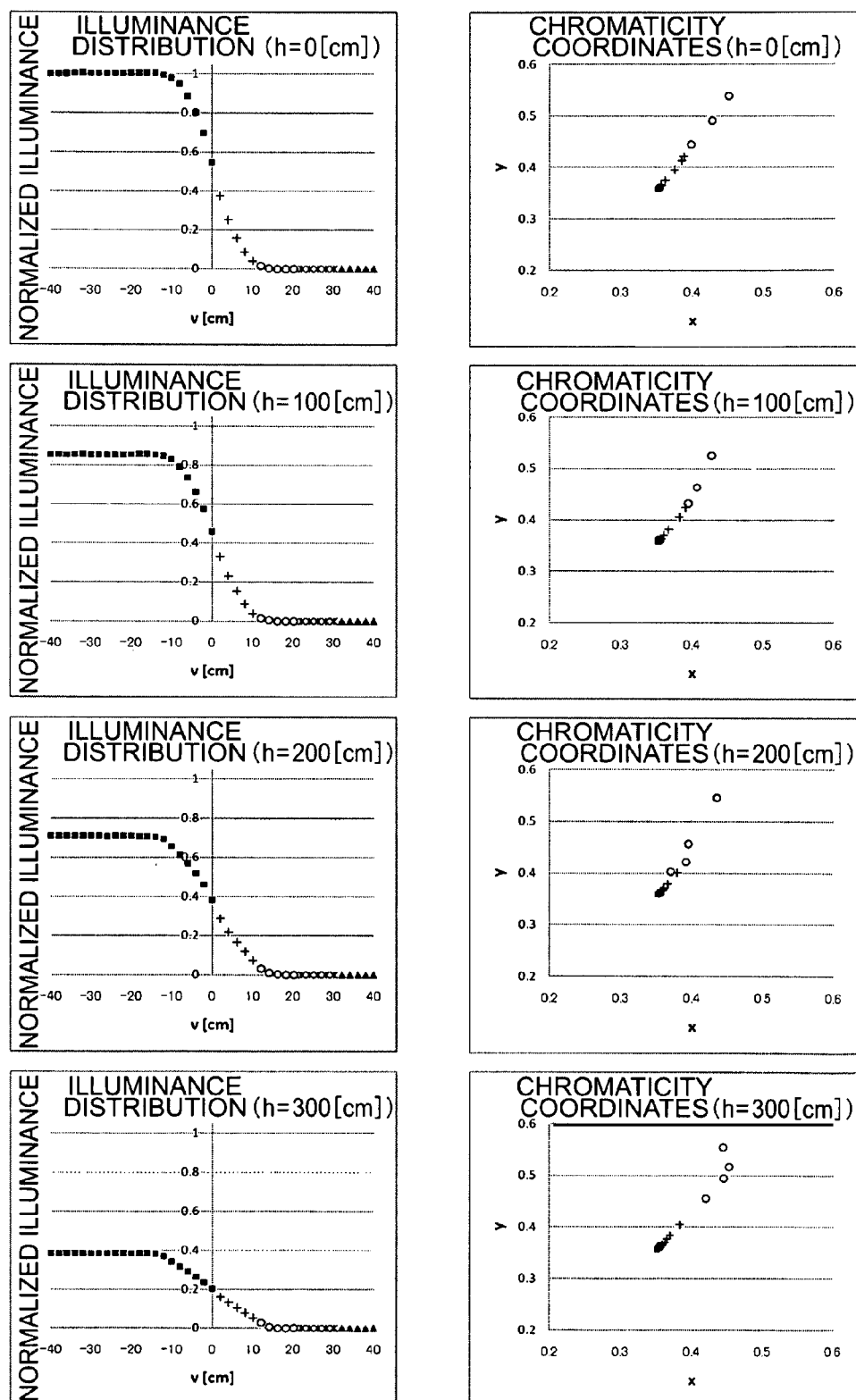
FIG. 28 illustrates light intensity distributions on the luminous intensity plane and distributions on the chromaticity coordinate plane of Example 6.

FIG. 28 illustrates light intensity distributions on the luminous intensity plane and distributions on the chromaticity coordinate plane of Example 6.

TABLE 12

LENS DATA

| DISTANCE BETWEEN SHADE SURFACE AND SOURCE SIDE SURFACE OF PROJECTOR LENS [mm] | 29.50 |
|---|---|
| PROJECTOR LENS MATERIAL | PMMA |
| PROJECTOR LENS CENTER THICKNESS [mm] | 13.76 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 27.000 | −0.863 | 1.68E−05 | 1.29E−07 | −3.99E−10 | 0.00E+00 |

PROJECTOR LENS INCIDENT SURFACE sag

R 150.000

PROJECTOR LENS OUTGOING SURFACE (DIFFRACTION GRATING REGION: WHOLE SURFACE)

sag

| R | k | $\alpha_4$ | $\alpha_6$ | $\alpha_8$ | $\alpha_{10}$ |
|---|---|---|---|---|---|
| −22.291 | −0.744 | −6.81E−07 | 2.14E−09 | 1.52E−12 | 4.46E−16 |

Φ

| M | $\beta_2$ | $\beta_4$ | $\beta_6$ | $\beta_8$ | $\beta_{10}$ |
|---|---|---|---|---|---|
| 1.000 | −7.401 | −1.66E−03 | −5.21E−06 | 7.44E−09 | 0.00E+00 |

PROJECTOR LENS FOCAL DISTANCE AND DIFFRACTION SURFACE FOCAL DISTANCE

| f | $f_D$ | $f_D$/f/Abbe |
|---|---|---|
| 32.99 | 573.29 | 0.303 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0071 | 0.0056 | 0.0045 | 0.0040 | 0.0211 |

Example 7

Example 7 in which the low-temperature light source is used corresponds to Embodiment A.

Table 13 illustrates the specifications of the shade and projector lens and the evaluation function of Example 7.

Figure 29:
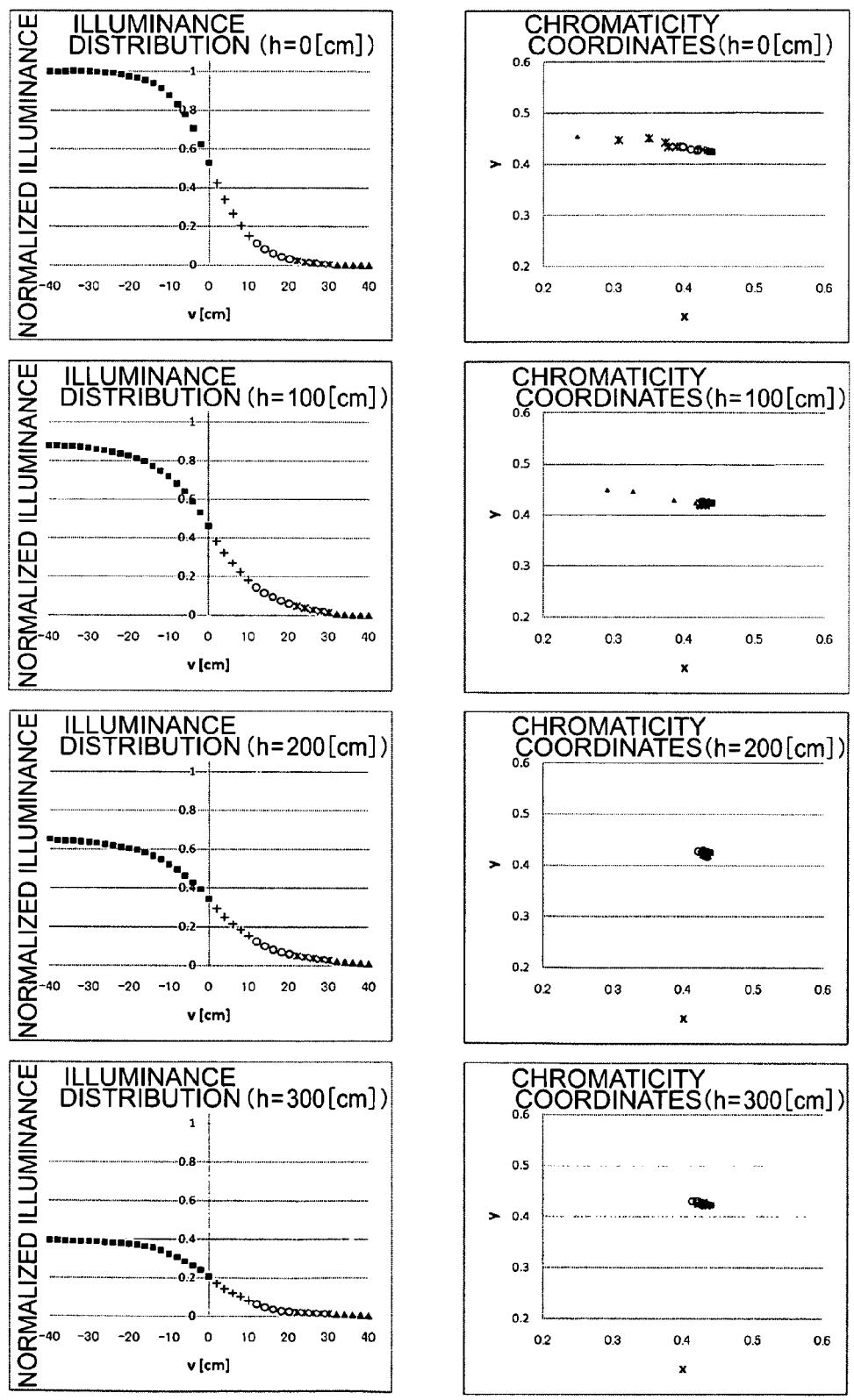
FIG. 29 illustrates light intensity distributions on the luminous intensity plane and distributions on the chromaticity coordinate plane of Example 7.

FIG. 29 illustrates light intensity distributions on the luminous intensity plane and distributions on the chromaticity coordinate plane of Example 7.

TABLE 13

LENS DATA

| DISTANCE BETWEEN SHADE SURFACE AND SOURCE SIDE SURFACE OF PROJECTOR LENS [mm] | 24.38 |
|---|---|
| PROJECTOR LENS MATERIAL | PMMA |
| PROJECTOR LENS CENTER THICKNESS [mm] | 14.91 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 21.000 | −1.500 | 3.55E−05 | −6.67E−08 | 0.00E+00 | 0.00E+00 |

PROJECTOR LENS INCIDENT SURFACE sag

R 100.000

PROJECTOR LENS OUTGOING SURFACE (DIFFRACTION GRATING REGION: WHOLE SURFACE)

sag

| R | k | $\alpha_4$ | $\alpha_6$ | $\alpha_8$ | $\alpha_{10}$ |
|---|---|---|---|---|---|
| −20.697 | −0.795 | −6.06E−07 | 2.99E−09 | 9.58E−12 | −5.07E−15 |

Φ

| M | $\beta_2$ | $\beta_4$ | $\beta_6$ | $\beta_8$ | $\beta_{10}$ |
|---|---|---|---|---|---|
| 1.000 | −12.269 | −4.56E−03 | −5.59E−06 | 1.11E−08 | 0.00E+00 |

PROJECTOR LENS FOCAL DISTANCE AND DIFFRACTION SURFACE FOCAL DISTANCE

| f | $f_D$ | $f_D$/f/Abbe |
|---|---|---|
| 28.19 | 338.64 | 0.209 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0041 | 0.0027 | 0.0023 | 0.0014 | 0.0105 |

Example 8

Example 8 in which the high-temperature light source is used corresponds to Embodiment F.

Table 14 illustrates the specifications of the shade and projector lens and the evaluation function of Example 8.

Figure 30:
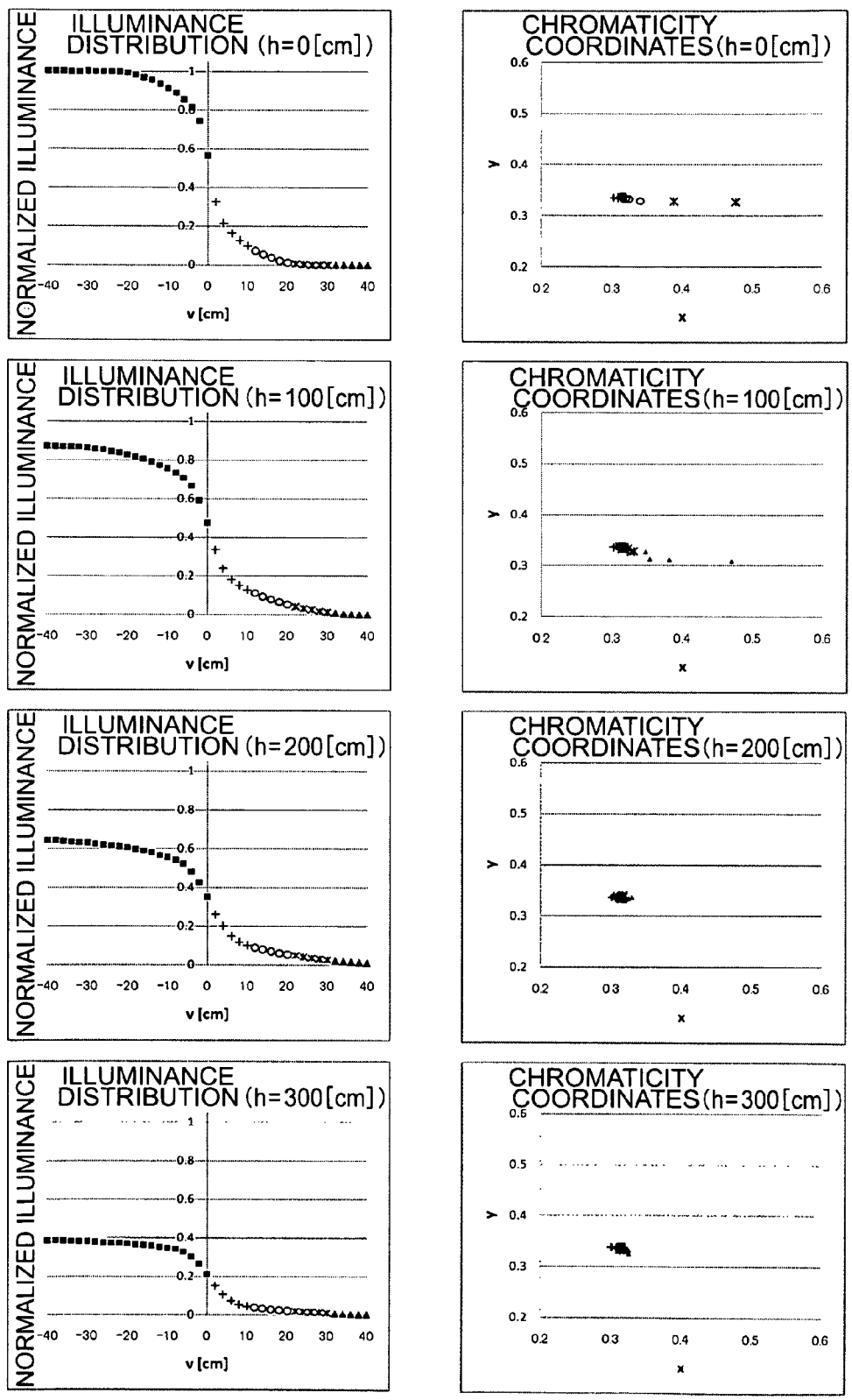
FIG. 30 illustrates light intensity distributions on the luminous intensity plane and distributions on the chromaticity coordinate plane of Example 8.

FIG. 30 illustrates light intensity distributions on the luminous intensity plane and distributions on the chromaticity coordinate plane of Example 8.

TABLE 14

LENS DATA

| | |
|---|---|
| DISTANCE BETWEEN SHADE SURFACE AND SOURCE SIDE SURFACE OF PROJECTOR LENS [mm] | 25.10 |
| PROJECTOR LENS MATERIAL | PMMA |
| PROJECTOR LENS CENTER THICKNESS [mm] | 14.91 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 21.000 | −1.500 | 3.55E−05 | −6.67E−08 | 0.00E+00 | 0.00E+00 |

PROJECTOR LENS INCIDENT SURFACE sag

| R |
|---|
| 100.000 |

PROJECTOR LENS OUTGOING SURFACE (DIFFRACTION GRATING REGION: WHOLE SURFACE)

sag

| R | k | $\alpha_4$ | $\alpha_6$ | $\alpha_8$ | $\alpha_{10}$ |
|---|---|---|---|---|---|
| −20.697 | −0.795 | −6.06E−07 | 2.99E−09 | 9.58E−12 | −5.07E−15 |

$\Phi$

| M | $\beta_2$ | $\beta_4$ | $\beta_6$ | $\beta_8$ | $\beta_{10}$ |
|---|---|---|---|---|---|
| 1.000 | −12.269 | −4.56E−03 | −5.59E−06 | 1.11E−08 | 0.00E+00 |

PROJECTOR LENS FOCAL DISTANCE AND DIFFRACTION SURFACE FOCAL DISTANCE

| f | $f_D$ | $f_D$/f/Abbe |
|---|---|---|
| 28.19 | 338.64 | 0.209 |

σ VALUE

| EVALUATION FUNCTION | h = 0 cm | h = 100 cm | h = 200 cm | h = 300 cm | TOTAL |
|---|---|---|---|---|---|
| σ (h)² | 0.0055 | 0.0047 | 0.0038 | 0.0023 | 0.0163 |

Example 9

Example 9 in which the low-temperature light source is used corresponds to Embodiment A.

Table 15 illustrates the specifications of the shade and projector lens and the evaluation function of Example 9.

Figure 31:
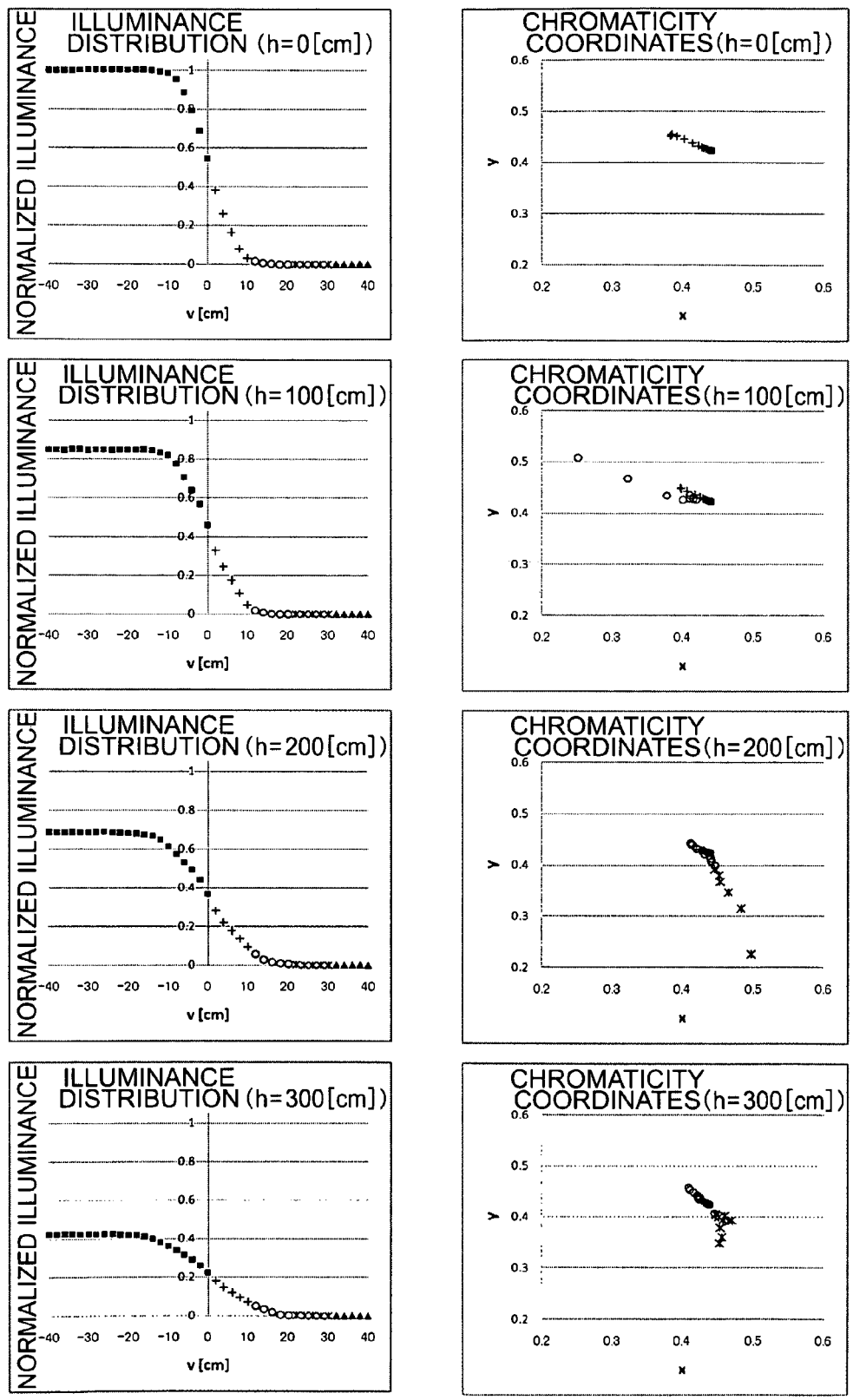
FIG. 31 illustrates light intensity distributions on the luminous intensity plane and distributions on the chromaticity coordinate plane of Example 9.

FIG. 31 illustrates light intensity distributions on the luminous intensity plane and distributions on the chromaticity coordinate plane of Example 9.

TABLE 15

LENS DATA

| | |
|---|---|
| DISTANCE BETWEEN SHADE SURFACE AND SOURCE SIDE SURFACE OF PROJECTOR LENS [mm] | 24.50 |
| PROJECTOR LENS MATERIAL | PMMA |
| PROJECTOR LENS CENTER THICKNESS [mm] | 15.17 |
| PROJECTOR LENS EFFECTIVE DIAMETER [mm] | 40.00 |

TABLE 15-continued

SHADE SURFACE sag

| R | k | $\alpha_4$ | $\alpha_6$ | $\alpha_8$ | $\alpha_{10}$ |
|---|---|---|---|---|---|
| 25.000 | −1.221 | 3.01E−05 | 1.19E−07 | −3.54E−10 | 0.00E+00 |

PROJECTOR LENS INCIDENT SURFACE sag

| R |
|---|
| 150.000 |

PROJECTOR LENS OUTGOING SURFACE (DIFFRACTION GRATING REGION: WHOLE SURFACE)

sag

| R | k | $\alpha_4$ | $\alpha_6$ | $\alpha_8$ | $\alpha_{10}$ |
|---|---|---|---|---|---|
| −19.854 | −0.736 | −1.41E−06 | 1.99E−09 | 3.96E−12 | 2.49E−15 |

$\Phi$

| M | $\beta_2$ | $\beta_4$ | $\beta_6$ | $\beta_8$ | $\beta_{10}$ |
|---|---|---|---|---|---|
| 1.000 | −10.597 | −3.88E−03 | −7.06E−06 | 9.45E−09 | 0.00E+00 |

PROJECTOR LENS FOCAL DISTANCE AND DIFFRACTION SURFACE FOCAL DISTANCE

| f | $f_D$ | $f_D$/f/Abbe |
|---|---|---|
| 27.78 | 363.92 | 0.228 |

σ VALUE

| EVALUATION FUNCTION | h = 0 cm | h = 100 cm | h = 200 cm | h = 300 cm | TOTAL |
|---|---|---|---|---|---|
| σ (h)² | 0.0044 | 0.0029 | 0.0024 | 0.0015 | 0.0112 |

Example 10

Example 10 in which the high-temperature light source is used corresponds to Embodiment F.

Table 16 illustrates the specifications of the shade and projector lens and the evaluation function of Example 10.

Figure 32:
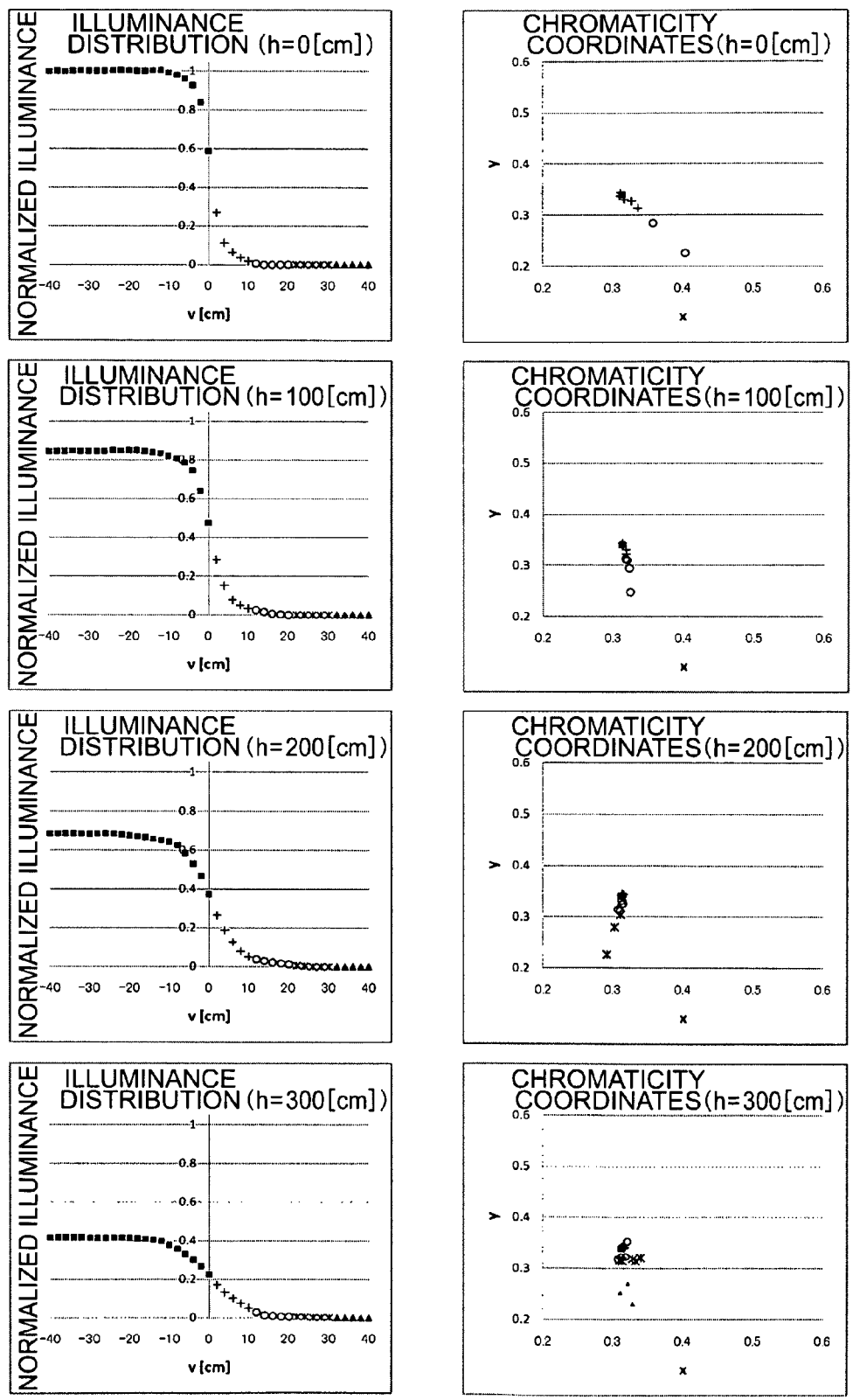
FIG. 32 illustrates light intensity distributions on the luminous intensity plane and distributions on the chromaticity coordinate plane of Example 10.

FIG. 32 illustrates light intensity distributions on the luminous intensity plane and distributions on the chromaticity coordinate plane of Example 10.

TABLE 16

LENS DATA

| | |
|---|---|
| DISTANCE BETWEEN SHADE SURFACE AND SOURCE SIDE SURFACE OF PROJECTOR LENS [mm] | 24.95 |
| PROJECTOR LENS MATERIAL | PMMA |
| PROJECTOR LENS CENTER THICKNESS [mm] | 15.17 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 25.000 | −1.221 | 3.01E−05 | 1.19E−07 | −3.54E−10 | 0.00E+00 |

TABLE 16-continued

PROJECTOR LENS INCIDENT SURFACE sag

| R |
|---|
| 150.000 |

PROJECTOR LENS OUTGOING SURFACE (DIFFRACTION GRATING REGION: WHOLE SURFACE)

sag

| R | k | $\alpha_4$ | $\alpha_6$ | $\alpha_8$ | $\alpha_{10}$ |
|---|---|---|---|---|---|
| −19.854 | −0.736 | −1.41E−06 | 1.99E−09 | 3.96E−12 | 2.49E−15 |

$\Phi$

| M | $\beta_2$ | $\beta_4$ | $\beta_6$ | $\beta_8$ | $\beta_{10}$ |
|---|---|---|---|---|---|
| 1.000 | −10.597 | −3.88E−03 | −7.06E−06 | 9.45E−09 | 0.00E+00 |

PROJECTOR LENS FOCAL DISTANCE AND DIFFRACTION SURFACE FOCAL DISTANCE

| f | $f_D$ | $f_D$/f/Abbe |
|---|---|---|
| 27.78 | 363.92 | 0.228 |

$\sigma$ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0057 | 0.0049 | 0.0043 | 0.0027 | 0.0176 |

Example 11

Example 11 in which the high-temperature light source is used corresponds to Embodiment C.

Table 17 illustrates the specifications of the shade and projector lens and the evaluation function of Example 11.

Figure 33:
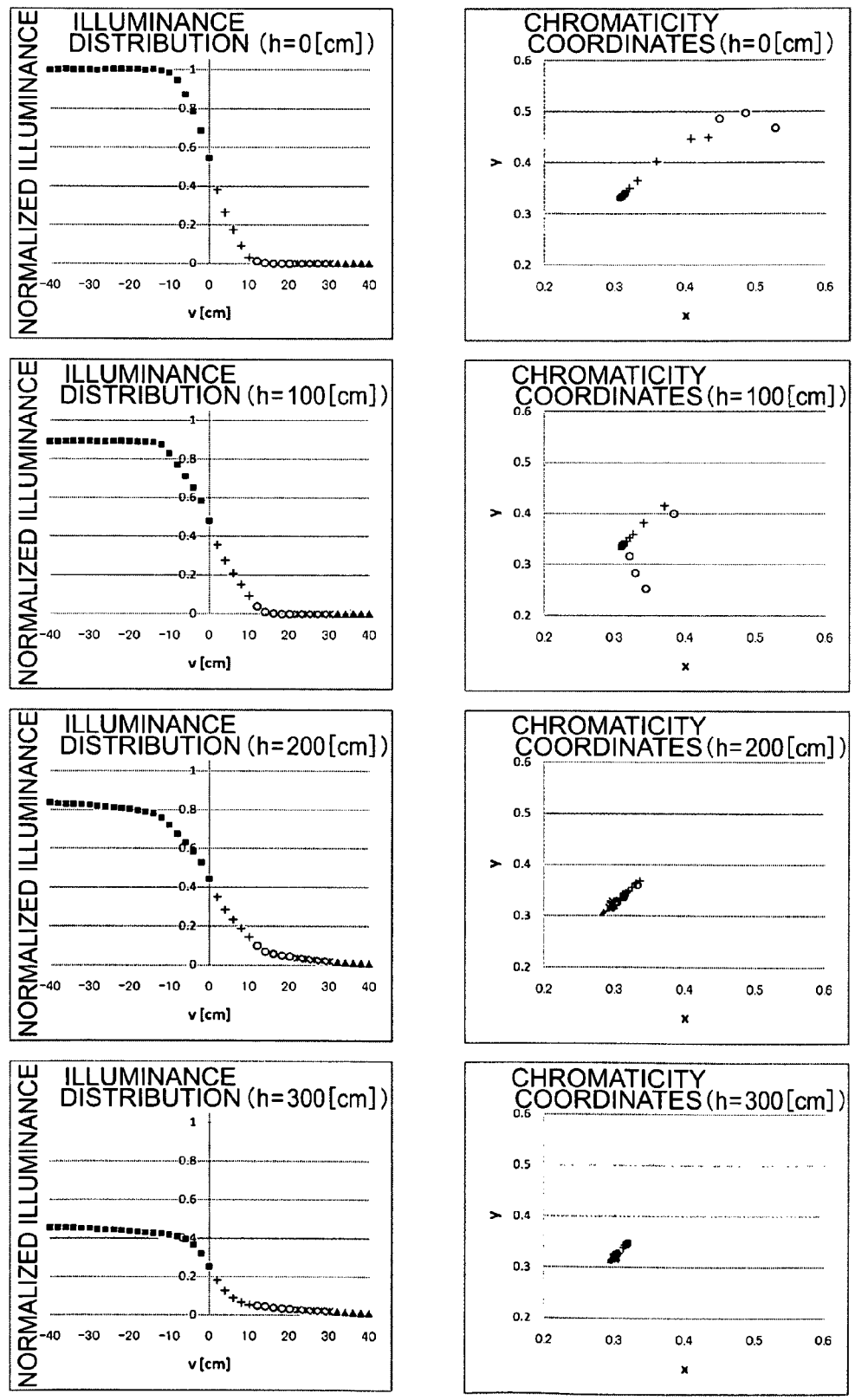
FIG. 33 illustrates light intensity distributions on the luminous intensity plane and distributions on the chromaticity coordinate plane of Example 11.

FIG. 33 illustrates light intensity distributions on the luminous intensity plane and distributions on the chromaticity coordinate plane of Example 11.

TABLE 17

LENS DATA

| DISTANCE BETWEEN SHADE SURFACE AND SOURCE SIDE SURFACE OF PROJECTOR LENS [mm] | 24.70 |
|---|---|
| PROJECTOR LENS MATERIAL | PMMA |
| PROJECTOR LENS CENTER THICKNESS [mm] | 15.51 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 22.000 | 0.169 | 3.97E−05 | −5.02E−08 | −7.11E−10 | 0.00E+00 |

PROJECTOR LENS INCIDENT SURFACE sag

| R |
|---|
| 150.000 |

TABLE 17-continued

PROJECTOR LENS OUTGOING SURFACE (DIFFRACTION GRATING REGION: WHOLE SURFACE)

sag

| R | k | $\alpha_4$ | $\alpha_6$ | $\alpha_8$ | $\alpha_{10}$ |
|---|---|---|---|---|---|
| −19.421 | −0.732 | −1.61E−06 | 1.69E−09 | 3.56E−12 | 3.99E−15 |

$\Phi$

| M | $\beta_2$ | $\beta_4$ | $\beta_6$ | $\beta_8$ | $\beta_{10}$ |
|---|---|---|---|---|---|
| 1.000 | −6.442 | −2.31E−03 | −5.03E−06 | 6.43E−09 | 0.00E+00 |

PROJECTOR LENS FOCAL DISTANCE AND DIFFRACTION SURFACE FOCAL DISTANCE

| f | $f_D$ | $f_D$/f/Abbe |
|---|---|---|
| 27.86 | 589.92 | 0.369 |

$\sigma$ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0181 | 0.0101 | 0.0100 | 0.0062 | 0.0444 |

Example 12

Example 12 in which the low-temperature light source is used corresponds to Embodiment D.

Table 18 illustrates the specifications of the shade and projector lens and the evaluation function of Example 12.

Figure 34:
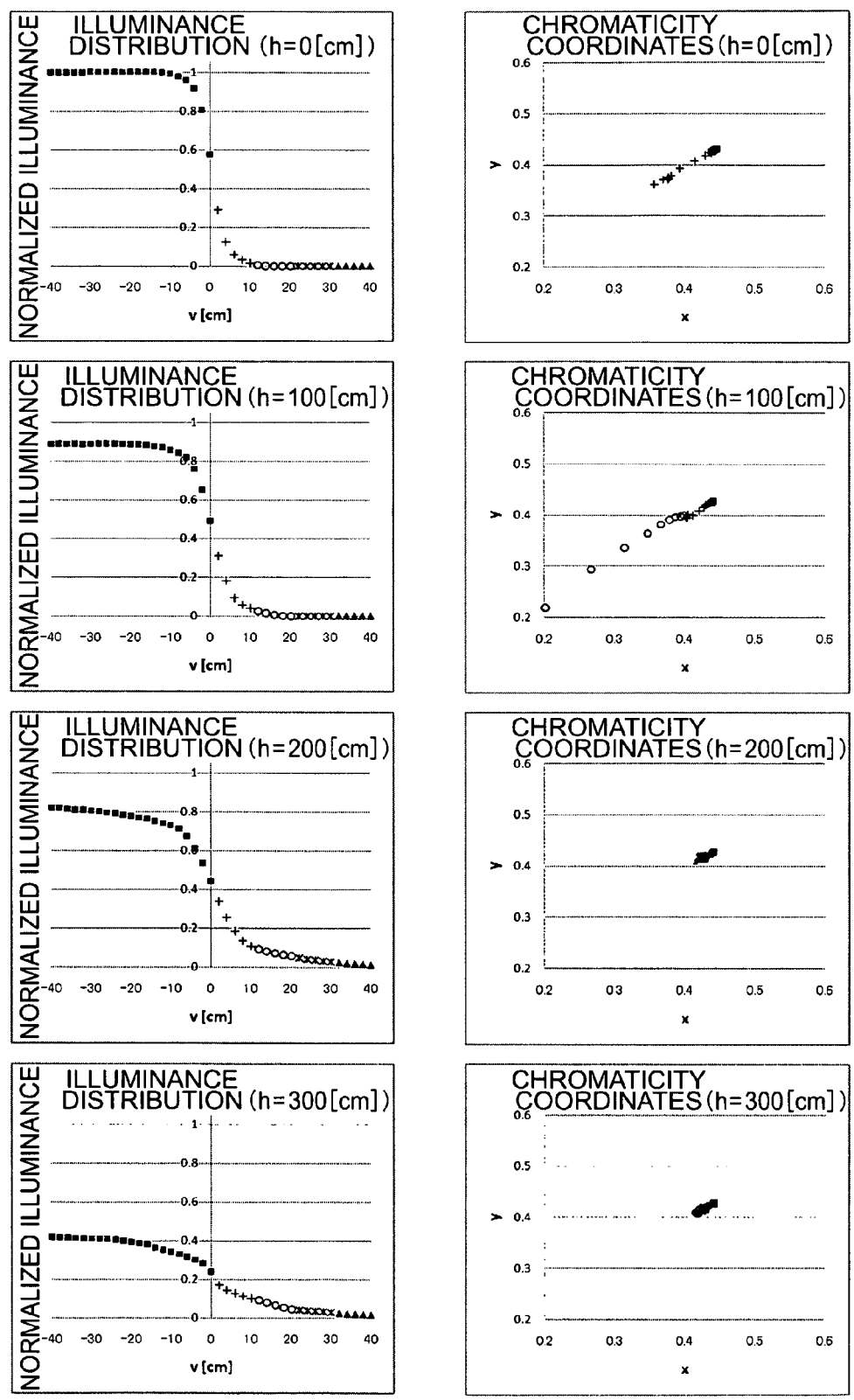
FIG. 34 illustrates light intensity distributions on the luminous intensity plane and distributions on the chromaticity coordinate plane of Example 12.

FIG. 34 illustrates light intensity distributions on the luminous intensity plane and distributions on the chromaticity coordinate plane of Example 12.

TABLE 18

LENS DATA

| DISTANCE BETWEEN SHADE SURFACE AND SOURCE SIDE SURFACE OF PROJECTOR LENS [mm] | 25.35 |
|---|---|
| PROJECTOR LENS MATERIAL | PMMA |
| PROJECTOR LENS CENTER THICKNESS [mm] | 15.51 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 22.000 | 0.169 | 3.97E−05 | −5.02E−08 | −7.11E−10 | 0.00E+00 |

PROJECTOR LENS INCIDENT SURFACE sag

| R |
|---|
| 150.000 |

PROJECTOR LENS OUTGOING SURFACE (DIFFRACTION GRATING REGION: WHOLE SURFACE)

sag

| R | k | $\alpha_4$ | $\alpha_6$ | $\alpha_8$ | $\alpha_{10}$ |
|---|---|---|---|---|---|
| −19.421 | −0.732 | −1.61E−06 | 1.69E−09 | 3.56E−12 | 3.99E−15 |

TABLE 18-continued

| | | | Φ | | |
|---|---|---|---|---|---|
| M | $\beta_2$ | $\beta_4$ | $\beta_6$ | $\beta_8$ | $\beta_{10}$ |
| 1.000 | −6.442 | −2.31E−03 | −5.03E−06 | 6.43E−09 | 0.00E+00 |

| PROJECTOR LENS FOCAL DISTANCE AND DIFFRACTION SURFACE FOCAL DISTANCE | | |
|---|---|---|
| f | $f_D$ | $f_D$/f/Abbe |
| 27.86 | 589.92 | 0.369 |

| | | σ VALUE | | |
|---|---|---|---|---|
| EVALUATION FUNCTION | h = 0 cm | h = 100 cm | h = 200 cm | h = 300 cm | TOTAL |
| σ (h)² | 0.0064 | 0.0042 | 0.0034 | 0.0020 | 0.0160 |

Example 13

Example 13 in which the high-temperature light source is used corresponds to Embodiment C.

Table 19 illustrates the specifications of the shade and projector lens and the evaluation function of Example 13.

Figure 35:
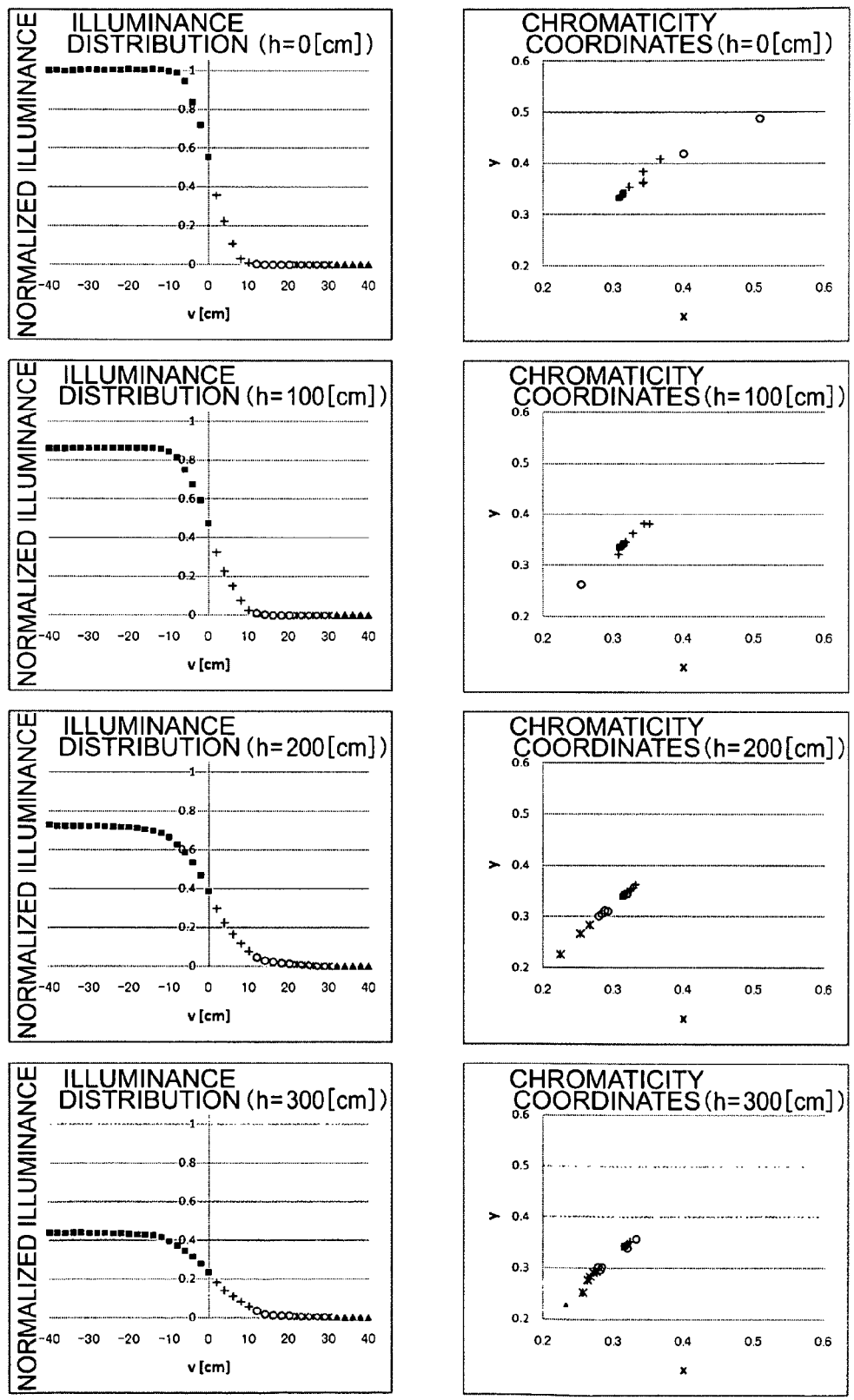
FIG. 35 illustrates light intensity distributions on the luminous intensity plane and distributions on the chromaticity coordinate plane of Example 13.

FIG. 35 illustrates light intensity distributions on the luminous intensity plane and distributions on the chromaticity coordinate plane of Example 13.

TABLE 19

| LENS DATA | |
|---|---|
| DISTANCE BETWEEN SHADE SURFACE AND SOURCE SIDE SURFACE OF PROJECTOR LENS [mm] | 24.75 |
| PROJECTOR LENS MATERIAL | PMMA |
| PROJECTOR LENS CENTER THICKNESS [mm] | 15.46 |
| PROJECTOR LENS EFFECTIVE DIAMETER [mm] | 40.00 |

| SHADE SURFACE | | | | |
|---|---|---|---|---|
| | | sag | | |
| R | k | $\alpha_4$ | $\alpha_6$ | $\alpha_8$ | $\alpha_{10}$ |
| 24.000 | −0.800 | 3.93E−05 | 2.32E−10 | −2.29E−10 | 0.00E+00 |

| PROJECTOR LENS INCIDENT SURFACE |
|---|
| sag |
| R |
| 150.000 |

| PROJECTOR LENS OUTGOING SURFACE (DIFFRACTION GRATING REGION: WHOLE SURFACE) | | | | |
|---|---|---|---|---|
| | | sag | | |
| R | k | $\alpha_4$ | $\alpha_6$ | $\alpha_8$ | $\alpha_{10}$ |
| −19.490 | −0.731 | −1.56E−06 | 1.82E−09 | 3.55E−12 | 3.79E−15 |

| | | Φ | | |
|---|---|---|---|---|
| M | $\beta_2$ | $\beta_4$ | $\beta_6$ | $\beta_8$ | $\beta_{10}$ |
| 1.000 | −6.926 | −2.39E−03 | −5.71E−06 | 7.39E−09 | 0.00E+00 |

TABLE 19-continued

| PROJECTOR LENS FOCAL DISTANCE AND DIFFRACTION SURFACE FOCAL DISTANCE | | |
|---|---|---|
| f | $f_D$ | $f_D$/f/Abbe |
| 27.90 | 551.54 | 0.344 |

| | | σ VALUE | | |
|---|---|---|---|---|
| EVALUATION FUNCTION | h = 0 cm | h = 100 cm | h = 200 cm | h = 300 cm | TOTAL |
| σ (h)² | 0.0119 | 0.0092 | 0.0079 | 0.0050 | 0.0340 |

Example 14

Example 14 in which the low-temperature light source is used corresponds to Embodiment D.

Table 20 illustrates the specifications of the shade and projector lens and the evaluation function of Example 14.

Figure 36:
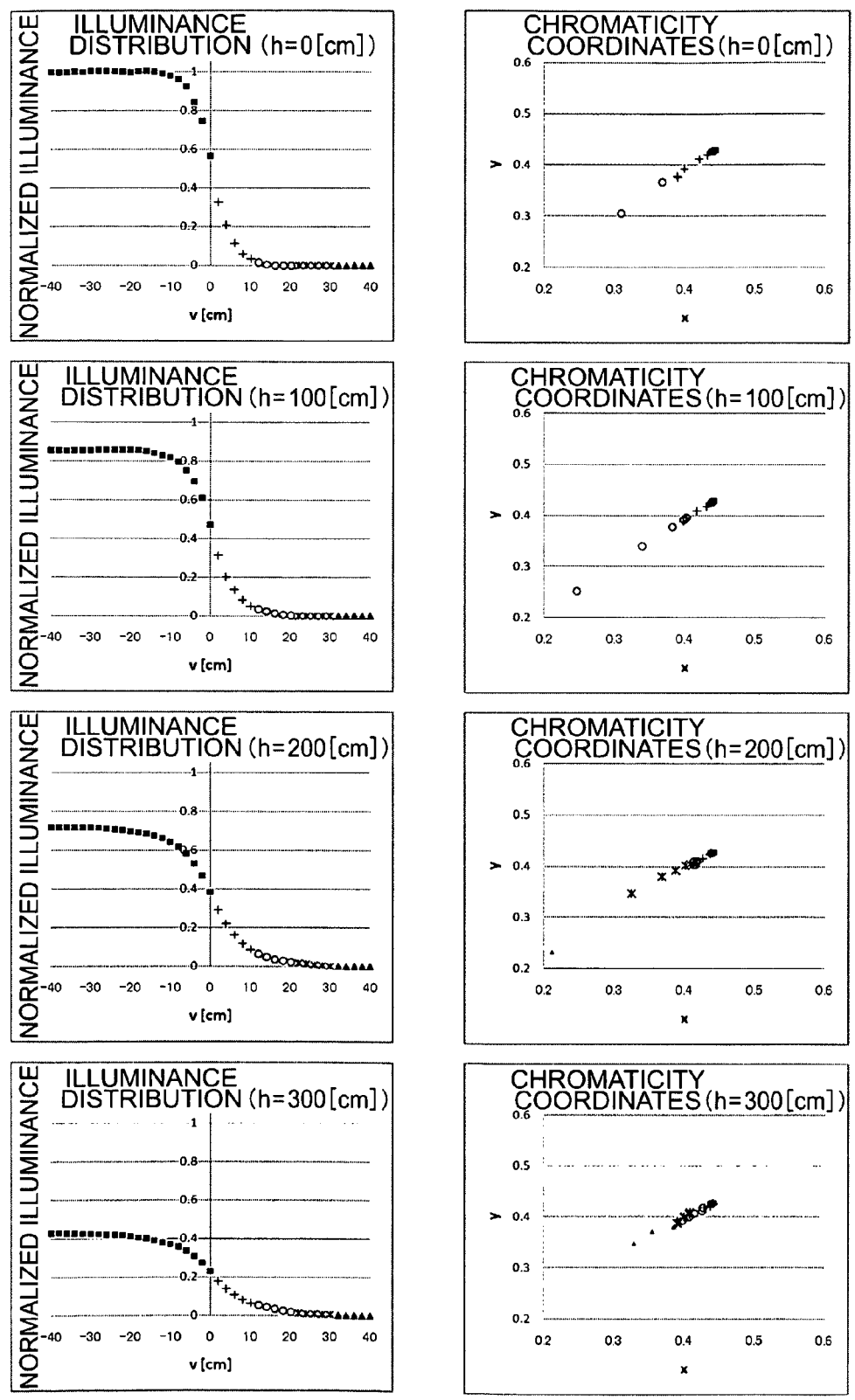
FIG. 36 illustrates light intensity distributions on the luminous intensity plane and distributions on the chromaticity coordinate plane of Example 14.

FIG. 36 illustrates light intensity distributions on the luminous intensity plane and distributions on the chromaticity coordinate plane of Example 14.

TABLE 20

| LENS DATA | |
|---|---|
| DISTANCE BETWEEN SHADE SURFACE AND SOURCE SIDE SURFACE OF PROJECTOR LENS [mm] | 25.40 |
| PROJECTOR LENS MATERIAL | PMMA |
| PROJECTOR LENS CENTER THICKNESS [mm] | 15.46 |
| PROJECTOR LENS EFFECTIVE DIAMETER [mm] | 40.00 |

| SHADE SURFACE | | | | |
|---|---|---|---|---|
| | | sag | | |
| R | k | $\alpha_4$ | $\alpha_6$ | $\alpha_8$ | $\alpha_{10}$ |
| 24.000 | −0.800 | 3.93E−05 | 2.32E−10 | −2.29E−10 | 0.00E+00 |

| PROJECTOR LENS INCIDENT SURFACE |
|---|
| sag |
| R |
| 150.000 |

| PROJECTOR LENS OUTGOING SURFACE | | | | |
|---|---|---|---|---|
| | | sag | | |
| R | k | $\alpha_4$ | $\alpha_6$ | $\alpha_8$ | $\alpha_{10}$ |
| −19.490 | −0.731 | −1.56E−06 | 1.82E−09 | 3.55E−12 | 3.79E−15 |

| | | Φ | | |
|---|---|---|---|---|
| M | $\beta_2$ | $\beta_4$ | $\beta_6$ | $\beta_8$ | $\beta_{10}$ |
| 1.000 | −6.926 | −2.39E−03 | −5.71E−06 | 7.39E−09 | 0.00E+00 |

| PROJECTOR LENS FOCAL DISTANCE AND DIFFRACTION SURFACE FOCAL DISTANCE | | |
|---|---|---|
| f | $f_D$ | $f_D$/f/Abbe |
| 27.90 | 551.54 | 0.344 |

TABLE 20-continued

| | σ VALUE | | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0058 | 0.0044 | 0.0033 | 0.0021 | 0.0155 |

Example 14A

Example 14A in which the intermediate-temperature light source is used corresponds to Embodiment B.

Table 20A illustrates the specifications of the shade and projector lens and the evaluation function of Example 14A.

Figure 69:
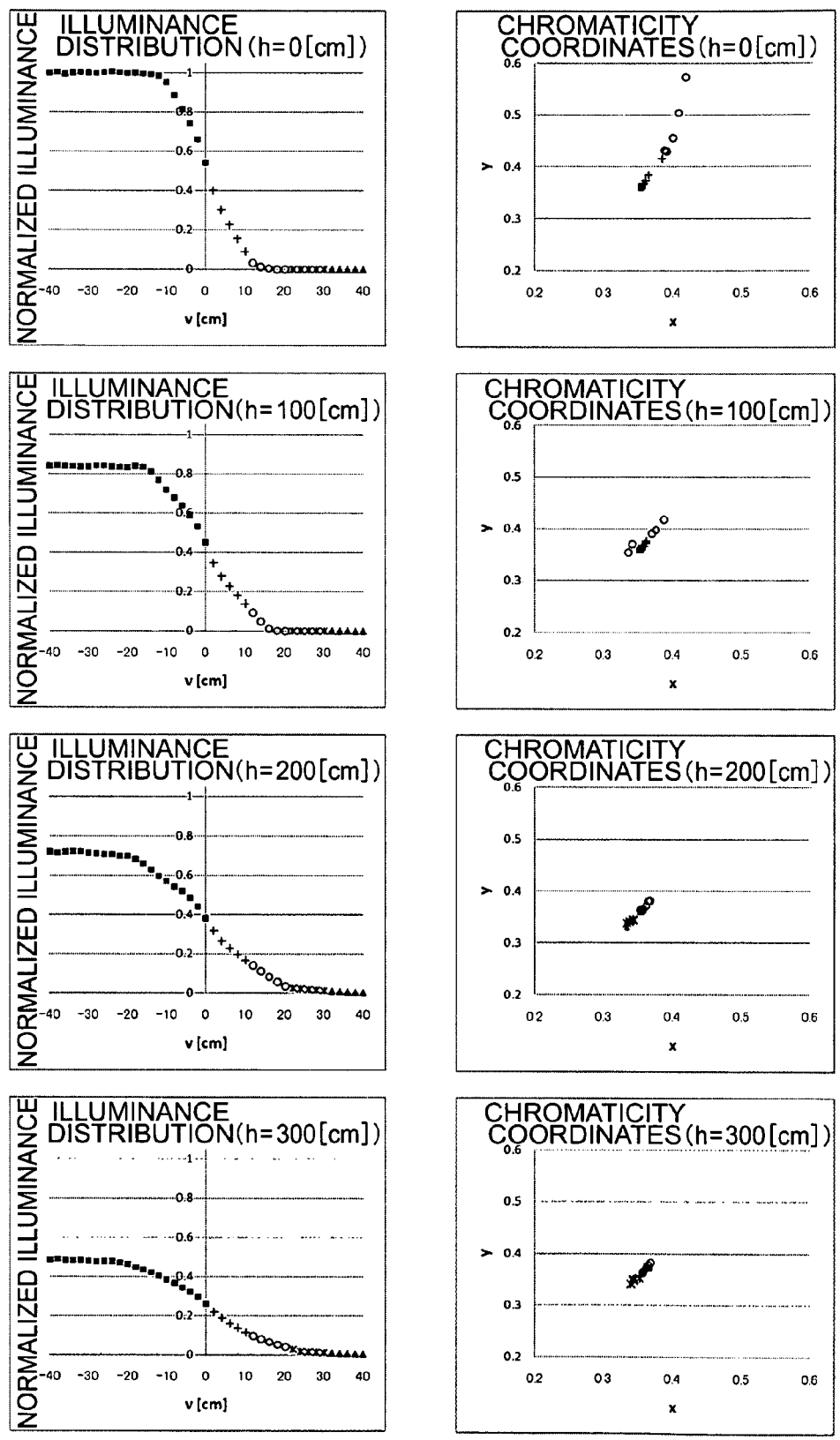
FIG. 69 illustrates light intensity distributions on the luminous intensity plane and distributions on the chromaticity coordinate plane of Example 14A.

FIG. 69 illustrates light intensity distributions on the luminous intensity plane and distributions on the chromaticity coordinate plane of Example 14A.

TABLE 20A

| LENS DATA | |
|---|---|
| DISTANCE BETWEEN SHADE SURFACE AND SOURCE SIDE SURFACE OF PROJECTOR LENS [mm] | 24.80 |
| PROJECTOR LENS MATERIAL | PMMA |
| PROJECTOR LENS CENTER THICKNESS [mm] | 15.32 |
| PROJECTOR LENS EFFECTIVE DIAMETER [mm] | 40.00 |

| SHADE SURFACE | | | | | |
|---|---|---|---|---|---|
| | | | sag | | |
| R | k | $\alpha_4$ | $\alpha_6$ | $\alpha_8$ | $\alpha_{10}$ |
| 34.000 | 0.000 | 1.38E−05 | 3.51E−08 | 1.43E−10 | −7.57E−13 |

| PROJECTOR LENS INCIDENT SURFACE |
|---|
| sag |
| R |
| 150.000 |

| PROJECTOR LENS OUTGOING SURFACE | | | | | |
|---|---|---|---|---|---|
| | | | sag | | |
| R | k | $\alpha_4$ | $\alpha_6$ | $\alpha_8$ | $\alpha_{10}$ |
| −19.668 | −0.531 | 1.61E−06 | 6.69E−09 | 1.16E−12 | 1.41E−14 |

| Φ | | | | |
|---|---|---|---|---|
| M | $\beta_2$ | $\beta_4$ | $\beta_6$ | $\beta_8$ |
| 1.000 | −8.332 | −2.44E−03 | −8.46E−06 | 1.13E−08 |

| PROJECTOR LENS FOCAL DISTANCE AND DIFFRACTION SURFACE FOCAL DISTANCE | | |
|---|---|---|
| f | $f_D$ | $f_D$/f/Abbe |
| 27.93 | 466.47 | 0.291 |

| | σ VALUE | | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0073 | 0.0048 | 0.0045 | 0.0033 | 0.0199 |

Example 14B

Example 14B in which the intermediate-temperature light source is used corresponds to Embodiment B.

Table 20B illustrates the specifications of the shade and projector lens and the evaluation function of Example 14B.

Figure 70:
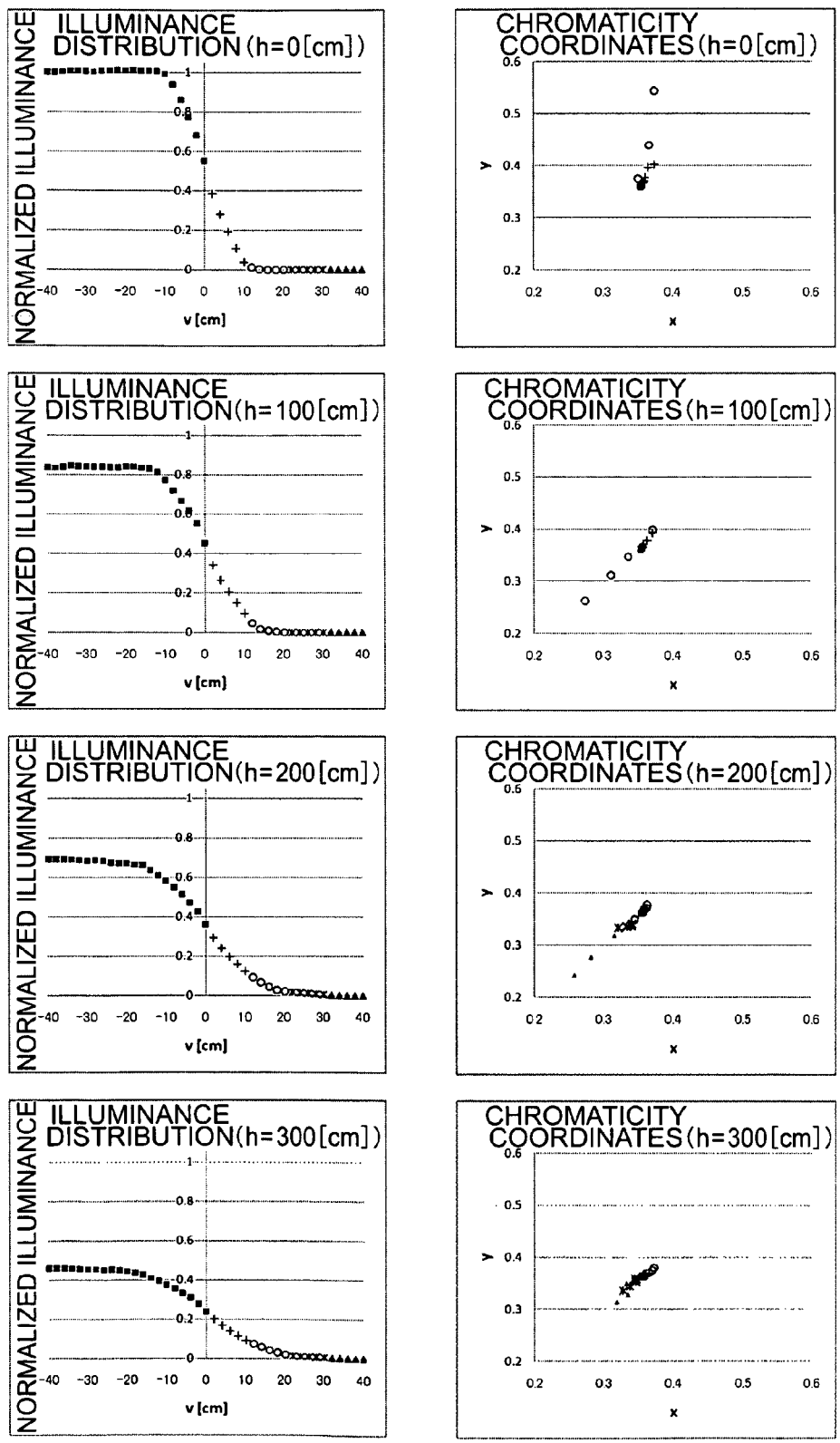
FIG. 70 illustrates light intensity distributions on the luminous intensity plane and distributions on the chromaticity coordinate plane of Example 14B.

FIG. 70 illustrates light intensity distributions on the luminous intensity plane and distributions on the chromaticity coordinate plane of Example 14B.

TABLE 20B

| LENS DATA | |
|---|---|
| DISTANCE BETWEEN SHADE SURFACE AND SOURCE SIDE SURFACE OF PROJECTOR LENS [mm] | 24.85 |
| PROJECTOR LENS MATERIAL | PMMA |
| PROJECTOR LENS CENTER THICKNESS [mm] | 15.30 |
| PROJECTOR LENS EFFECTIVE DIAMETER [mm] | 40.00 |

| SHADE SURFACE | | | | | |
|---|---|---|---|---|---|
| | | | sag | | |
| R | k | $\alpha_4$ | $\alpha_6$ | $\alpha_8$ | $\alpha_{10}$ |
| 37.000 | 0.000 | 1.13E−05 | 8.12E−08 | −1.79E−10 | 0.00E+00 |

| PROJECTOR LENS INCIDENT SURFACE |
|---|
| sag |
| R |
| 150.000 |

| PROJECTOR LENS OUTGOING SURFACE | | | | | |
|---|---|---|---|---|---|
| | | | sag | | |
| R | k | $\alpha_4$ | $\alpha_6$ | $\alpha_8$ | $\alpha_{10}$ |
| −19.684 | −0.559 | 1.40E−06 | 4.89E−09 | 3.39E−12 | 1.07E−14 |

TABLE 20B-continued

| | | Φ | | |
|---|---|---|---|---|
| M | $\beta_2$ | $\beta_4$ | $\beta_6$ | $\beta_8$ |
| 1.000 | −8.435 | −3.56E−03 | −3.82E−06 | 4.82E−09 |

| PROJECTOR LENS FOCAL DISTANCE AND DIFFRACTION SURFACE FOCAL DISTANCE | | |
|---|---|---|
| f | $f_D$ | $f_D$/f/Abbe |
| 27.95 | 499.48 | 0.311 |

| σ VALUE | | | | | |
|---|---|---|---|---|---|
| EVALUATION FUNCTION | h = 0 cm | h = 100 cm | h = 200 cm | h = 300 cm | TOTAL |
| σ(h)² | 0.0062 | 0.0053 | 0.0043 | 0.0030 | 0.0188 |

Example 14C

Example 14C in which the intermediate-temperature light source is used corresponds to Embodiment B.

Table 20B illustrates the specifications of the shade and projector lens and the evaluation function of Example 14C.

Figure 71:
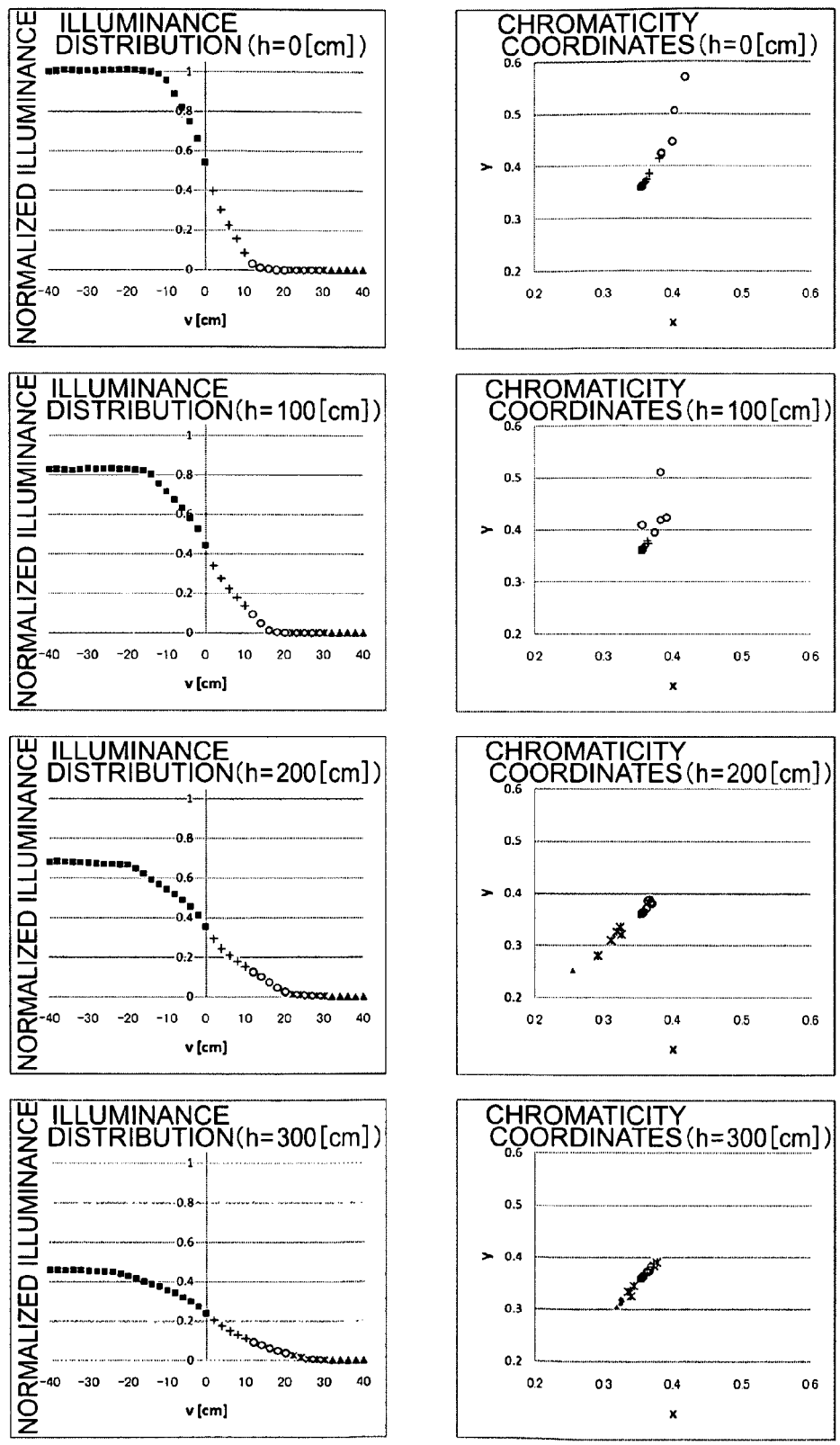
FIG. 71 illustrates light intensity distributions on the luminous intensity plane and distributions on the chromaticity coordinate plane of Example 14C.

FIG. 71 illustrates light intensity distributions on the luminous intensity plane and distributions on the chromaticity coordinate plane of Example 14C.

TABLE 20C

| LENS DATA | |
|---|---|
| DISTANCE BETWEEN SHADE SURFACE AND SOURCE SIDE SURFACE OF PROJECTOR LENS [mm] | 24.85 |
| PROJECTOR LENS MATERIAL | PMMA |
| PROJECTOR LENS CENTER THICKNESS [mm] | 15.32 |
| PROJECTOR LENS EFFECTIVE DIAMETER [mm] | 40.00 |

| SHADE SURFACE | | | | | |
|---|---|---|---|---|---|
| | | | sag | | |
| R | k | $\alpha_4$ | $\alpha_6$ | $\alpha_8$ | $\alpha_{10}$ |
| 33.500 | 0.000 | 1.14E−05 | 8.02E−08 | −1.74E−10 | 0.00E+00 |

| PROJECTOR LENS INCIDENT SURFACE |
|---|
| sag |
| R |
| 150.000 |

| PROJECTOR LENS OUTGOING SURFACE | | | | | |
|---|---|---|---|---|---|
| | | | sag | | |
| R | k | $\alpha_4$ | $\alpha_6$ | $\alpha_8$ | $\alpha_{10}$ |
| −19.670 | −0.561 | 1.23E−06 | 5.40E−09 | 2.66E−12 | 1.05E−14 |

| | | Φ | | |
|---|---|---|---|---|
| M | $\beta_2$ | $\beta_4$ | $\beta_6$ | $\beta_8$ |
| 1.000 | −8.328 | −2.81E−03 | −6.88E−06 | 9.11E−09 |

TABLE 20C-continued

PROJECTOR LENS FOCAL DISTANCE AND
DIFFRACTION SURFACE FOCAL DISTANCE

| f | $f_D$ | $f_D/f/\text{Abbe}$ |
|---|---|---|
| 27.95 | 462.74 | 0.288 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0070 | 0.0054 | 0.0047 | 0.0031 | 0.0202 |

Example 14D

Example 14D in which the intermediate-temperature light source is used corresponds to Embodiment E.

Table 20D illustrates the specifications of the shade and projector lens and the evaluation function of Example 14D.

Figure 72:
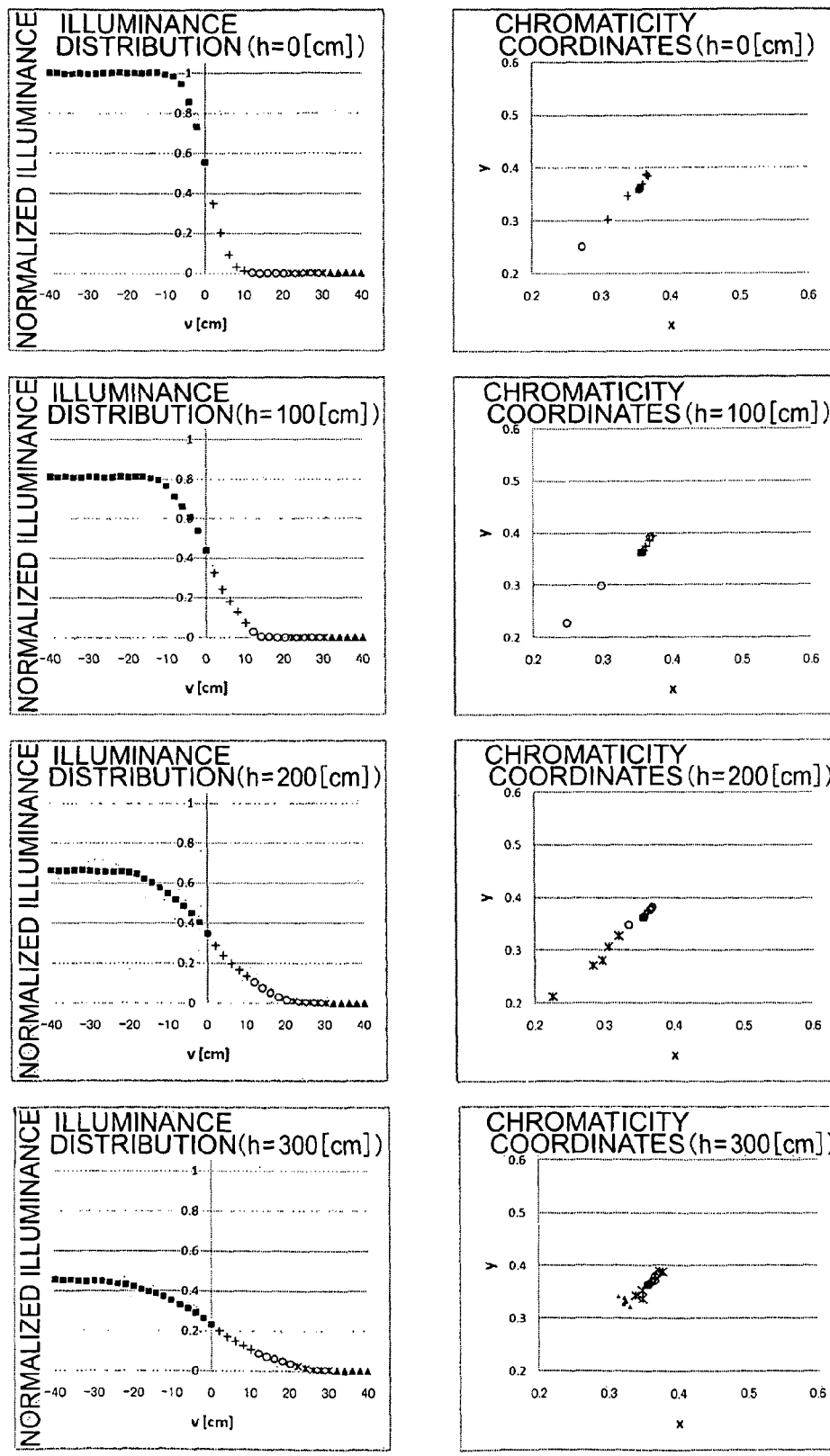
FIG. 72 illustrates light intensity distributions on the luminous intensity plane and distributions on the chromaticity coordinate plane of Example 14D.

FIG. 72 illustrates light intensity distributions on the luminous intensity plane and distributions on the chromaticity coordinate plane of Example 14D.

TABLE 20D

LENS DATA

| | |
|---|---|
| DISTANCE BETWEEN SHADE SURFACE AND SOURCE SIDE SURFACE OF PROJECTOR LENS [mm] | 25.40 |
| PROJECTOR LENS MATERIAL | PMMA |
| PROJECTOR LENS CENTER THICKNESS [mm] | 15.32 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 30.000 | 0.000 | 1.14E−05 | 8.02E−08 | −1.74E−10 | 0.00E+00 |

PROJECTOR LENS INCIDENT SURFACE sag

| R |
|---|
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −19.670 | −0.561 | 1.23E−06 | 5.40E−09 | 2.66E−12 | 1.05E−14 |

Φ

| M | $\beta_2$ | $\beta_4$ | $\beta_6$ | $\beta_8$ |
|---|---|---|---|---|
| 1.000 | −8.328 | −2.81E−03 | −6.88E−06 | 9.11E−09 |

PROJECTOR LENS FOCAL DISTANCE AND
DIFFRACTION SURFACE FOCAL DISTANCE

| f | $f_D$ | $f_D/f/\text{Abbe}$ |
|---|---|---|
| 27.95 | 462.74 | 0.288 |

TABLE 20D-continued

| | σ VALUE | | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0060 | 0.0049 | 0.0044 | 0.0031 | 0.0183 |

Comparative Example 1

Comparative Example 1 in which the intermediate-temperature light source is used is compared with the examples which correspond to Embodiment B.

Table 21 illustrates the specifications of the shade and projector lens and the evaluation function of Comparative Example 1.

Figure 37:
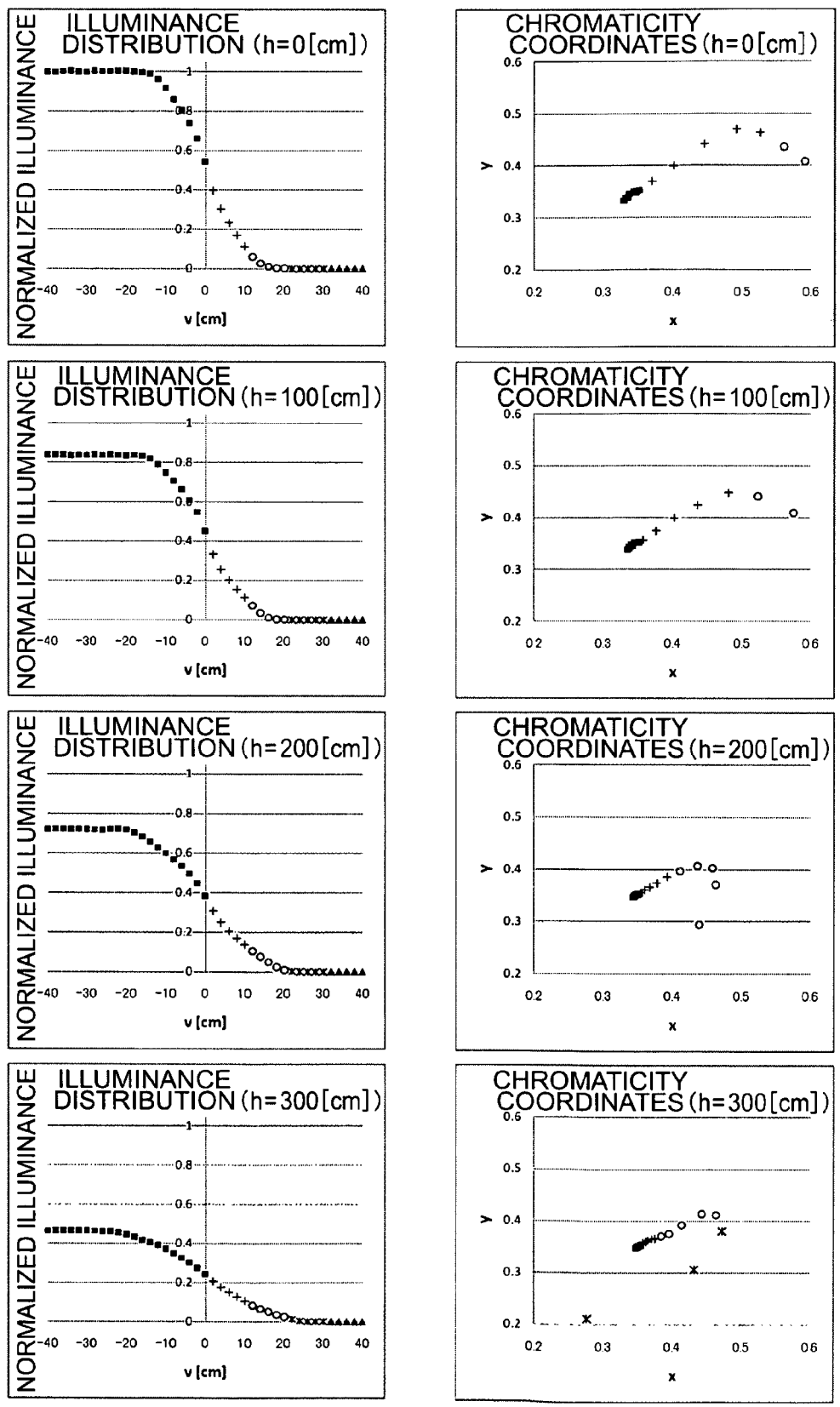
FIG. 37 illustrates light intensity distributions on the luminous intensity plane and distributions on the chromaticity coordinate plane of Comparative Example 1.

FIG. 37 illustrates light intensity distributions on the luminous intensity plane and distributions on the chromaticity coordinate plane of Comparative Example 1.

TABLE 21

| LENS DATA | |
|---|---|
| DISTANCE BETWEEN SHADE SURFACE AND SOURCE SIDE SURFACE OF PROJECTOR LENS [mm] | 24.20 |
| PROJECTOR LENS MATERIAL | PMMA |
| PROJECTOR LENS CENTER THICKNESS [mm] | 16.06 |
| PROJECTOR LENS EFFECTIVE DIAMETER [mm] | 40.00 |

| SHADE SURFACE | | | | | |
|---|---|---|---|---|---|
| | | | sag | | |
| R | k | $\alpha_4$ | $\alpha_6$ | $\alpha_8$ | $\alpha_{10}$ |
| 32.000 | −0.388 | 6.94E−05 | 6.51E−08 | −5.85E−10 | 0.00E+00 |

| PROJECTOR LENS INCIDENT SURFACE |
|---|
| sag |
| R |
| 150.000 |

| PROJECTOR LENS OUTGOING SURFACE | | | | | |
|---|---|---|---|---|---|
| | | | sag | | |
| R | k | $\alpha_4$ | $\alpha_6$ | $\alpha_8$ | $\alpha_{10}$ |
| −18.799 | −0.713 | −2.07E−06 | 4.90E−09 | −9.17E−12 | 2.10E−14 |

| Φ | | | | | |
|---|---|---|---|---|---|
| M | $\beta_2$ | $\beta_4$ | $\beta_6$ | $\beta_8$ | $\beta_{10}$ |
| — | — | — | — | — | — |

| | σ VALUE | | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0489 | 0.0257 | 0.0075 | 0.0044 | 0.0864 |

Comparative Example 2

Comparative Example 1 in which the intermediate-temperature light source is used is compared with the examples which correspond to Embodiment E.

Table 22 illustrates the specifications of the shade and projector lens and the evaluation function of Comparative Example 2.

Figure 38:
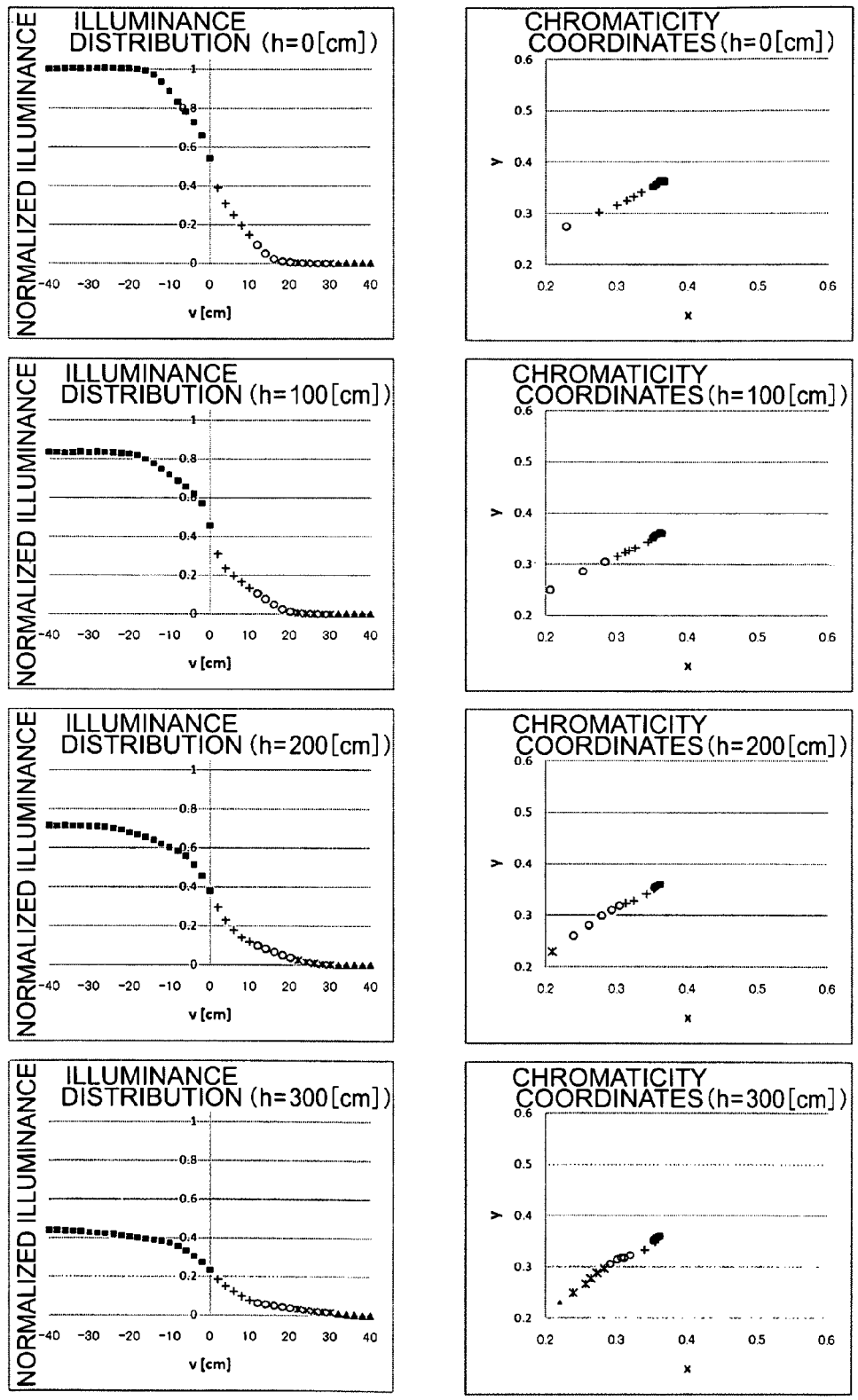
FIG. 38 illustrates light intensity distributions on the luminous intensity plane and distributions on the chromaticity coordinate plane of Comparative Example 2.

FIG. 38 illustrates light intensity distributions on the luminous intensity plane and distributions on the chromaticity coordinate plane of Comparative Example 2.

TABLE 22

| LENS DATA | |
|---|---|
| DISTANCE BETWEEN SHADE SURFACE AND SOURCE SIDE SURFACE OF PROJECTOR LENS [mm] | 25.60 |
| PROJECTOR LENS MATERIAL | PMMA |
| PROJECTOR LENS CENTER THICKNESS [mm] | 16.06 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 32.000 | −0.388 | 6.94E−05 | 6.51E−08 | −5.85E−10 | 0.00E+00 |

PROJECTOR LENS INCIDENT SURFACE sag

| R |
|---|
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −18.799 | −0.713 | −2.07E−06 | 4.90E−09 | −9.17E−12 | 2.10E−14 |

Φ

| M | $\beta_2$ | $\beta_4$ | $\beta_6$ | $\beta_8$ | $\beta_{10}$ |
|---|---|---|---|---|---|
| — | — | — | — | — | — |

σ VALUE

| EVALUATION FUNCTION | h = 0 cm | h = 100 cm | h = 200 cm | h = 300 cm | TOTAL |
|---|---|---|---|---|---|
| σ (h)² | 0.0292 | 0.0205 | 0.0149 | 0.0087 | 0.0733 |

Comparative Example 3

Comparative Example 3 in which the low-temperature light source is used is compared with the examples which correspond to Embodiment A.

Table 23 illustrates the specifications of the shade and projector lens and the evaluation function of Comparative Example 3.

Figure 39:
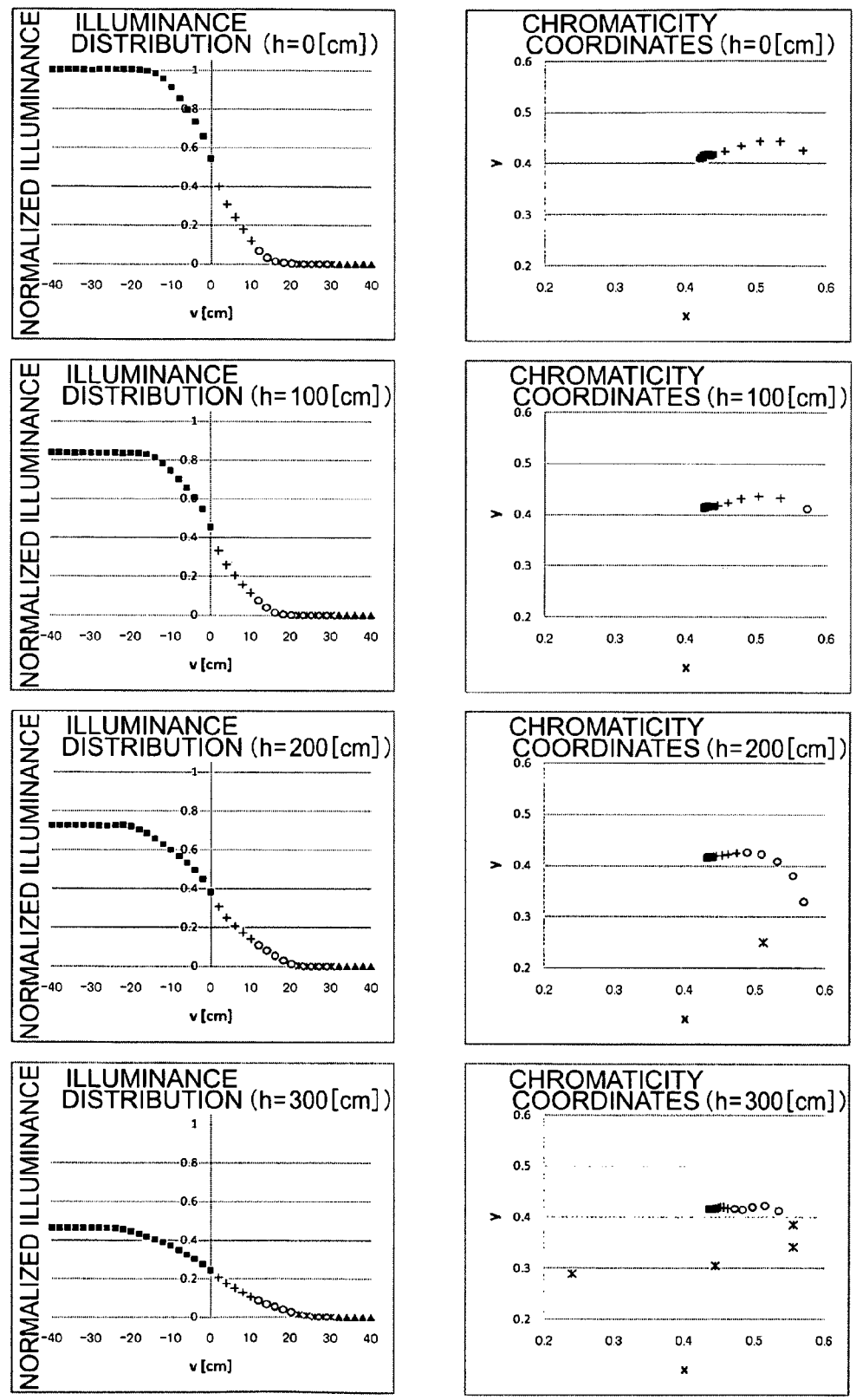
FIG. 39 illustrates light intensity distributions on the luminous intensity plane and distributions on the chromaticity coordinate plane of Comparative Example 3.

FIG. 39 illustrates light intensity distributions on the luminous intensity plane and distributions on the chromaticity coordinate plane of Comparative Example 3.

TABLE 23

LENS DATA

| | |
|---|---|
| DISTANCE BETWEEN SHADE SURFACE AND SOURCE SIDE SURFACE OF PROJECTOR LENS [mm] | 24.20 |
| PROJECTOR LENS MATERIAL | PMMA |
| PROJECTOR LENS CENTER THICKNESS [mm] | 16.06 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 32.000 | −0.388 | 6.94E−05 | 6.51E−08 | −5.85E−10 | 0.00E+00 |

PROJECTOR LENS INCIDENT SURFACE sag

| R |
|---|
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −18.799 | −0.713 | −2.07E−06 | 4.90E−09 | −9.17E−12 | 2.10E−14 |

Φ

| M | $\beta_2$ | $\beta_4$ | $\beta_6$ | $\beta_8$ | $\beta_{10}$ |
|---|---|---|---|---|---|
| — | — | — | — | — | — |

σ VALUE

| EVALUATION FUNCTION | h = 0 cm | h = 100 cm | h = 200 cm | h = 300 cm | TOTAL |
|---|---|---|---|---|---|
| σ(h)² | 0.0224 | 0.0139 | 0.0051 | 0.0030 | 0.0444 |

Comparative Example 4

Comparative Example 4 in which the low-temperature light source is used is compared with the examples which correspond to Embodiment D.

Table 24 illustrates the specifications of the shade and projector lens and the evaluation function of Comparative Example 4.

Figure 40:
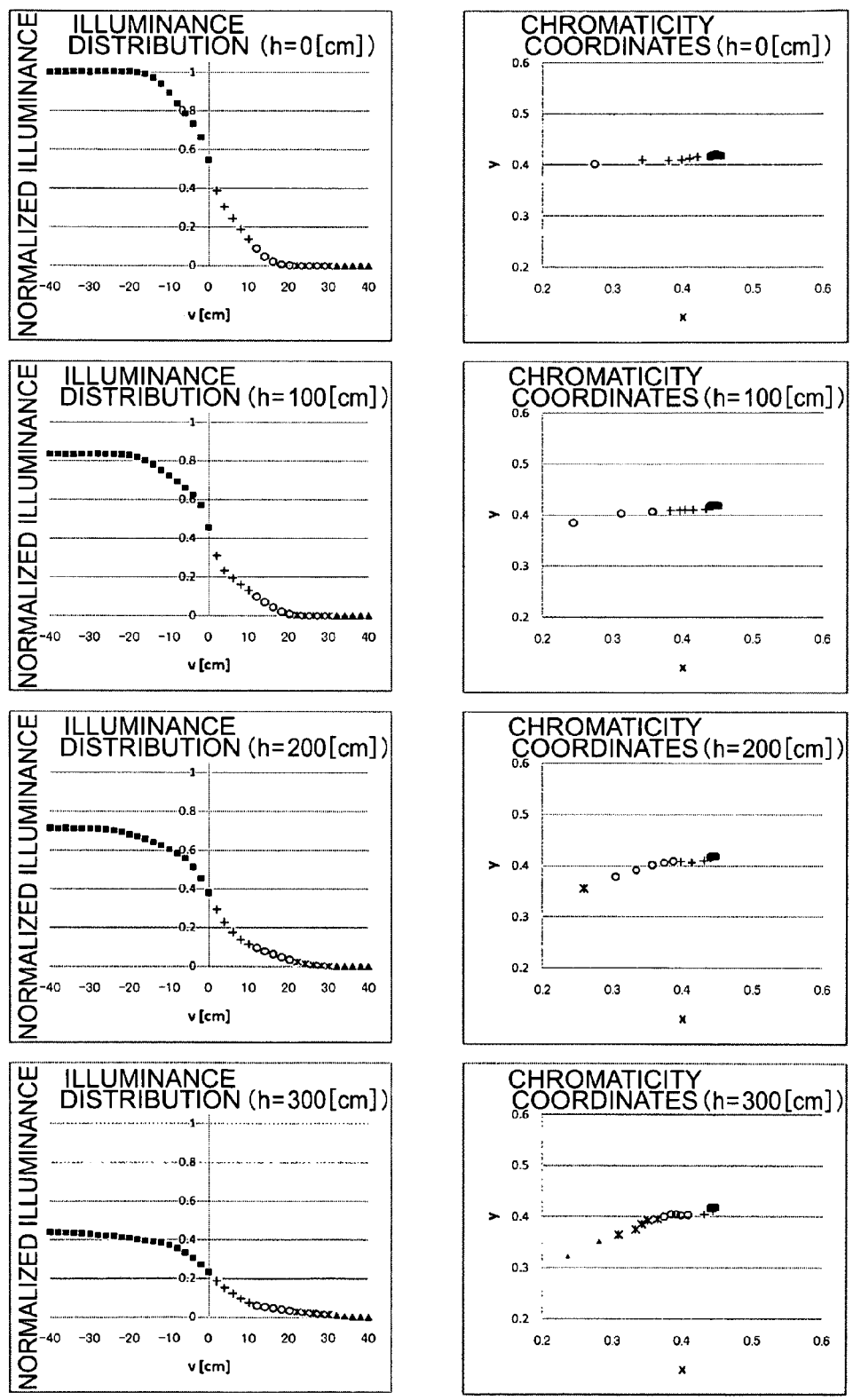
FIG. 40 illustrates light intensity distributions on the luminous intensity plane and distributions on the chromaticity coordinate plane of Comparative Example 4.

FIG. 40 illustrates light intensity distributions on the luminous intensity plane and distributions on the chromaticity coordinate plane of Comparative Example 4.

TABLE 24

LENS DATA

| | |
|---|---|
| DISTANCE BETWEEN SHADE SURFACE AND SOURCE SIDE SURFACE OF PROJECTOR LENS [mm] | 25.60 |
| PROJECTOR LENS MATERIAL | PMMA |
| PROJECTOR LENS CENTER THICKNESS [mm] | 16.06 |
| PROJECTOR LENS EFFECTIVE DIAMETER [mm] | 40.00 |

SHADE SURFACE sag

| R | k | $\alpha_4$ | $\alpha_6$ | $\alpha_8$ | $\alpha_{10}$ |
|---|---|---|---|---|---|
| 32.000 | −0.388 | 6.94E−05 | 6.51E−08 | −5.85E−10 | 0.00E+00 |

TABLE 24-continued

| PROJECTOR LENS INCIDENT SURFACE | | | | | |
|---|---|---|---|---|---|
| sag | | | | | |
| R | | | | | |
| 150.000 | | | | | |

| PROJECTOR LENS OUTGOING SURFACE | | | | | |
|---|---|---|---|---|---|
| sag | | | | | |
| R | k | $\alpha_4$ | $\alpha_6$ | $\alpha_8$ | $\alpha_{10}$ |
| −18.799 | −0.713 | −2.07E−06 | 4.90E−09 | −9.17E−12 | 2.10E−14 |
| $\Phi$ | | | | | |
| M | $\beta_2$ | $\beta_4$ | $\beta_6$ | $\beta_8$ | $\beta_{10}$ |
| — | — | — | — | — | — |

| $\sigma$ VALUE | | | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0285 | 0.0196 | 0.0126 | 0.0066 | 0.0673 |

Comparative Example 5

Comparative Example 5 in which the high-temperature light source is used is compared with the examples which correspond to Embodiment C.

Table 25 illustrates the specifications of the shade and projector lens and the evaluation function of Comparative Example 5.

Figure 41:
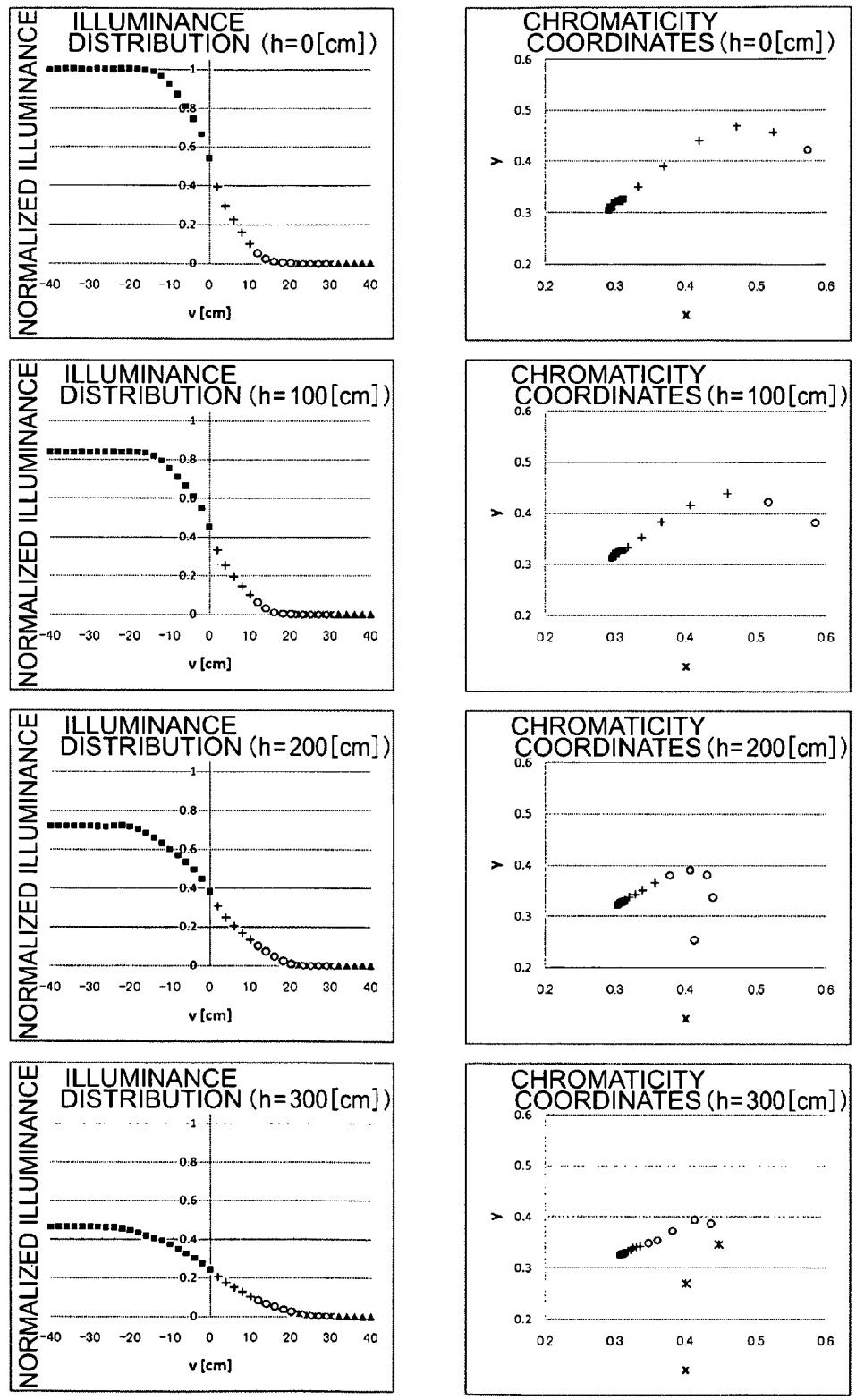
FIG. 41 illustrates light intensity distributions on the luminous intensity plane and distributions on the chromaticity coordinate plane of Comparative Example 5.

FIG. 41 illustrates light intensity distributions on the luminous intensity plane and distributions on the chromaticity coordinate plane of Comparative Example 5.

TABLE 25

| LENS DATA | |
|---|---|
| DISTANCE BETWEEN SHADE SURFACE AND SOURCE SIDE SURFACE OF PROJECTOR LENS [mm] | 24.20 |
| PROJECTOR LENS MATERIAL | PMMA |
| PROJECTOR LENS CENTER THICKNESS [mm] | 16.06 |
| PROJECTOR LENS EFFECTIVE DIAMETER [mm] | 40.00 |

| SHADE SURFACE | | | | | |
|---|---|---|---|---|---|
| sag | | | | | |
| R | k | $\alpha_4$ | $\alpha_6$ | $\alpha_8$ | $\alpha_{10}$ |
| 32.000 | −0.388 | 6.94E−05 | 6.51E−08 | −5.85E−10 | 0.00E+00 |

| PROJECTOR LENS INCIDENT SURFACE | | | | | |
|---|---|---|---|---|---|
| sag | | | | | |
| R | | | | | |
| 150.000 | | | | | |

| PROJECTOR LENS OUTGOING SURFACE | | | | | |
|---|---|---|---|---|---|
| sag | | | | | |
| R | k | $\alpha_4$ | $\alpha_6$ | $\alpha_8$ | $\alpha_{10}$ |
| −18.799 | −0.713 | −2.07E−06 | 4.90E−09 | −9.17E−12 | 2.10E−14 |

TABLE 25-continued

| | | Φ | | | |
|---|---|---|---|---|---|
| M | $\beta_2$ | $\beta_4$ | $\beta_6$ | $\beta_8$ | $\beta_{10}$ |
| — | — | — | — | — | — |

| σ VALUE | | | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0641 | 0.0319 | 0.0087 | 0.0049 | 0.1097 |

Comparative Example 6

Comparative Example 6 in which the high-temperature light source is used is compared with the examples which correspond to Embodiment F.

Table 26 illustrates the specifications of the shade and projector lens and the evaluation function of Comparative Example 6.

Figure 42:
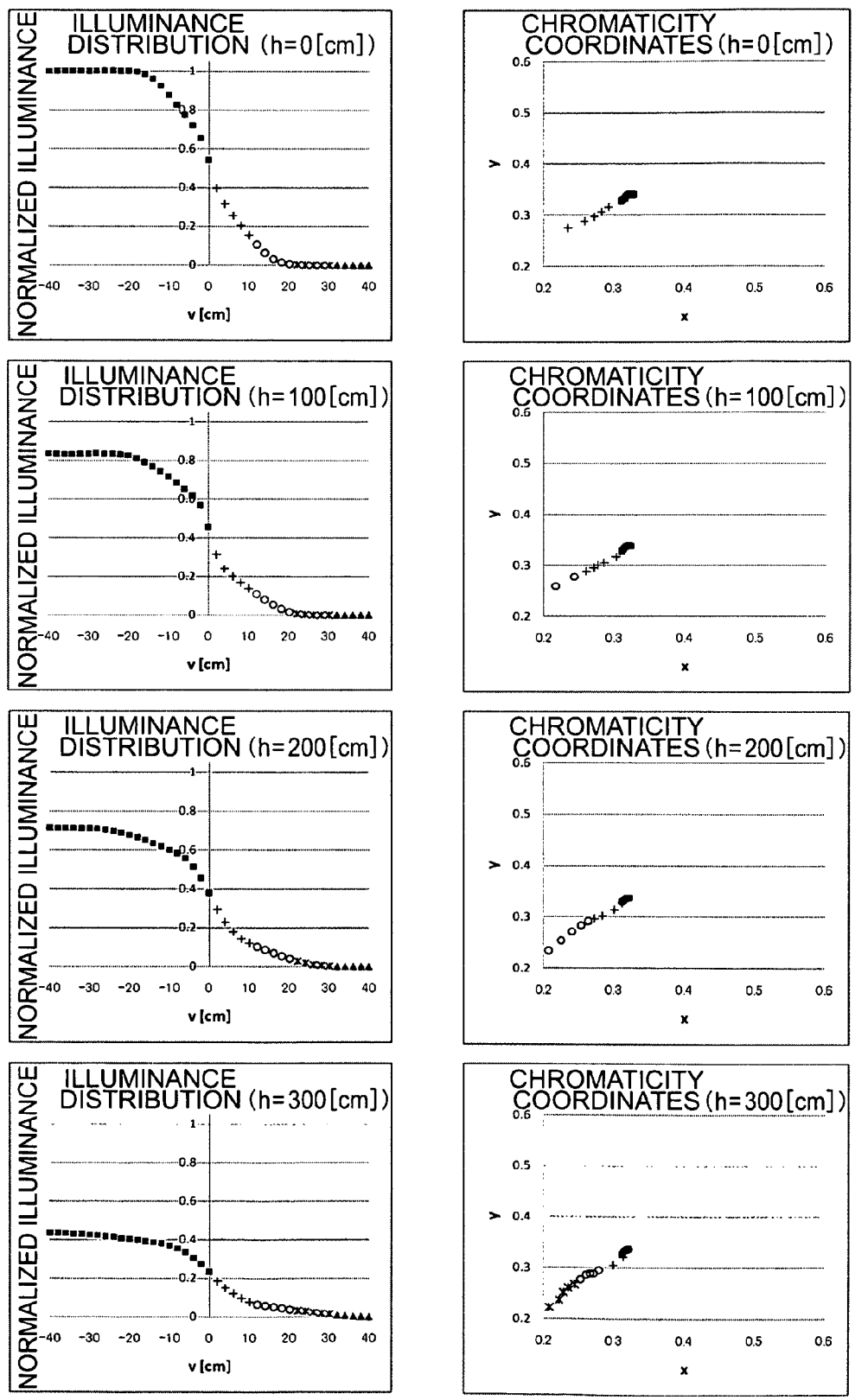
FIG. 42 illustrates light intensity distributions on the luminous intensity plane and distributions on the chromaticity coordinate plane of Comparative Example 6.

FIG. 42 illustrates light intensity distributions on the luminous intensity plane and distributions on the chromaticity coordinate plane of Comparative Example 6.

Evaluation of Examples

When the evaluation functions (total) of Examples 7 and 9 corresponding to Embodiment A are compared to the evaluation function (total) of Comparative Example 3, the evaluation functions of Examples 7 and 9 are lower than 30% of that of Comparative Example 3, and the evaluation functions of Examples 7 and 9 are sufficiently reduced.

When the evaluation functions (total) of Examples 1, 3, 4, 6, 14A, 14B and 14C corresponding to Embodiment B are compared to the evaluation function (total) of Comparative

TABLE 26

| LENS DATA | |
|---|---|
| DISTANCE BETWEEN SHADE SURFACE AND SOURCE SIDE SURFACE OF PROJECTOR LENS [mm] | 25.60 |
| PROJECTOR LENS MATERIAL | PMMA |
| PROJECTOR LENS CENTER THICKNESS [mm] | 16.06 |
| PROJECTOR LENS EFFECTIVE DIAMETER [mm] | 40.00 |

| SHADE SURFACE | | | | | |
|---|---|---|---|---|---|
| | | sag | | | |
| R | k | $\alpha_4$ | $\alpha_6$ | $\alpha_8$ | $\alpha_{10}$ |
| 32.000 | −0.388 | 6.94E−05 | 6.51E−08 | −5.85E−10 | 0.00E+00 |

| PROJECTOR LENS INCIDENT SURFACE |
|---|
| sag |
| R |
| 150.000 |

| PROJECTOR LENS OUTGOING SURFACE | | | | | |
|---|---|---|---|---|---|
| | | sag | | | |
| R | k | $\alpha_4$ | $\alpha_6$ | $\alpha_8$ | $\alpha_{10}$ |
| −18.799 | −0.713 | −2.07E−06 | 4.90E−09 | −9.17E−12 | 2.10E−14 |

| | | Φ | | | |
|---|---|---|---|---|---|
| M | $\beta_2$ | $\beta_4$ | $\beta_6$ | $\beta_8$ | $\beta_{10}$ |
| — | — | — | — | — | — |

| σ VALUE | | | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0304 | 0.0214 | 0.0156 | 0.0093 | 0.0767 |

Example 1, the evaluation functions of Examples 1, 3, 4, 6, 14A, 14B and 14C are lower than 25% of that of Comparative Example 1, and the evaluation functions of Examples 1, 3, 4, 6, 14A, 14B and 14C are sufficiently reduced.

When the evaluation functions (total) of Examples 11 and 13 corresponding to Embodiment C is compared to the evaluation function (total) of Comparative Example 5, the evaluation functions of Examples 11 and 13 are lower than 45% of that of Comparative Example 5, and the evaluation functions of Examples 11 and 13 are sufficiently reduced.

When the evaluation functions (total) of Examples 12 and 14 corresponding to Embodiment D are compared to the evaluation function (total) of Comparative Example 4, the evaluation functions of Examples 12 and 14 are lower than 25% of that of Comparative Example 4, and the evaluation functions of Examples 12 and 14 are sufficiently reduced.

When the evaluation functions (total) of Examples 2, 5 and 14D corresponding to Embodiment E are compared to the evaluation function (total) of Comparative Example 2, the evaluation functions of Examples 2, 5 and 14D are lower than 30% of that of Comparative Example 2, and the evaluation functions of Examples 2, 5 and 14D are sufficiently reduced.

When the evaluation functions (total) of Examples 8 and 10 corresponding to Embodiment F are compared to the evaluation function (total) of Comparative Example 6, the evaluation functions of Examples 8 and 10 are lower than 25% of that of Comparative Example 6, and the evaluation functions of Examples 8 and 10 are sufficiently reduced.

Thus, according to the embodiments of the invention, the color separation can largely reduced in consideration of the characteristic of the light source.

In Examples 15 to 34 and Comparative Examples 7 to 12 given below material of the lens is polycarbonate resin. In the description below PC indicates polycarbonate resin. Abbe number of the polycarbonate resin used in the examples is 29.30.

Example 15

Example 15 in which the intermediate-temperature light source is used corresponds to Embodiment B.

Table 27 illustrates the specifications of the shade and projector lens and the evaluation function of Example 15.

Figure 43:
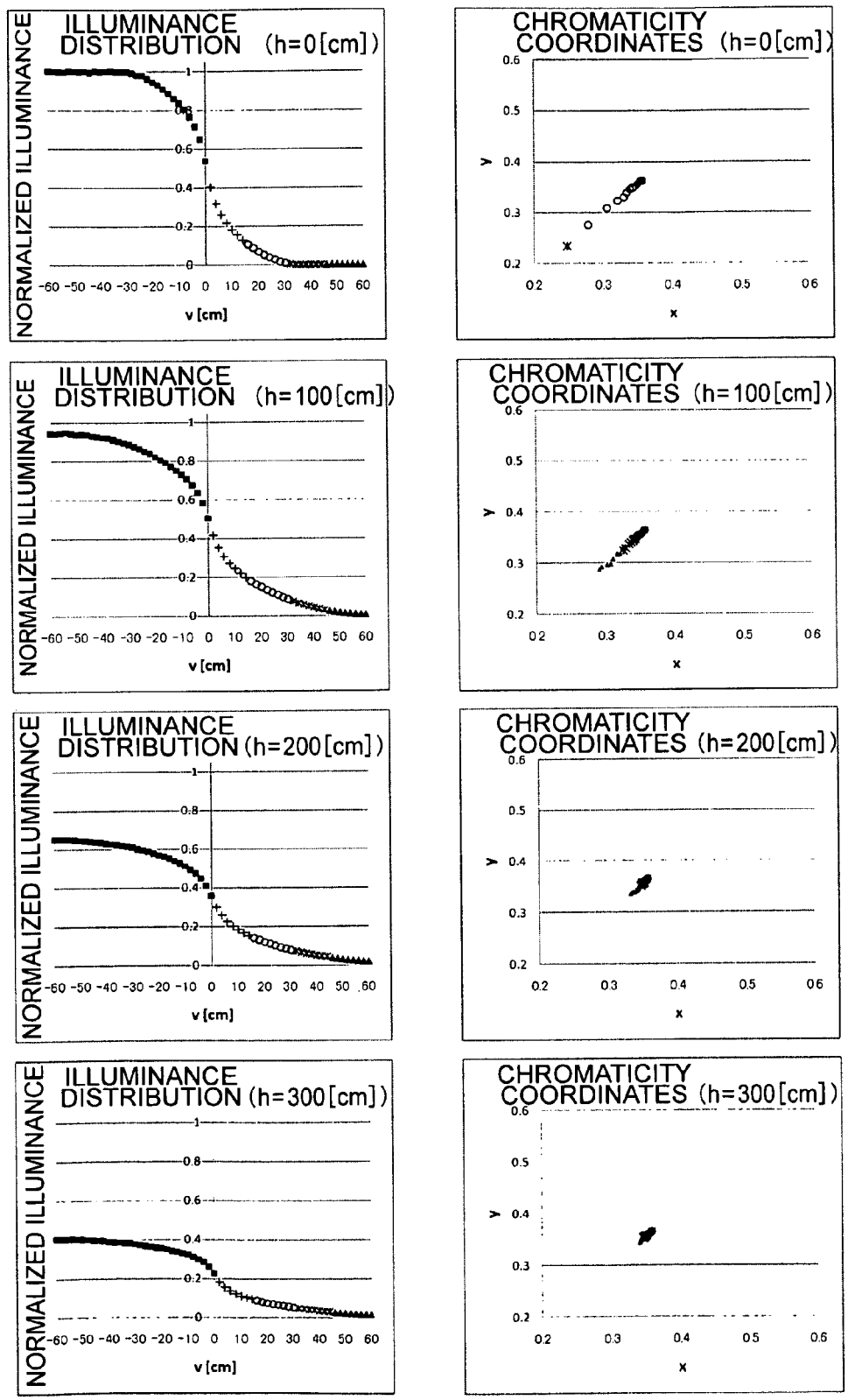
FIG. 43 illustrates light intensity distributions on the luminous intensity plane and distributions on the chromaticity coordinate plane of Example 15.

FIG. 43 illustrates light intensity distributions on the luminous intensity plane and distributions on the chromaticity coordinate plane of Example 15.

TABLE 27

| LENS DATA | |
|---|---|
| DISTANCE BETWEEN SHADE SURFACE AND SOURCE SIDE SURFACE OF PROJECTOR LENS [mm] | 25.18 |
| PROJECTOR LENS MATERIAL | PC |
| PROJECTOR LENS CENTER THICKNESS [mm] | 12.85 |
| PROJECTOR LENS EFFECTIVE DIAMETER [mm] | 40.00 |

| SHADE SURFACE | | | | |
|---|---|---|---|---|
| | | sag | | |
| R | k | $\alpha_4$ | $\alpha_6$ | $\alpha_8$ |
| 24.000 | 0.000 | 2.72E−05 | 1.94E−08 | −3.49E−10 |

| PROJECTOR LENS INCIDENT SURFACE |
|---|
| sag |
| R |
| 150.000 |

| PROJECTOR LENS OUTGOING SURFACE | | | | |
|---|---|---|---|---|
| | | sag | | |
| R | k | $\alpha_4$ | $\alpha_6$ | $\alpha_8$ | $\alpha_{10}$ |
| −23.695 | −0.563 | 2.00E−06 | 4.96E−09 | 5.88E−12 | −7.44E−15 |

| $\Phi$ | | | | |
|---|---|---|---|---|
| M | $\beta_2$ | $\beta_4$ | $\beta_6$ | $\beta_8$ |
| 1.000 | −16.117 | −1.85E−03 | −1.78E−05 | 2.91E−08 |

| PROJECTOR LENS FOCAL DISTANCE AND DIFFRACTION SURFACE FOCAL DISTANCE | | |
|---|---|---|
| f | $f_D$ | $f_D/f$/Abbe |
| 27.96 | 285.38 | 0.348 |

TABLE 27-continued

| | | σ VALUE | | | |
|---|---|---|---|---|---|
| EVALUATION FUNCTION | h = 0 cm | h = 100 cm | h = 200 cm | h = 300 cm | TOTAL |
| σ(h)² | 0.0071 | 0.0092 | 0.0067 | 0.0045 | 0.0276 |

Example 16

Example 16 in which the intermediate-temperature light source is used corresponds to Embodiment B.

Table 28 illustrates the specifications of the shade and projector lens and the evaluation function of Example 16.

Figure 44:
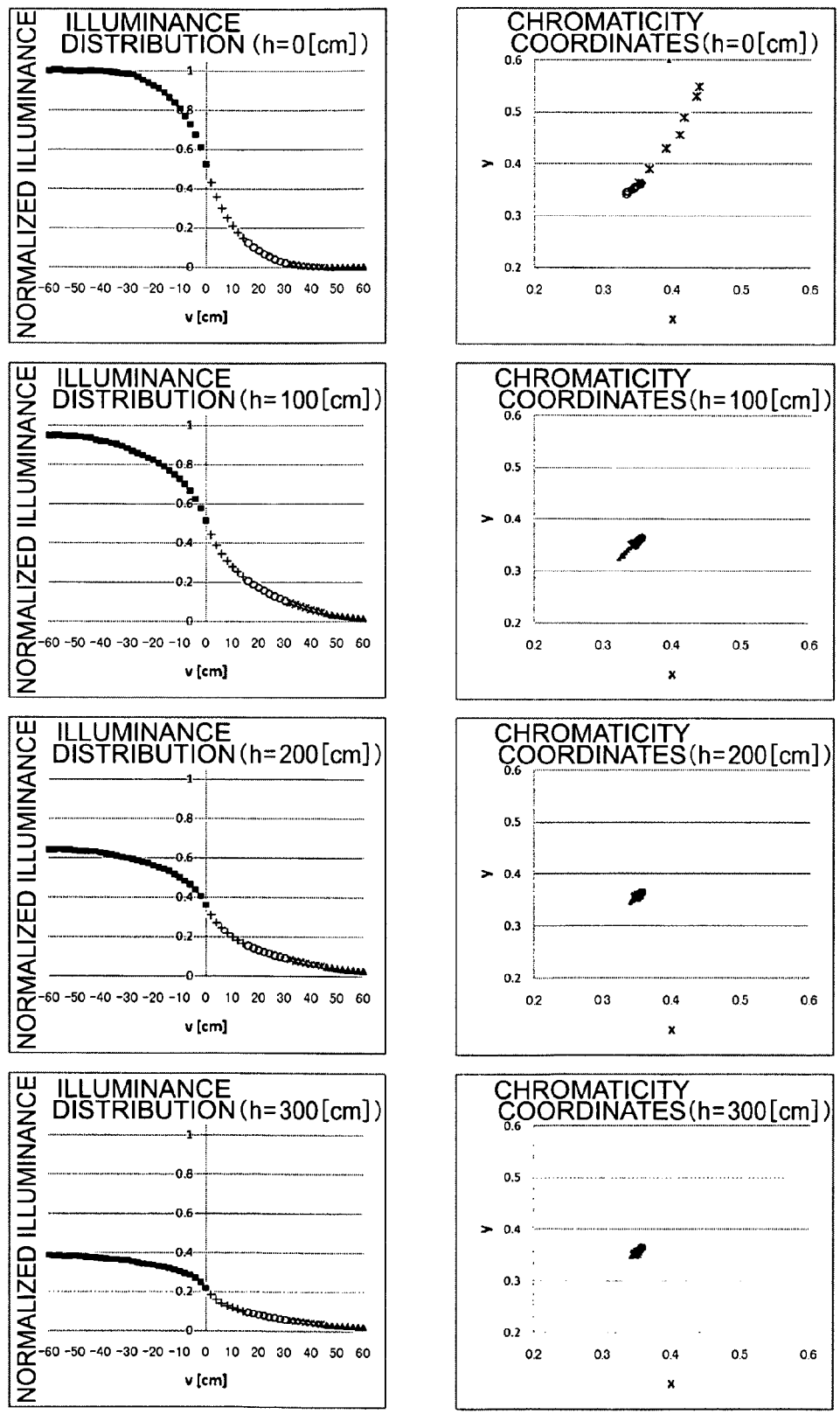
FIG. 44 illustrates light intensity distributions on the luminous intensity plane and distributions on the chromaticity coordinate plane of Example 16.

FIG. 44 illustrates light intensity distributions on the luminous intensity plane and distributions on the chromaticity coordinate plane of Example 16.

Example 17

Example 17 in which the intermediate-temperature light source is used corresponds to Embodiment E.

Table 29 illustrates the specifications of the shade and projector lens and the evaluation function of Example 17.

Figure 45:
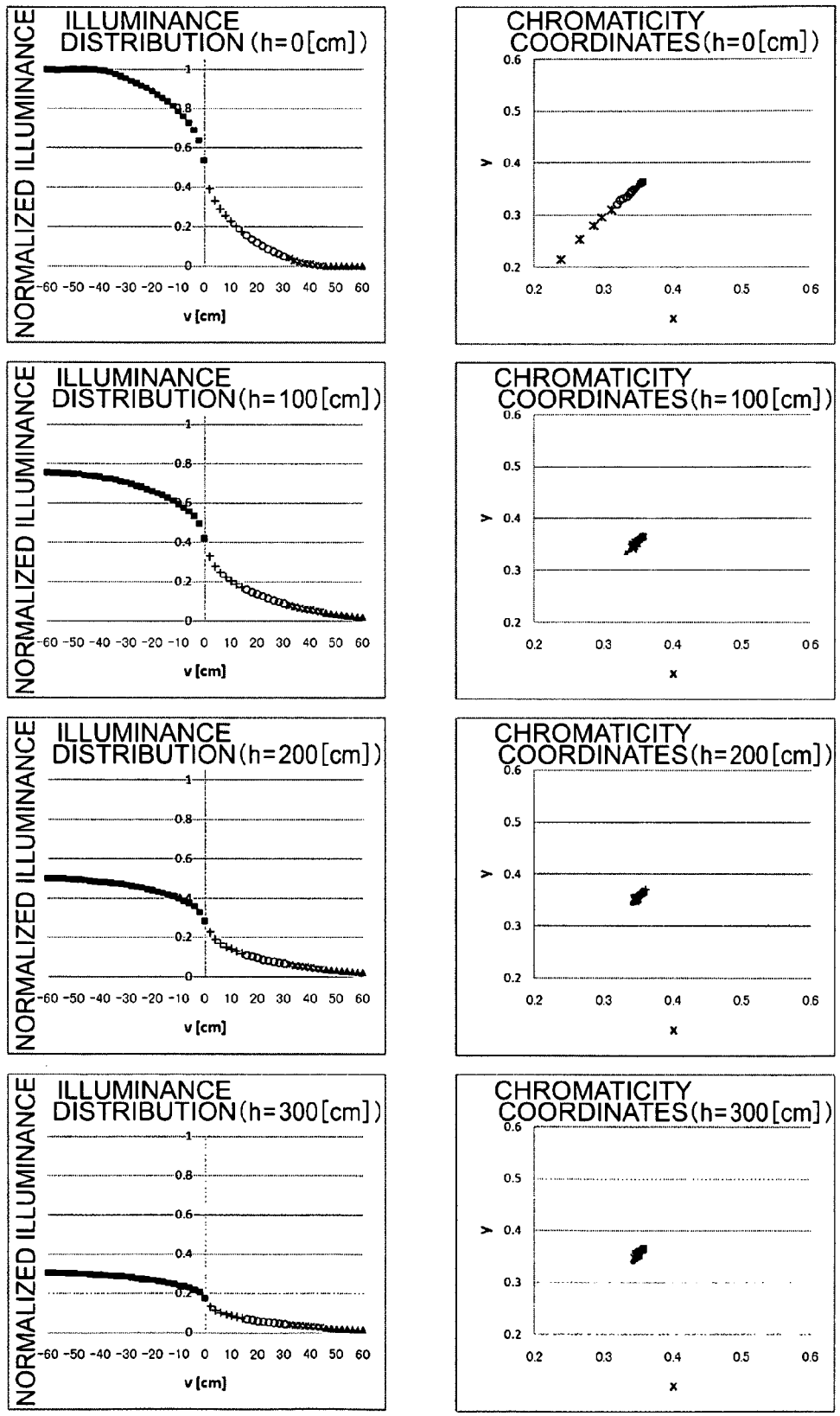
FIG. 45 illustrates light intensity distributions on the luminous intensity plane and distributions on the chromaticity coordinate plane of Example 17.

FIG. 45 illustrates light intensity distributions on the luminous intensity plane and distributions on the chromaticity coordinate plane of Example 17.

TABLE 28

| LENS DATA | |
|---|---|
| DISTANCE BETWEEN SHADE SURFACE AND SOURCE SIDE SURFACE OF PROJECTOR LENS [mm] | 24.40 |
| PROJECTOR LENS MATERIAL | PC |
| PROJECTOR LENS CENTER THICKNESS [mm] | 12.85 |
| PROJECTOR LENS EFFECTIVE DIAMETER [mm] | 40.00 |

| SHADE SURFACE | | | | |
|---|---|---|---|---|
| | | sag | | |
| R | k | $\alpha_4$ | $\alpha_6$ | $\alpha_8$ |
| 27.000 | 0.000 | 2.72E−05 | 1.94E−08 | −3.49E−10 |

| PROJECTOR LENS INCIDENT SURFACE |
|---|
| sag |
| R |
| 150.000 |

| PROJECTOR LENS OUTGOING SURFACE | | | | | |
|---|---|---|---|---|---|
| | | sag | | | |
| R | k | $\alpha_4$ | $\alpha_6$ | $\alpha_8$ | $\alpha_{10}$ |
| −23.695 | −0.563 | 2.00E−06 | 4.96E−09 | 5.88E−12 | −7.44E−15 |

| Φ | | | | |
|---|---|---|---|---|
| M | $\beta_2$ | $\beta_4$ | $\beta_6$ | $\beta_8$ |
| 1.000 | −16.117 | −1.85E−03 | −1.78E−05 | 2.91E−08 |

| PROJECTOR LENS FOCAL DISTANCE AND DIFFRACTION SURFACE FOCAL DISTANCE | | |
|---|---|---|
| f | $f_D$ | $f_D$/f/Abbe |
| 27.96 | 285.38 | 0.348 |

| | | σ VALUE | | | |
|---|---|---|---|---|---|
| EVALUATION FUNCTION | h = 0 cm | h = 100 cm | h = 200 cm | h = 300 cm | TOTAL |
| σ(h)² | 0.0056 | 0.0087 | 0.0070 | 0.0041 | 0.0254 |

TABLE 29

LENS DATA

| | |
|---|---|
| DISTANCE BETWEEN SHADE SURFACE AND SOURCE SIDE SURFACE OF PROJECTOR LENS [mm] | 26.00 |
| PROJECTOR LENS MATERIAL | PC |
| PROJECTOR LENS CENTER THICKNESS [mm] | 12.85 |
| PROJECTOR LENS EFFECTIVE DIAMETER [mm] | 40.00 |

SHADE SURFACE sag

| R | k | $\alpha_4$ | $\alpha_6$ | $\alpha_8$ |
|---|---|---|---|---|
| 22.000 | 0.000 | 2.72E−05 | 1.94E−08 | −3.49E−10 |

PROJECTOR LENS INCIDENT SURFACE sag

| R |
|---|
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −23.695 | −0.563 | 2.00E−06 | 4.96E−09 | 5.88E−12 | −7.44E−15 |

$\Phi$

| M | $\beta_2$ | $\beta_4$ | $\beta_6$ | $\beta_8$ |
|---|---|---|---|---|
| 1.000 | −16.117 | −1.85E−03 | −1.78E−05 | 2.91E−08 |

PROJECTOR LENS FOCAL DISTANCE AND DIFFRACTION SURFACE FOCAL DISTANCE

| f | $f_D$ | $f_D$/f/Abbe |
|---|---|---|
| 27.96 | 285.38 | 0.348 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0109 | 0.0076 | 0.0056 | 0.0033 | 0.0275 |

Example 18

Example 18 in which the intermediate-temperature light source is used corresponds to Embodiment B.

Table 30 illustrates the specifications of the shade and projector lens and the evaluation function of Example 18.

Figure 46:
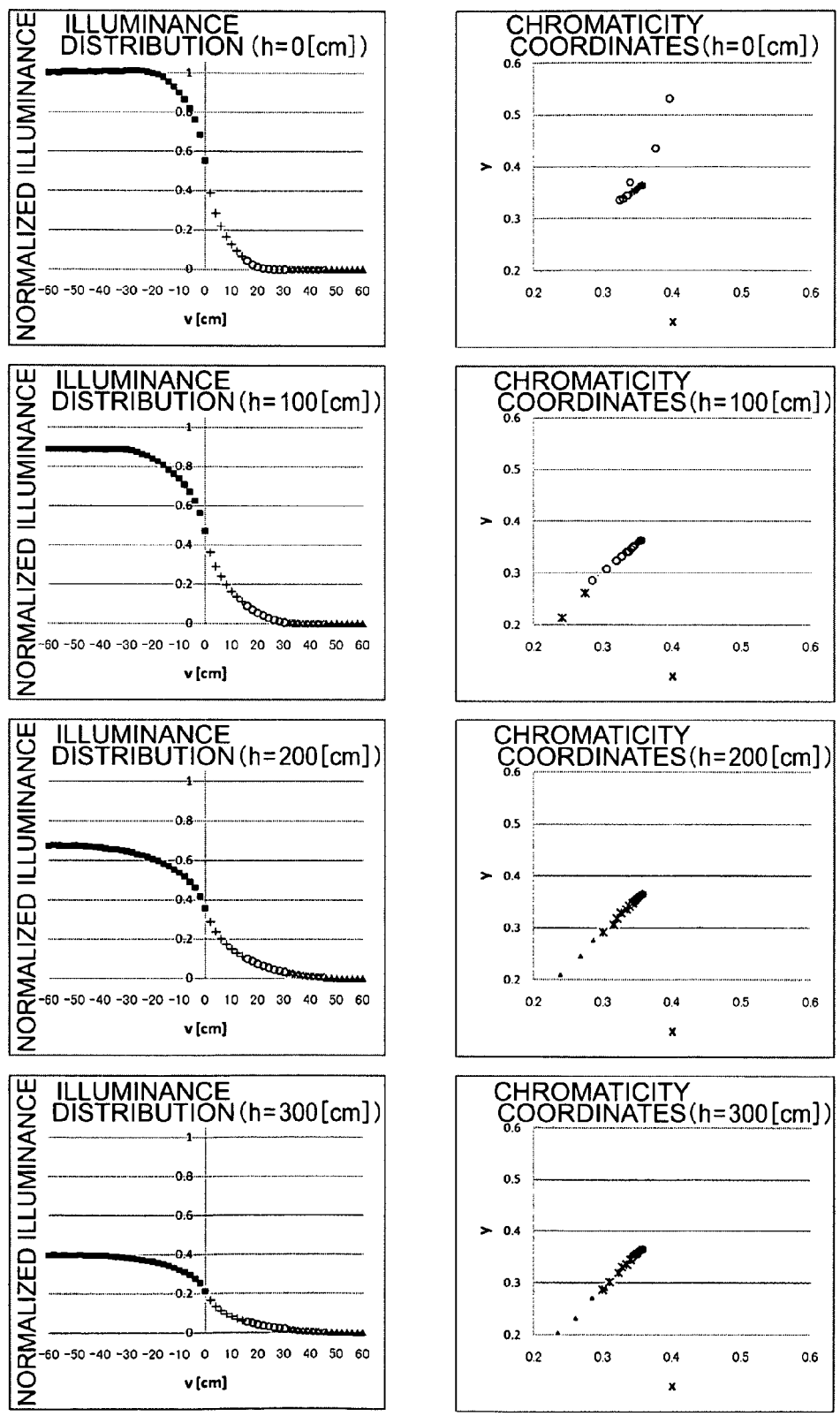
FIG. 46 illustrates light intensity distributions on the luminous intensity plane and distributions on the chromaticity coordinate plane of Example 18.

FIG. 46 illustrates light intensity distributions on the luminous intensity plane and distributions on the chromaticity coordinate plane of Example 18.

TABLE 30

LENS DATA

| | |
|---|---|
| DISTANCE BETWEEN SHADE SURFACE AND SOURCE SIDE SURFACE OF PROJECTOR LENS [mm] | 30.20 |
| PROJECTOR LENS MATERIAL | PC |
| PROJECTOR LENS CENTER THICKNESS [mm] | 11.57 |
| PROJECTOR LENS EFFECTIVE DIAMETER [mm] | 40.00 |

SHADE SURFACE sag

TABLE 30-continued

| R | k | $\alpha_4$ | $\alpha_6$ | $\alpha_8$ |
|---|---|---|---|---|
| 26.000 | 0.000 | 2.26E−05 | −3.17E−08 | −8.84E−11 |

PROJECTOR LENS INCIDENT SURFACE sag

R 150.000

PROJECTOR LENS OUTGOING SURFACE sag

| R | k | $\alpha_4$ | $\alpha_6$ | $\alpha_8$ | $\alpha_{10}$ |
|---|---|---|---|---|---|
| −27.489 | −0.733 | 9.01E−07 | 2.45E−09 | 2.87E−12 | −5.20E−15 |

$\Phi$

| M | $\beta_2$ | $\beta_4$ | $\beta_6$ | $\beta_8$ |
|---|---|---|---|---|
| 1.000 | −14.682 | −1.32E−03 | −1.04E−05 | 1.74E−08 |

PROJECTOR LENS FOCAL DISTANCE AND DIFFRACTION SURFACE FOCAL DISTANCE

| f | $f_D$ | $f_D/f/$Abbe |
|---|---|---|
| 33.02 | 327.51 | 0.339 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0075 | 0.0062 | 0.0075 | 0.0045 | 0.0257 |

Example 19

Example 19 in which the intermediate-temperature light source is used corresponds to Embodiment B.

Table 31 illustrates the specifications of the shade and projector lens and the evaluation function of Example 19.

Figure 47:
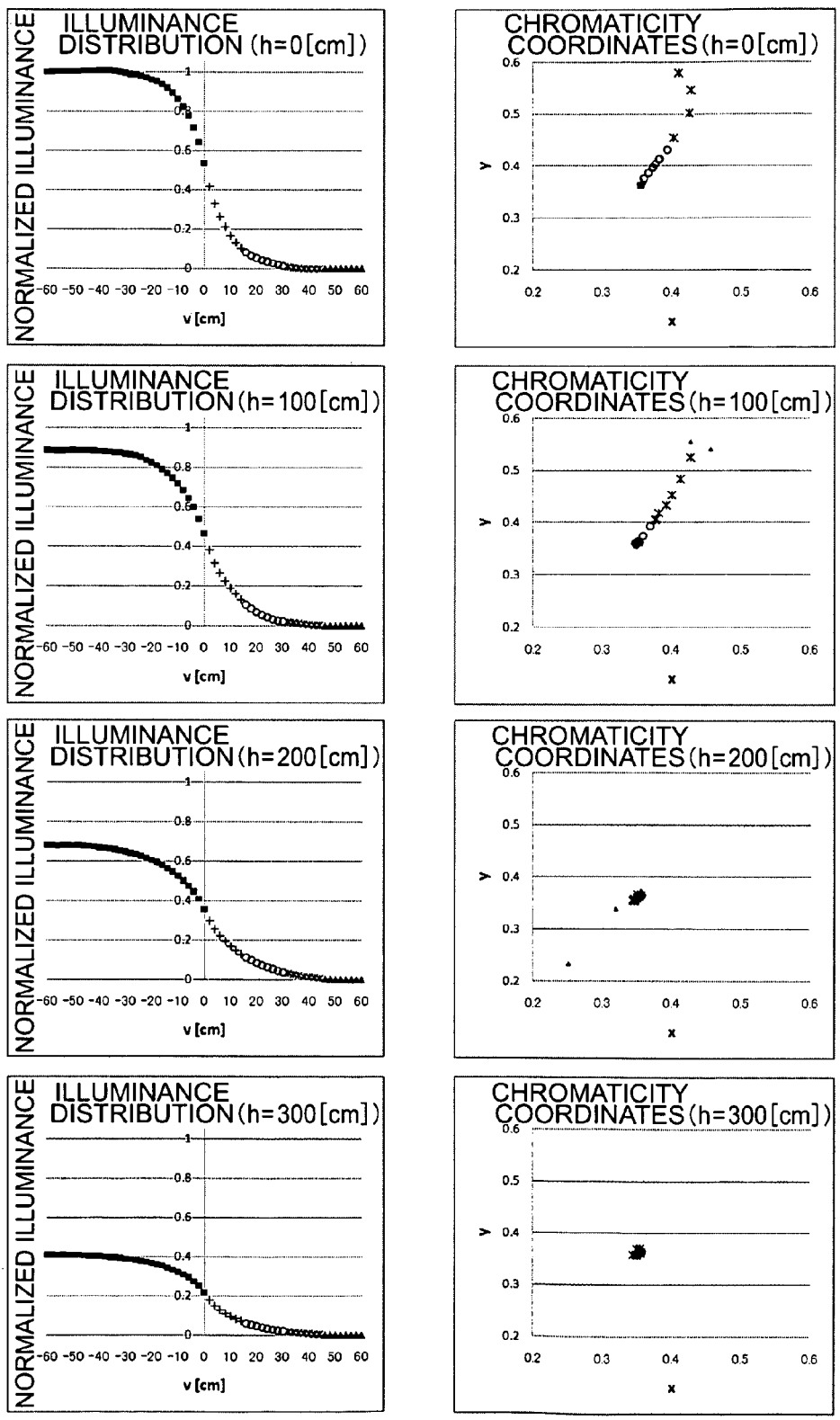
FIG. 47 illustrates light intensity distributions on the luminous intensity plane and distributions on the chromaticity coordinate plane of Example 19.

FIG. 47 illustrates light intensity distributions on the luminous intensity plane and distributions on the chromaticity coordinate plane of Example 19.

TABLE 31

| LENS DATA | |
|---|---|
| DISTANCE BETWEEN SHADE SURFACE AND SOURCE SIDE SURFACE OF PROJECTOR LENS [mm] | 29.40 |
| PROJECTOR LENS MATERIAL | PC |
| PROJECTOR LENS CENTER THICKNESS [mm] | 11.57 |
| PROJECTOR LENS EFFECTIVE DIAMETER [mm] | 40.00 |

SHADE SURFACE sag

| R | k | $\alpha_4$ | $\alpha_6$ | $\alpha_8$ |
|---|---|---|---|---|
| 26.000 | 0.000 | 2.26E−05 | −3.17E−08 | −8.84E−11 |

PROJECTOR LENS INCIDENT SURFACE sag

R

TABLE 31-continued

| 150.000 |
|---|

| PROJECTOR LENS OUTGOING SURFACE |
|---|

| sag | | | | | |
|---|---|---|---|---|---|
| R | k | $\alpha_4$ | $\alpha_6$ | $\alpha_8$ | $\alpha_{10}$ |
| −27.489 | −0.733 | 9.01E−07 | 2.45E−09 | 2.87E−12 | −5.20E−15 |

| $\Phi$ | | | | |
|---|---|---|---|---|
| M | $\beta_2$ | $\beta_4$ | $\beta_6$ | $\beta_8$ |
| 1.000 | −14.682 | −1.32E−03 | −1.04E−05 | 1.74E−08 |

| PROJECTOR LENS FOCAL DISTANCE AND DIFFRACTION SURFACE FOCAL DISTANCE | | |
|---|---|---|
| f | $f_D$ | $f_D$/f/Abbe |
| 33.02 | 327.51 | 0.339 |

| $\sigma$ VALUE | | | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0090 | 0.0063 | 0.0067 | 0.0041 | 0.0262 |

Example 20

Example 20 in which the intermediate-temperature light source is used corresponds to Embodiment E.

Table 32 illustrates the specifications of the shade and projector lens and the evaluation function of Example 20.

Figure 48:
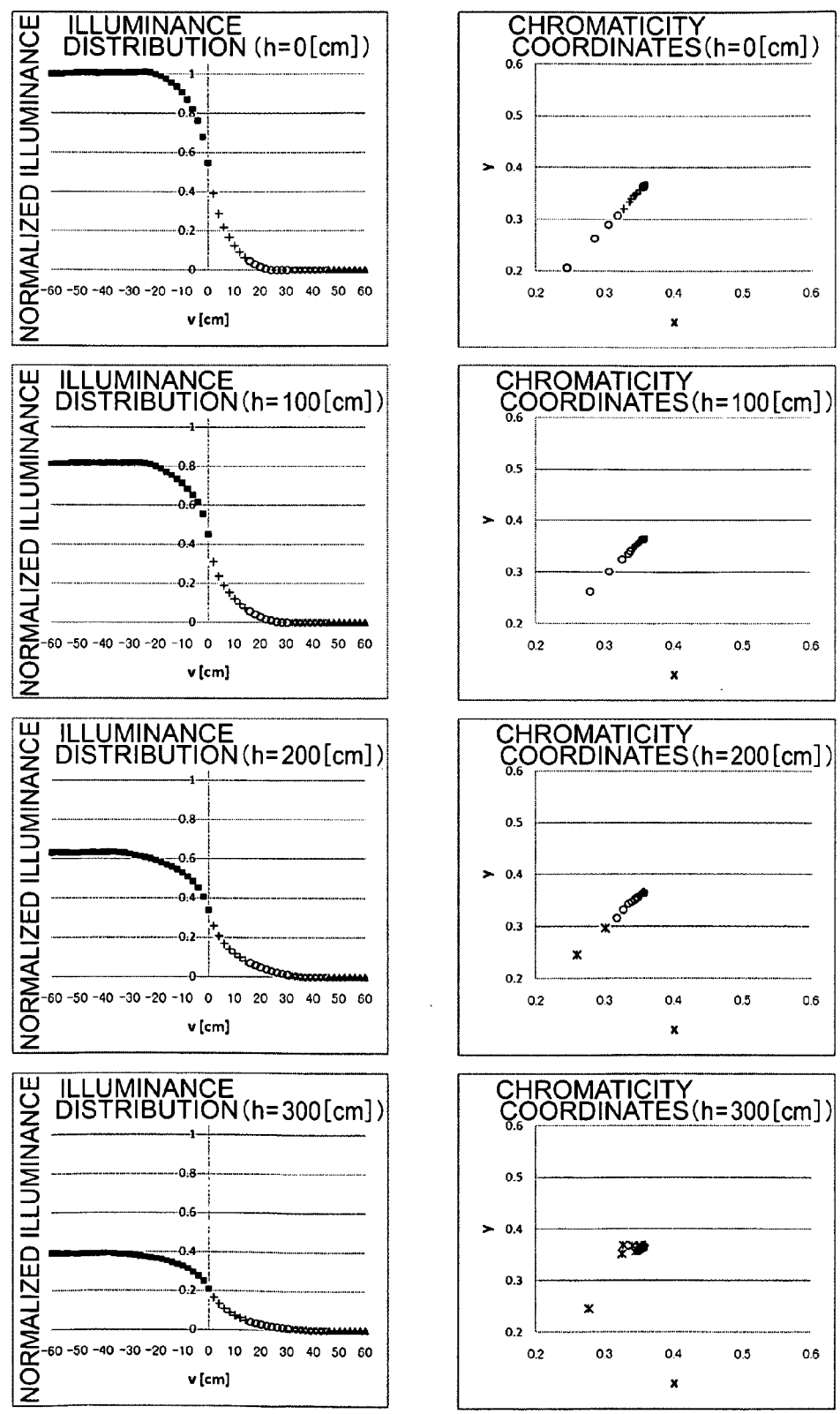
FIG. 48 illustrates light intensity distributions on the luminous intensity plane and distributions on the chromaticity coordinate plane of Example 20.

FIG. 48 illustrates light intensity distributions on the luminous intensity plane and distributions on the chromaticity coordinate plane of Example 20.

TABLE 32

| LENS DATA | |
|---|---|
| DISTANCE BETWEEN SHADE SURFACE AND SOURCE SIDE SURFACE OF PROJECTOR LENS [mm] | 31.40 |
| PROJECTOR LENS MATERIAL | PC |
| PROJECTOR LENS CENTER THICKNESS [mm] | 11.57 |
| PROJECTOR LENS EFFECTIVE DIAMETER [mm] | 40.00 |

| SHADE SURFACE |
|---|

| sag | | | | |
|---|---|---|---|---|
| R | k | $\alpha_4$ | $\alpha_6$ | $\alpha_8$ |
| 22.000 | 0.000 | 2.26E−05 | −3.17E−08 | −8.84E−11 |

| PROJECTOR LENS INCIDENT SURFACE |
|---|

| sag |
|---|
| R |
| 150.000 |

| PROJECTOR LENS OUTGOING SURFACE |
|---|

| sag | | | | | |
|---|---|---|---|---|---|
| R | k | $\alpha_4$ | $\alpha_6$ | $\alpha_8$ | $\alpha_{10}$ |
| −27.489 | −0.733 | 9.01E−07 | 2.45E−09 | 2.87E−12 | −5.20E−15 |

TABLE 32-continued

| | | $\Phi$ | | |
|---|---|---|---|---|
| M | $\beta_2$ | $\beta_4$ | $\beta_6$ | $\beta_8$ |
| 1.000 | −14.682 | −1.32E−03 | −1.04E−05 | 1.74E−08 |

| PROJECTOR LENS FOCAL DISTANCE AND DIFFRACTION SURFACE FOCAL DISTANCE | | |
|---|---|---|
| f | $f_D$ | $f_D$/f/Abbe |
| 33.02 | 327.51 | 0.339 |

| | | $\sigma$ VALUE | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0113 | 0.0073 | 0.0065 | 0.0039 | 0.0291 |

Example 21

Example 21 in which the low-temperature light source is used corresponds to Embodiment A.

Table 33 illustrates the specifications of the shade and projector lens and the evaluation function of Example 21.

Figure 49:
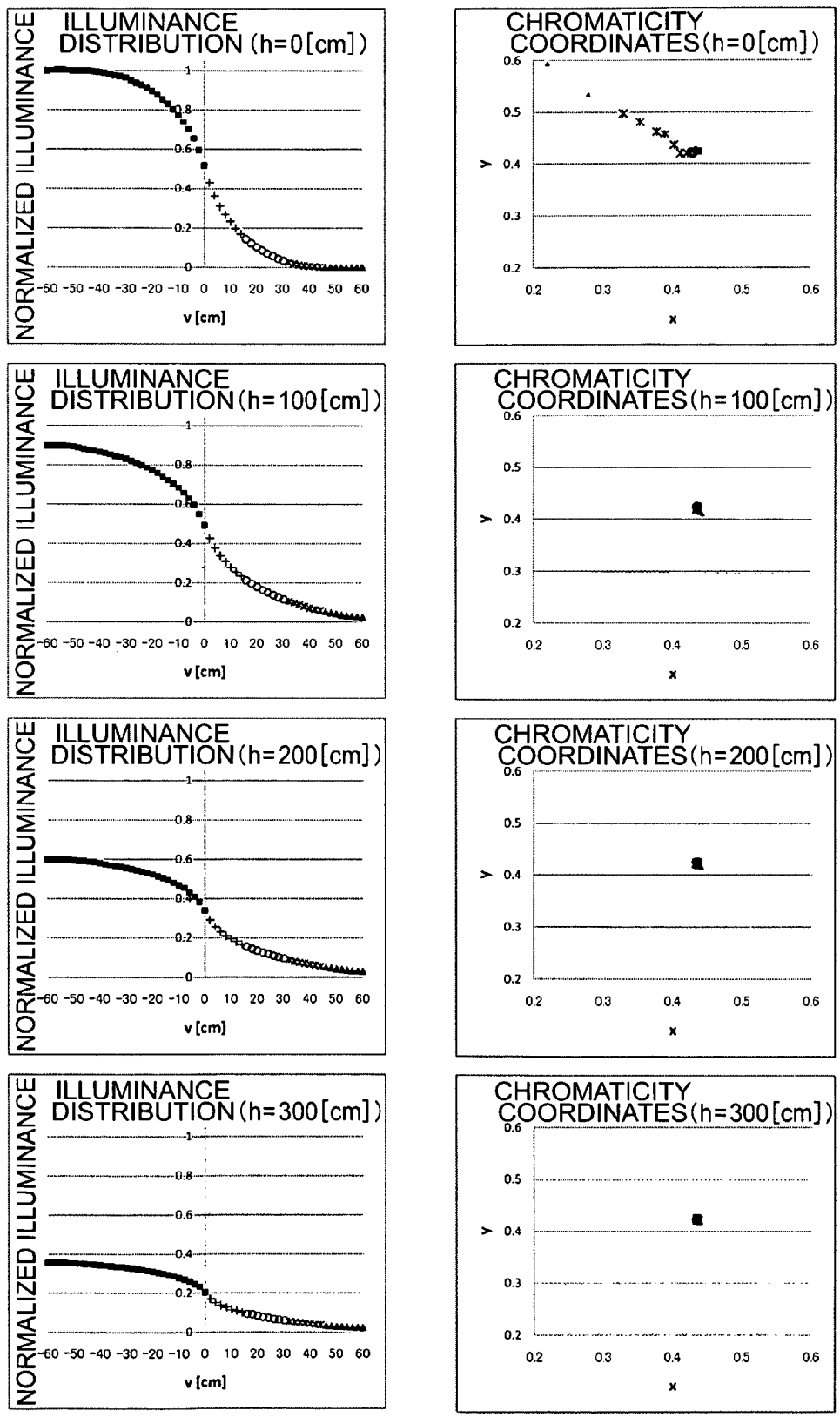
FIG. 49 illustrates light intensity distributions on the luminous intensity plane and distributions on the chromaticity coordinate plane of Example 21.

FIG. 49 illustrates light intensity distributions on the luminous intensity plane and distributions on the chromaticity coordinate plane of Example 21.

TABLE 33

| LENS DATA | |
|---|---|
| DISTANCE BETWEEN SHADE SURFACE AND SOURCE SIDE SURFACE OF PROJECTOR LENS [mm] | 24.00 |
| PROJECTOR LENS MATERIAL | PC |
| PROJECTOR LENS CENTER THICKNESS [mm] | 12.58 |
| PROJECTOR LENS EFFECTIVE DIAMETER [mm] | 40.00 |

| SHADE SURFACE | | | | |
|---|---|---|---|---|
| | | sag | | |
| R | k | $\alpha_4$ | $\alpha_6$ | $\alpha_8$ |
| 29.000 | 0.000 | 2.46E−05 | 1.77E−08 | −3.14E−10 |

| PROJECTOR LENS INCIDENT SURFACE |
|---|
| sag |
| R |
| 150.000 |

| PROJECTOR LENS OUTGOING SURFACE | | | | | |
|---|---|---|---|---|---|
| | | sag | | | |
| R | k | $\alpha_4$ | $\alpha_6$ | $\alpha_8$ | $\alpha_{10}$ |
| −24.277 | −0.704 | 9.88E−07 | 4.12E−09 | 3.55E−12 | −5.06E−15 |

| | | $\Phi$ | | |
|---|---|---|---|---|
| M | $\beta_2$ | $\beta_4$ | $\beta_6$ | $\beta_8$ |
| 1.000 | −21.085 | −4.76E−03 | −1.12E−05 | 2.14E−08 |

| PROJECTOR LENS FOCAL DISTANCE AND DIFFRACTION SURFACE FOCAL DISTANCE | | |
|---|---|---|
| f | $f_D$ | $f_D$/f/Abbe |

TABLE 33-continued

| 27.68 | 214.79 | 0.265 |

| σ VALUE | | | | |
|---|---|---|---|---|
| EVALUATION FUNCTION | h = 0 cm | h = 100 cm | h = 200 cm | h = 300 cm | TOTAL |
| $\sigma(h)^2$ | 0.0046 | 0.0052 | 0.0038 | 0.0023 | 0.0159 |

Example 22

Example 22 in which the high-temperature light source is used corresponds to Embodiment F.

Table 34 illustrates the specifications of the shade and projector lens and the evaluation function of Example 22.

Figure 50:
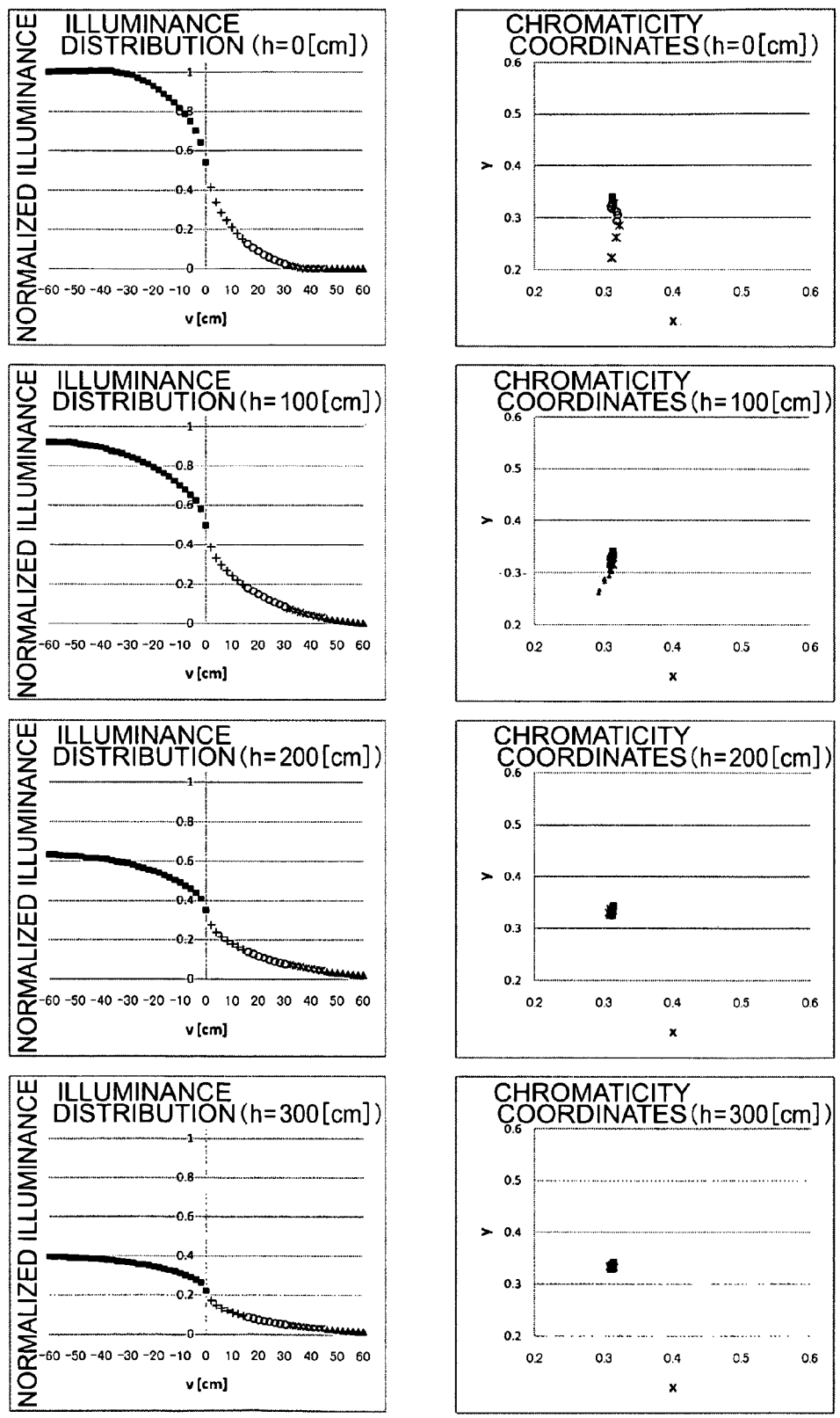
FIG. 50 illustrates light intensity distributions on the luminous intensity plane and distributions on the chromaticity coordinate plane of Example 22.

FIG. 50 illustrates light intensity distributions on the luminous intensity plane and distributions on the chromaticity coordinate plane of Example 22.

Example 23

Example 23 in which the low-temperature light source is used corresponds to Embodiment A.

Table 35 illustrates the specifications of the shade and projector lens and the evaluation function of Example 23.

Figure 51:
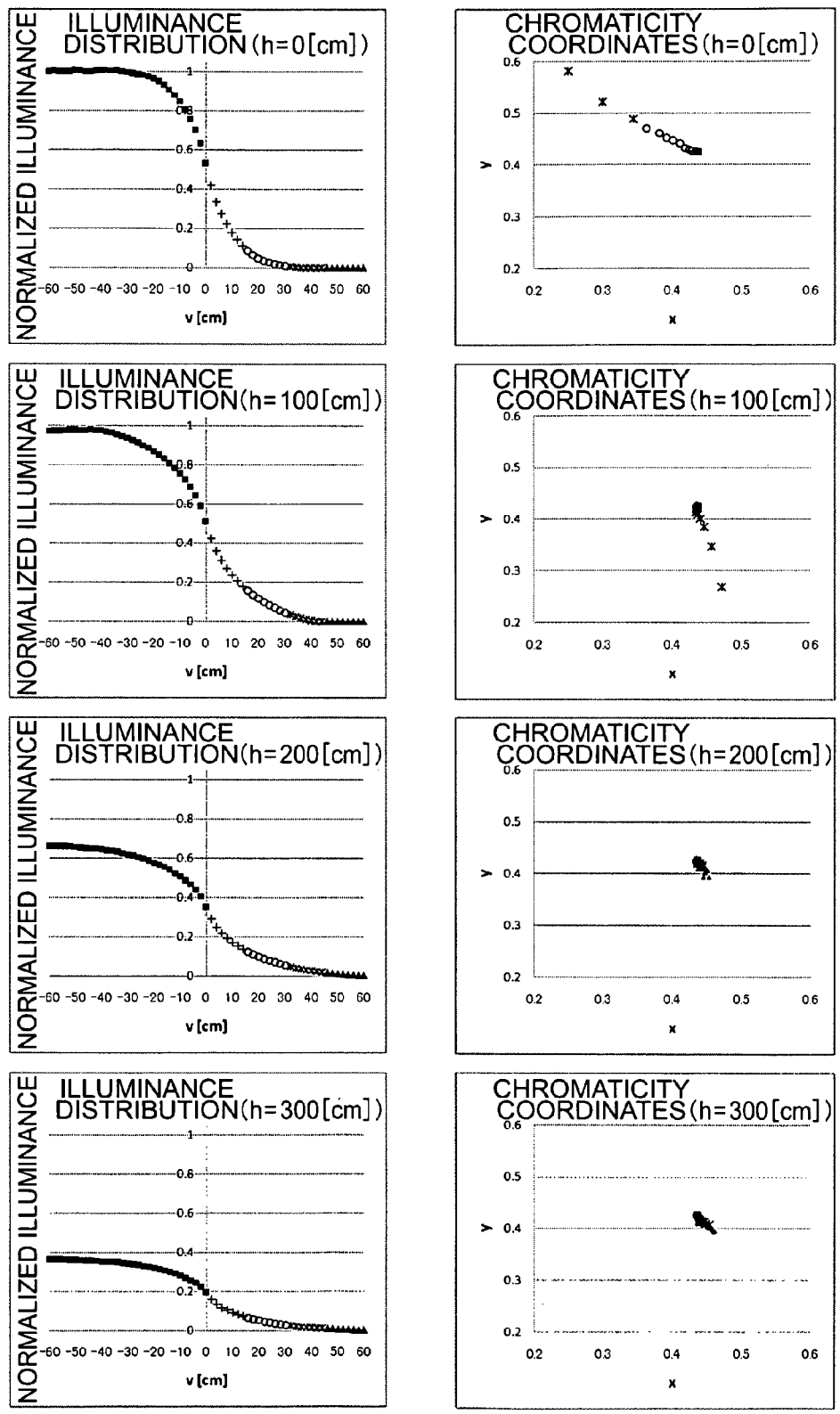
FIG. 51 illustrates light intensity distributions on the luminous intensity plane and distributions on the chromaticity coordinate plane of Example 23.

FIG. 51 illustrates light intensity distributions on the luminous intensity plane and distributions on the chromaticity coordinate plane of Example 23.

TABLE 34

| LENS DATA | |
|---|---|
| DISTANCE BETWEEN SHADE SURFACE AND SOURCE SIDE SURFACE OF PROJECTOR LENS [mm] | 25.70 |
| PROJECTOR LENS MATERIAL | PC |
| PROJECTOR LENS CENTER THICKNESS [mm] | 12.58 |
| PROJECTOR LENS EFFECTIVE DIAMETER [mm] | 40.00 |

| SHADE SURFACE | | | | |
|---|---|---|---|---|
| sag | | | | |
| R | k | $\alpha_4$ | $\alpha_6$ | $\alpha_8$ |
| 23.000 | 0.000 | 2.46E−05 | 1.77E−08 | −3.14E−10 |

| PROJECTOR LENS INCIDENT SURFACE |
|---|
| sag |
| R |
| 150.000 |

| PROJECTOR LENS OUTGOING SURFACE | | | | | |
|---|---|---|---|---|---|
| sag | | | | | |
| R | k | $\alpha_4$ | $\alpha_6$ | $\alpha_8$ | $\alpha_{10}$ |
| −24.277 | −0.704 | 9.88E−07 | 4.12E−09 | 3.55E−12 | −5.06E−15 |

| Φ | | | | |
|---|---|---|---|---|
| M | $\beta_2$ | $\beta_4$ | $\beta_6$ | $\beta_8$ |
| 1.000 | −21.085 | −4.76E−03 | −1.12E−05 | 2.14E−08 |

| PROJECTOR LENS FOCAL DISTANCE AND DIFFRACTION SURFACE FOCAL DISTANCE | | |
|---|---|---|
| f | $f_D$ | $f_D$/f/Abbe |
| 27.68 | 214.79 | 0.265 |

| σ VALUE | | | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0089 | 0.0094 | 0.0071 | 0.0043 | 0.0297 |

TABLE 35

LENS DATA

| | |
|---|---|
| DISTANCE BETWEEN SHADE SURFACE AND SOURCE SIDE SURFACE OF PROJECTOR LENS [mm] | 28.70 |
| PROJECTOR LENS MATERIAL | PC |
| PROJECTOR LENS CENTER THICKNESS [mm] | 11.34 |
| PROJECTOR LENS EFFECTIVE DIAMETER [mm] | 40.00 |

SHADE SURFACE sag

| R | k | $\alpha_4$ | $\alpha_6$ | $\alpha_8$ |
|---|---|---|---|---|
| 36.000 | 0.000 | 2.05E−05 | −2.98E−08 | −8.08E−11 |

PROJECTOR LENS INCIDENT SURFACE sag

| R |
|---|
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −28.210 | −0.751 | 9.92E−07 | 2.56E−09 | 1.14E−12 | −2.54E−15 |

$\Phi$

| M | $\beta_2$ | $\beta_4$ | $\beta_6$ | $\beta_8$ |
|---|---|---|---|---|
| 1.000 | −19.006 | −3.11E−03 | −6.07E−06 | 1.22E−08 |

PROJECTOR LENS FOCAL DISTANCE AND DIFFRACTION SURFACE FOCAL DISTANCE

| f | $f_D$ | $f_D/f/\mathrm{Abbe}$ |
|---|---|---|
| 32.72 | 250.28 | 0.261 |

σ VALUE

| EVALUATION FUNCTION $\sigma(h)^2$ | h = 0 cm | h = 100 cm | h = 200 cm | h = 300 cm | TOTAL |
|---|---|---|---|---|---|
| | 0.0060 | 0.0053 | 0.0041 | 0.0023 | 0.0177 |

Example 24

Example 24 in which the high-temperature light source is used corresponds to Embodiment F.

Table 36 illustrates the specifications of the shade and projector lens and the evaluation function of Example 24.

Figure 52:
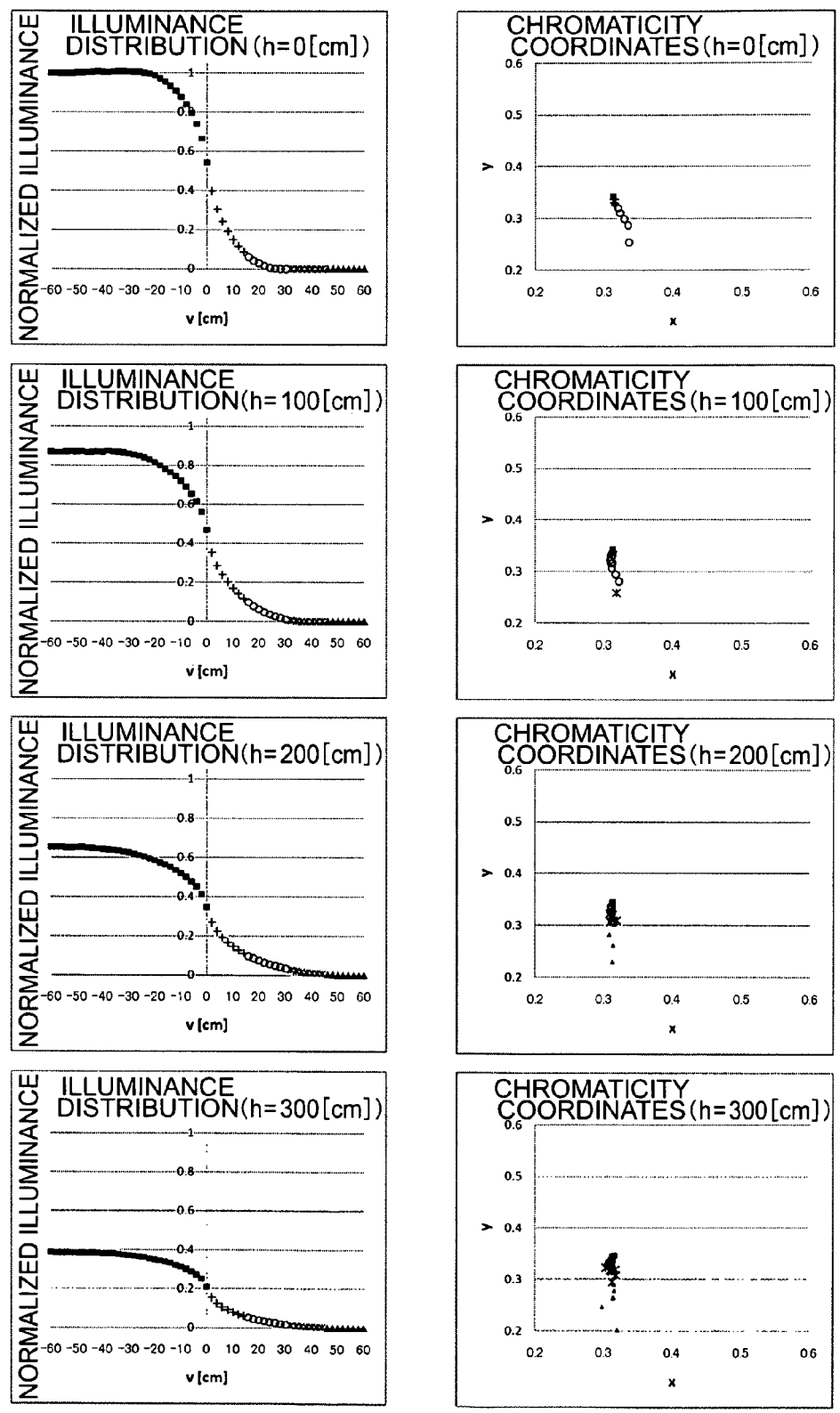
FIG. 52 illustrates light intensity distributions on the luminous intensity plane and distributions on the chromaticity coordinate plane of Example 24.

FIG. 52 illustrates light intensity distributions on the luminous intensity plane and distributions on the chromaticity coordinate plane of Example 24.

TABLE 36

LENS DATA

| | |
|---|---|
| DISTANCE BETWEEN SHADE SURFACE AND SOURCE SIDE SURFACE OF PROJECTOR LENS [mm] | 30.80 |
| PROJECTOR LENS MATERIAL | PC |
| PROJECTOR LENS CENTER THICKNESS [mm] | 11.34 |
| PROJECTOR LENS EFFECTIVE DIAMETER [mm] | 40.00 |

SHADE SURFACE sag

| R | k | $\alpha_4$ | $\alpha_6$ | $\alpha_8$ |
|---|---|---|---|---|

TABLE 36-continued

| 25.000 | 0.000 | 2.05E−05 | −2.98E−08 | −8.08E−11 |
|---|---|---|---|---|

PROJECTOR LENS INCIDENT SURFACE sag

| R |
|---|
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −28.210 | −0.751 | 9.92E−07 | 2.56E−09 | 1.14E−12 | −2.54E−15 |

Φ

| M | $\beta_2$ | $\beta_4$ | $\beta_6$ | $\beta_8$ |
|---|---|---|---|---|
| 1.000 | −19.006 | −3.11E−03 | −6.07E−06 | 1.22E−08 |

PROJECTOR LENS FOCAL DISTANCE AND DIFFRACTION SURFACE FOCAL DISTANCE

| f | $f_D$ | $f_D$/f/Abbe |
|---|---|---|
| 32.72 | 250.28 | 0.261 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0112 | 0.0090 | 0.0085 | 0.0050 | 0.0337 |

Example 25

Example 25 in which the high-temperature light source is used corresponds to Embodiment C.

Table 37 illustrates the specifications of the shade and projector lens and the evaluation function of Example 25.

Figure 53:
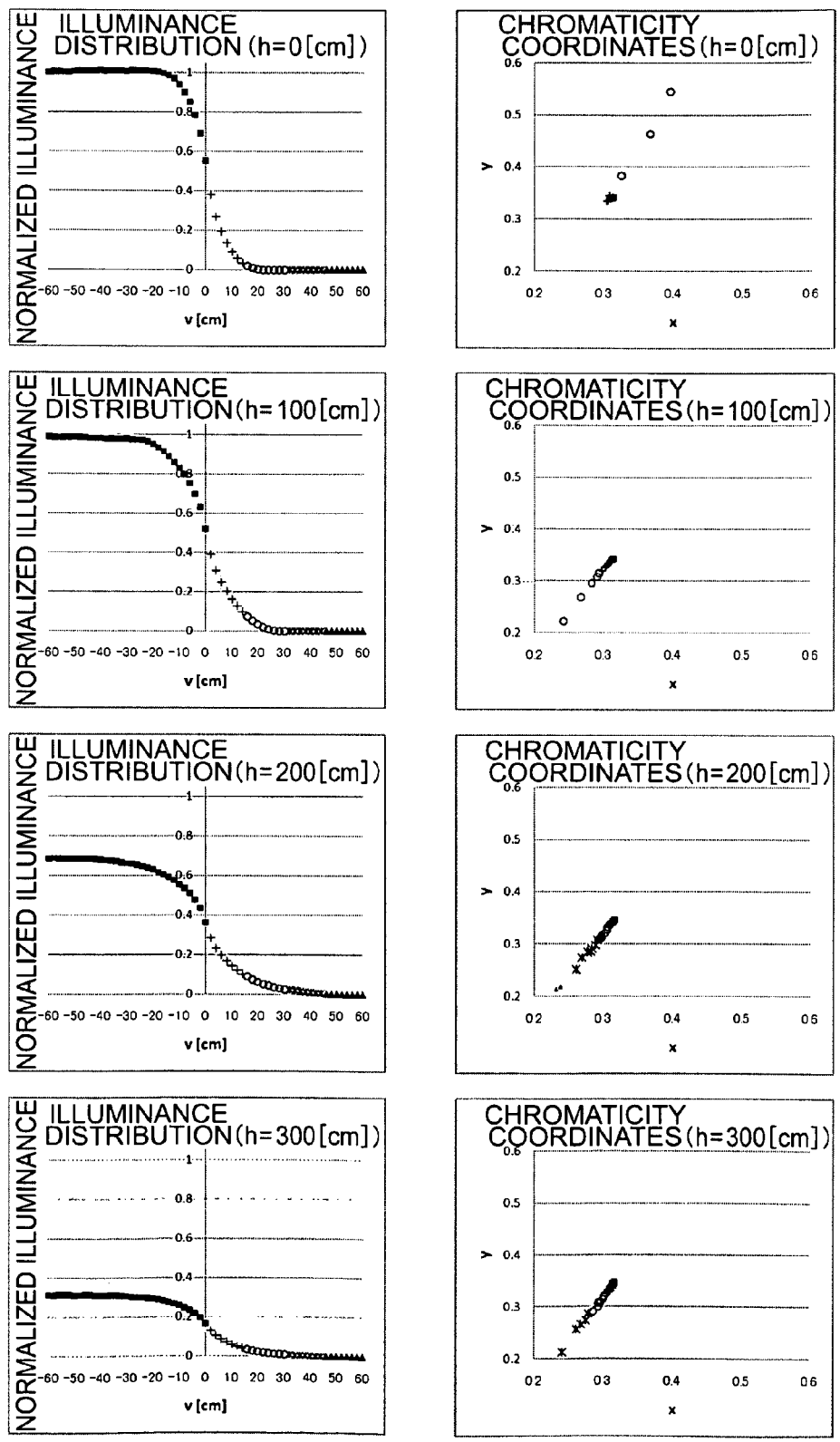
FIG. 53 illustrates light intensity distributions on the luminous intensity plane and distributions on the chromaticity coordinate plane of Example 25.

FIG. 53 illustrates light intensity distributions on the luminous intensity plane and distributions on the chromaticity coordinate plane of Example 25.

TABLE 37

LENS DATA

| | |
|---|---|
| DISTANCE BETWEEN SHADE SURFACE AND SOURCE SIDE SURFACE OF PROJECTOR LENS [mm] | 34.70 |
| PROJECTOR LENS MATERIAL | PC |
| PROJECTOR LENS CENTER THICKNESS [mm] | 10.58 |
| PROJECTOR LENS EFFECTIVE DIAMETER [mm] | 40.00 |

SHADE SURFACE sag

| R | k | $\alpha_4$ | $\alpha_6$ | $\alpha_8$ |
|---|---|---|---|---|
| 60.000 | 0.000 | 1.71E−06 | 2.33E−08 | −1.29E−10 |

PROJECTOR LENS INCIDENT SURFACE sag

| R |
|---|
| 150.000 |

PROJECTOR LENS OUTGOING SURFACE

TABLE 37-continued sag

| R | k | $\alpha_4$ | $\alpha_6$ | $\alpha_8$ | $\alpha_{10}$ |
|---|---|---|---|---|---|
| −31.557 | −0.071 | 3.66E−06 | 3.26E−09 | 2.10E−12 | −1.72E−15 |

Φ

| M | $\beta_2$ | $\beta_4$ | $\beta_6$ | $\beta_8$ |
|---|---|---|---|---|
| 1.000 | −13.133 | −7.95E−04 | −6.77E−06 | 1.13E−08 |

PROJECTOR LENS FOCAL DISTANCE AND DIFFRACTION SURFACE FOCAL DISTANCE

| f | $f_D$ | $f_D$/f/Abbe |
|---|---|---|
| 38.07 | 377.96 | 0.339 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0113 | 0.0113 | 0.0122 | 0.0053 | 0.0401 |

Example 26

Example 26 in which the low-temperature light source is used corresponds to Embodiment D.

Table 38 illustrates the specifications of the shade and projector lens and the evaluation function of Example 26.

Figure 54:
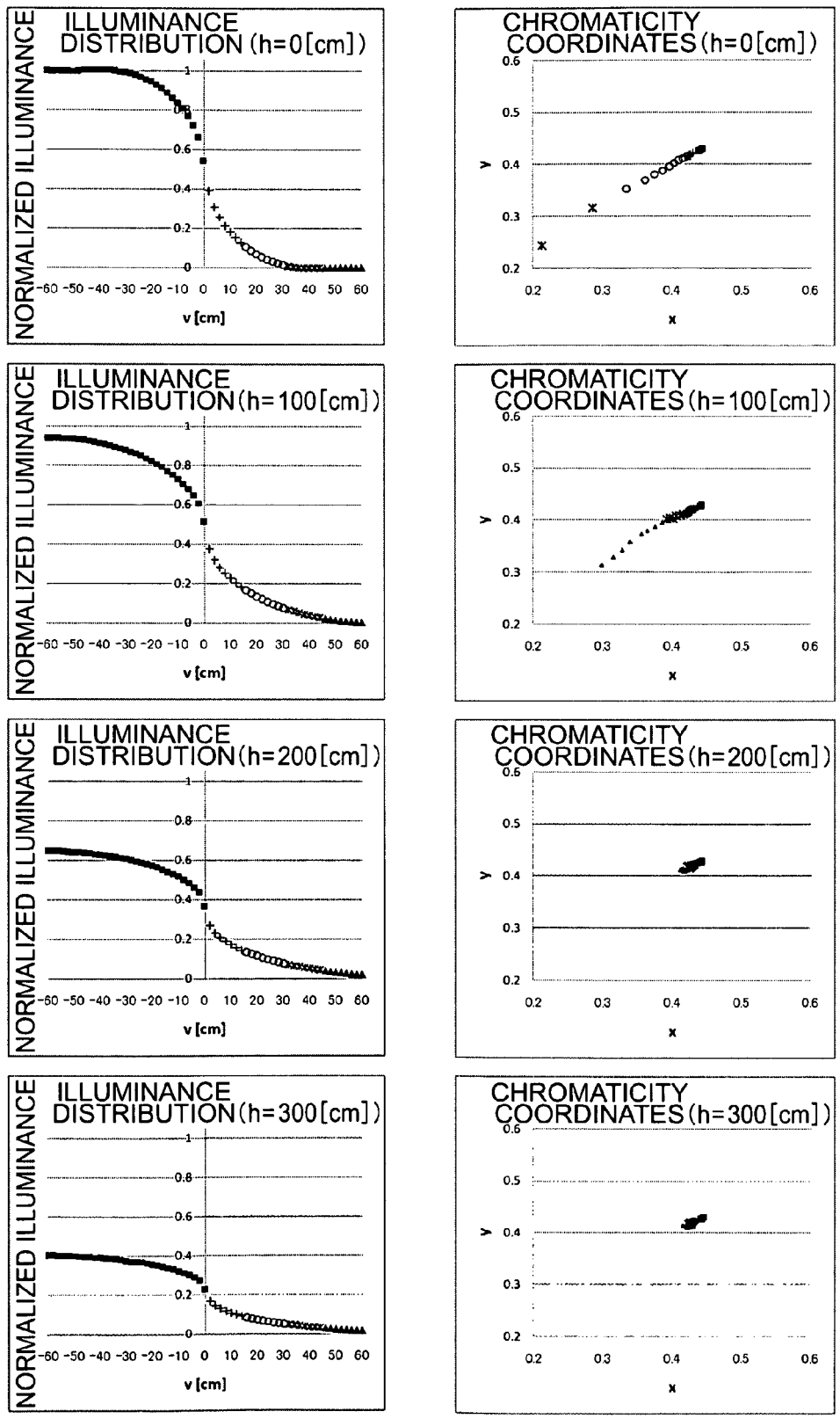
FIG. 54 illustrates light intensity distributions on the luminous intensity plane and distributions on the chromaticity coordinate plane of Example 26.

FIG. 54 illustrates light intensity distributions on the luminous intensity plane and distributions on the chromaticity coordinate plane of Example 26.

TABLE 38

LENS DATA

| | |
|---|---|
| DISTANCE BETWEEN SHADE SURFACE AND SOURCE SIDE SURFACE OF PROJECTOR LENS [mm] | 25.60 |
| PROJECTOR LENS MATERIAL | PC |
| PROJECTOR LENS CENTER THICKNESS [mm] | 13.13 |
| PROJECTOR LENS EFFECTIVE DIAMETER [mm] | 40.00 |

SHADE SURFACE sag

| R | k | $\alpha_4$ | $\alpha_6$ | $\alpha_8$ |
|---|---|---|---|---|
| 23.000 | 0.000 | 2.43E−05 | 1.19E−08 | −3.15E−10 |

PROJECTOR LENS INCIDENT SURFACE sag

| R |
|---|
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −23.110 | −0.527 | 2.39E−06 | 5.11E−09 | 4.64E−12 | −2.35E−15 |

Φ

| M | $\beta_2$ | $\beta_4$ | $\beta_6$ | $\beta_8$ |
|---|---|---|---|---|
| 1.000 | −12.596 | −3.08E−03 | −7.73E−06 | 1.38E−08 |

TABLE 38-continued

PROJECTOR LENS FOCAL DISTANCE AND DIFFRACTION SURFACE FOCAL DISTANCE

| f | $f_D$ | $f_D/f$/Abbe |
|---|---|---|
| 27.80 | 350.37 | 0.430 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0104 | 0.0092 | 0.0054 | 0.0036 | 0.0285 |

Example 27

Example 27 in which the intermediate-temperature light source is used corresponds to Embodiment E.

Table 39 illustrates the specifications of the shade and projector lens and the evaluation function of Example 27.

Figure 55:
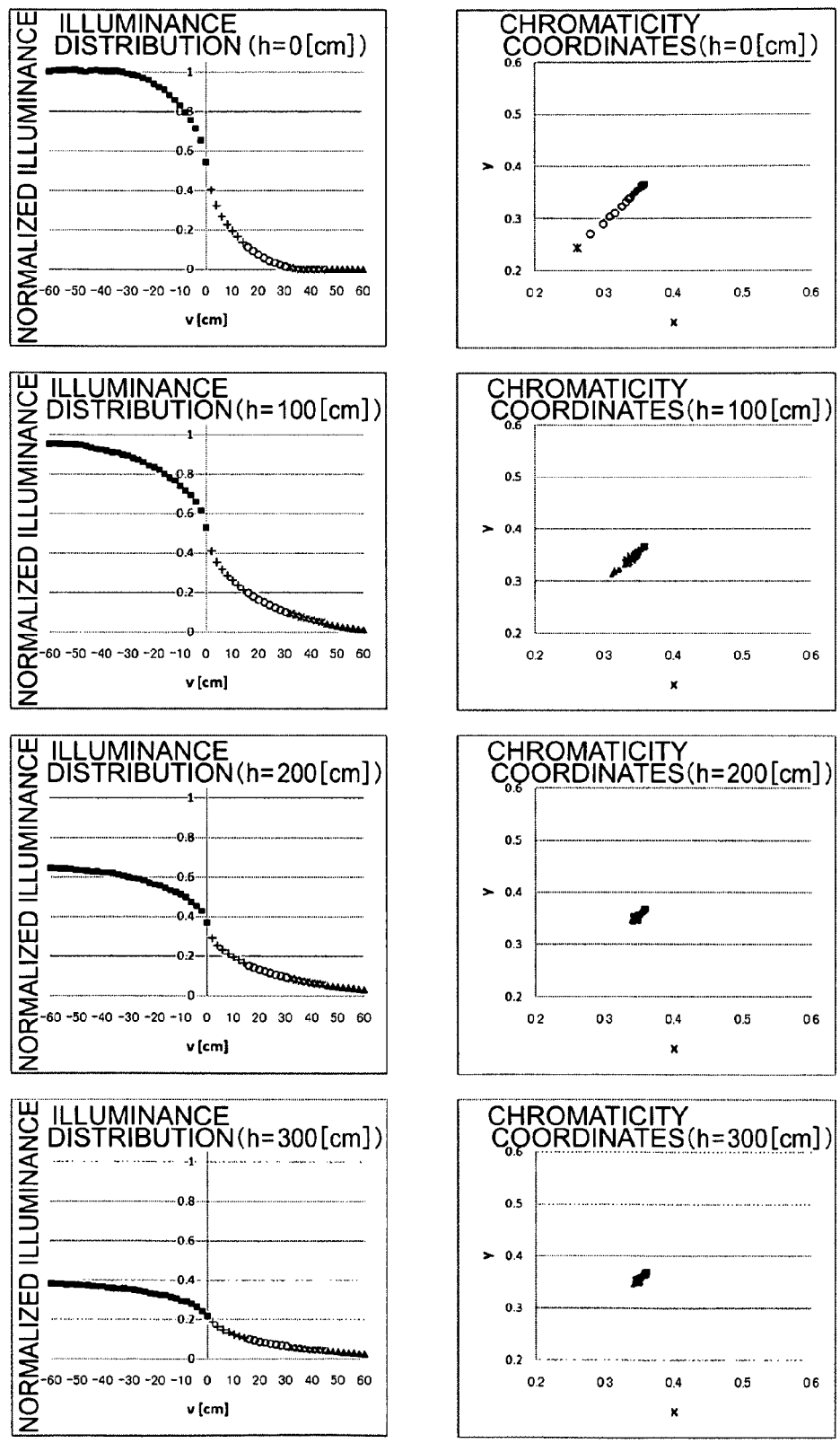
FIG. 55 illustrates light intensity distributions on the luminous intensity plane and distributions on the chromaticity coordinate plane of Example 27.

FIG. 55 illustrates light intensity distributions on the luminous intensity plane and distributions on the chromaticity coordinate plane of Example 27.

TABLE 39

LENS DATA

| | |
|---|---|
| DISTANCE BETWEEN SHADE SURFACE AND SOURCE SIDE SURFACE OF PROJECTOR LENS [mm] | 25.65 |
| PROJECTOR LENS MATERIAL | PC |
| PROJECTOR LENS CENTER THICKNESS [mm] | 12.89 |
| PROJECTOR LENS EFFECTIVE DIAMETER [mm] | 40.00 |

SHADE SURFACE sag

| R | k | $\alpha_4$ | $\alpha_6$ | $\alpha_8$ |
|---|---|---|---|---|
| 25.000 | 0.000 | 2.51E−05 | 1.63E−08 | −3.48E−10 |

PROJECTOR LENS INCIDENT SURFACE sag

| R |
|---|
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −23.601 | −0.544 | 2.34E−06 | 4.68E−09 | 5.01E−12 | −3.96E−15 |

Φ

| M | $\beta_2$ | $\beta_4$ | $\beta_6$ | $\beta_8$ |
|---|---|---|---|---|
| 1.000 | −15.172 | −3.54E−03 | −8.93E−06 | 1.63E−08 |

PROJECTOR LENS FOCAL DISTANCE AND DIFFRACTION SURFACE FOCAL DISTANCE

| f | $f_D$ | $f_D/f$/Abbe |
|---|---|---|
| 28.05 | 294.73 | 0.359 |

TABLE 39-continued

| | σ VALUE | | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0108 | 0.0114 | 0.0087 | 0.0050 | 0.0357 |

Example 28

Example 28 in which the low-temperature light source is used corresponds to Embodiment D.

Table 40 illustrates the specifications of the shade and projector lens and the evaluation function of Example 28.

Figure 56:
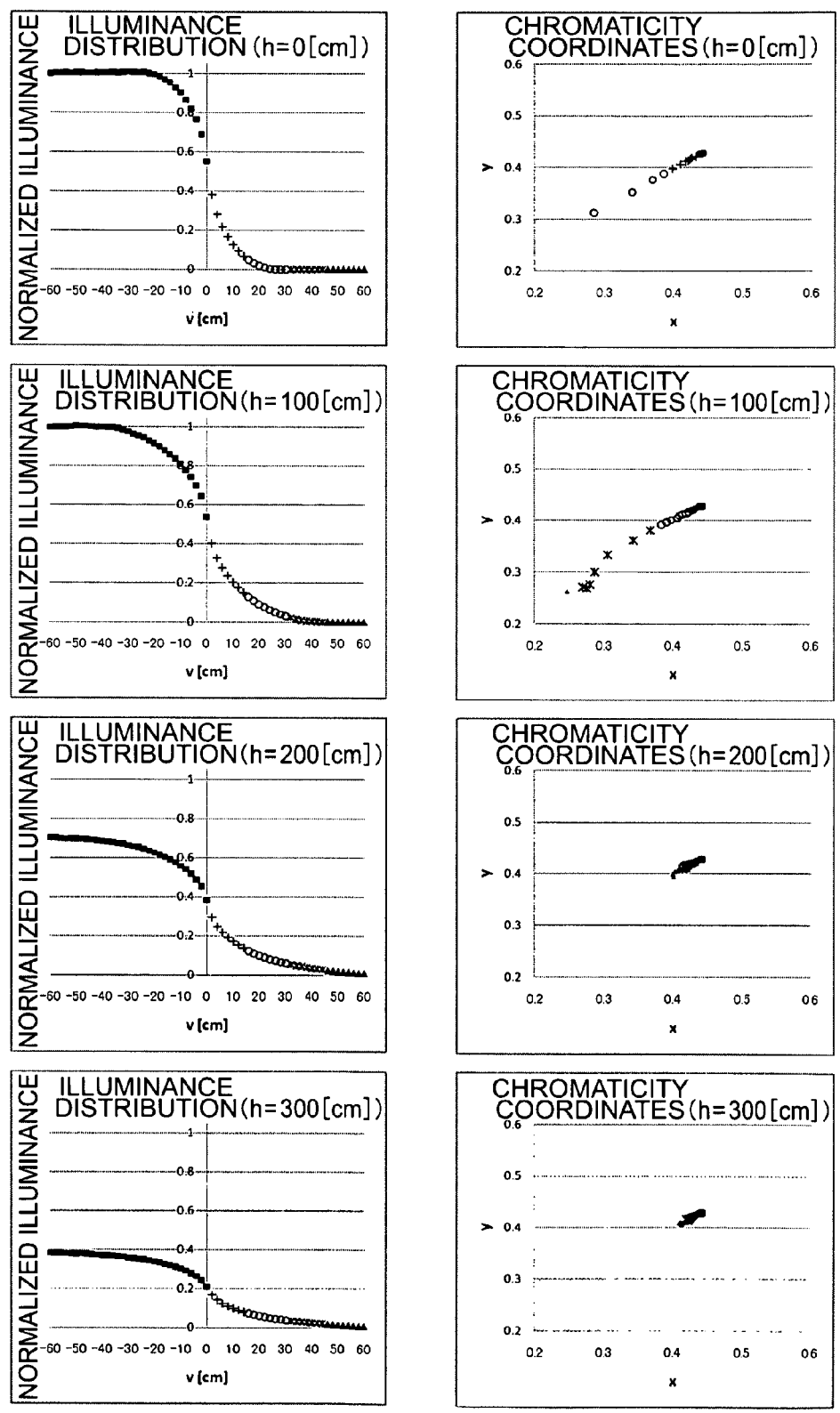
FIG. 56 illustrates light intensity distributions on the luminous intensity plane and distributions on the chromaticity coordinate plane of Example 28.

FIG. 56 illustrates light intensity distributions on the luminous intensity plane and distributions on the chromaticity coordinate plane of Example 28.

Example 29

Example 29 in which the intermediate-temperature light source is used corresponds to Embodiment B.

Table 41 illustrates the specifications of the shade and projector lens and the evaluation function of Example 29.

Figure 57:
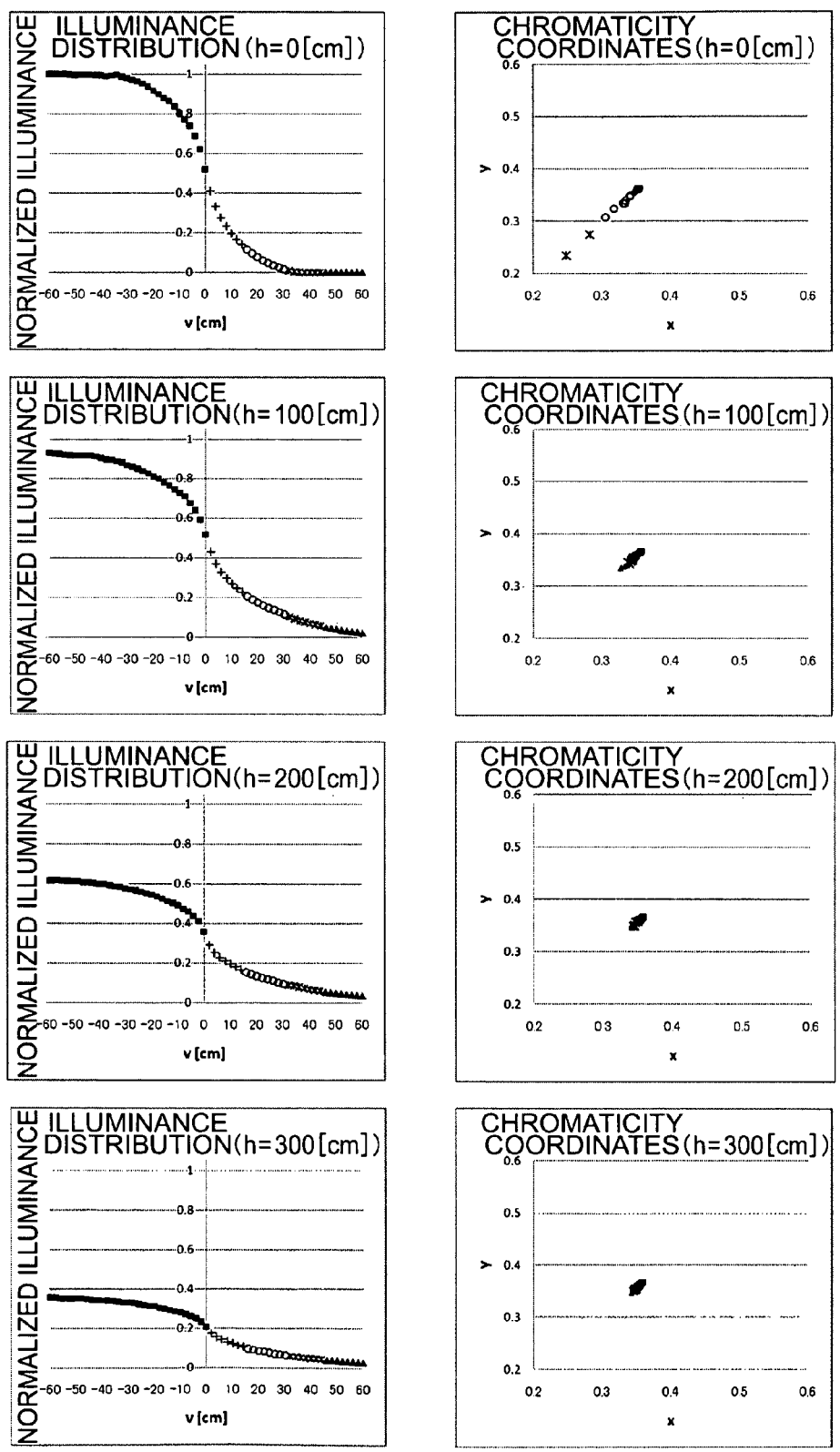
FIG. 57 illustrates light intensity distributions on the luminous intensity plane and distributions on the chromaticity coordinate plane of Example 29.

FIG. 57 illustrates light intensity distributions on the luminous intensity plane and distributions on the chromaticity coordinate plane of Example 29.

TABLE 40

| LENS DATA | |
|---|---|
| DISTANCE BETWEEN SHADE SURFACE AND SOURCE SIDE SURFACE OF PROJECTOR LENS [mm] | 30.70 |
| PROJECTOR LENS MATERIAL | PC |
| PROJECTOR LENS CENTER THICKNESS [mm] | 11.82 |
| PROJECTOR LENS EFFECTIVE DIAMETER [mm] | 40.00 |

| SHADE SURFACE | | | | |
|---|---|---|---|---|
| | | sag | | |
| R | k | $\alpha_4$ | $\alpha_6$ | $\alpha_8$ |
| 24.000 | 0.000 | 9.06E−07 | 8.28E−08 | −3.91E−10 |

| PROJECTOR LENS INCIDENT SURFACE |
|---|
| sag |
| R |
| 150.000 |

| PROJECTOR LENS OUTGOING SURFACE | | | | | |
|---|---|---|---|---|---|
| | | sag | | | |
| R | k | $\alpha_4$ | $\alpha_6$ | $\alpha_8$ | $\alpha_{10}$ |
| −26.718 | −0.732 | 8.11E−07 | 2.44E−09 | 1.52E−12 | −2.05E−15 |

| Φ | | | | |
|---|---|---|---|---|
| M | $\beta_2$ | $\beta_4$ | $\beta_6$ | $\beta_8$ |
| 1.000 | −11.388 | −2.09E−03 | −4.09E−06 | 7.74E−09 |

| PROJECTOR LENS FOCAL DISTANCE AND DIFFRACTION SURFACE FOCAL DISTANCE | | |
|---|---|---|
| f | $f_D$ | $f_D$/f/Abbe |
| 32.85 | 409.39 | 0.435 |

| σ VALUE | | | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0098 | 0.0104 | 0.0061 | 0.0033 | 0.0295 |

TABLE 41

LENS DATA

| | |
|---|---|
| DISTANCE BETWEEN SHADE SURFACE AND SOURCE SIDE SURFACE OF PROJECTOR LENS [mm] | 24.70 |
| PROJECTOR LENS MATERIAL | PC |
| PROJECTOR LENS CENTER THICKNESS [mm] | 12.88 |
| PROJECTOR LENS EFFECTIVE DIAMETER [mm] | 40.00 |

SHADE SURFACE sag

| R | k | $\alpha_4$ | $\alpha_6$ | $\alpha_8$ |
|---|---|---|---|---|
| 28.000 | 0.000 | 2.50E−05 | 1.64E−08 | −3.44E−10 |

PROJECTOR LENS INCIDENT SURFACE sag

| R |
|---|
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −23.647 | −0.522 | 2.40E−06 | 5.25E−09 | 5.64E−12 | −6.02E−15 |

$\Phi$

| M | $\beta_2$ | $\beta_4$ | $\beta_6$ | $\beta_8$ |
|---|---|---|---|---|
| 1.000 | −15.702 | −2.14E−03 | −1.59E−05 | 2.63E−08 |

PROJECTOR LENS FOCAL DISTANCE AND DIFFRACTION SURFACE FOCAL DISTANCE

| f | $f_D$ | $f_D$/f/Abbe |
|---|---|---|
| 27.99 | 291.13 | 0.355 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0055 | 0.0097 | 0.0074 | 0.0042 | 0.0268 |

Example 30

Example 30 in which the intermediate-temperature light source is used corresponds to Embodiment B.

Table 42 illustrates the specifications of the shade and projector lens and the evaluation function of Example 30.

Figure 58:
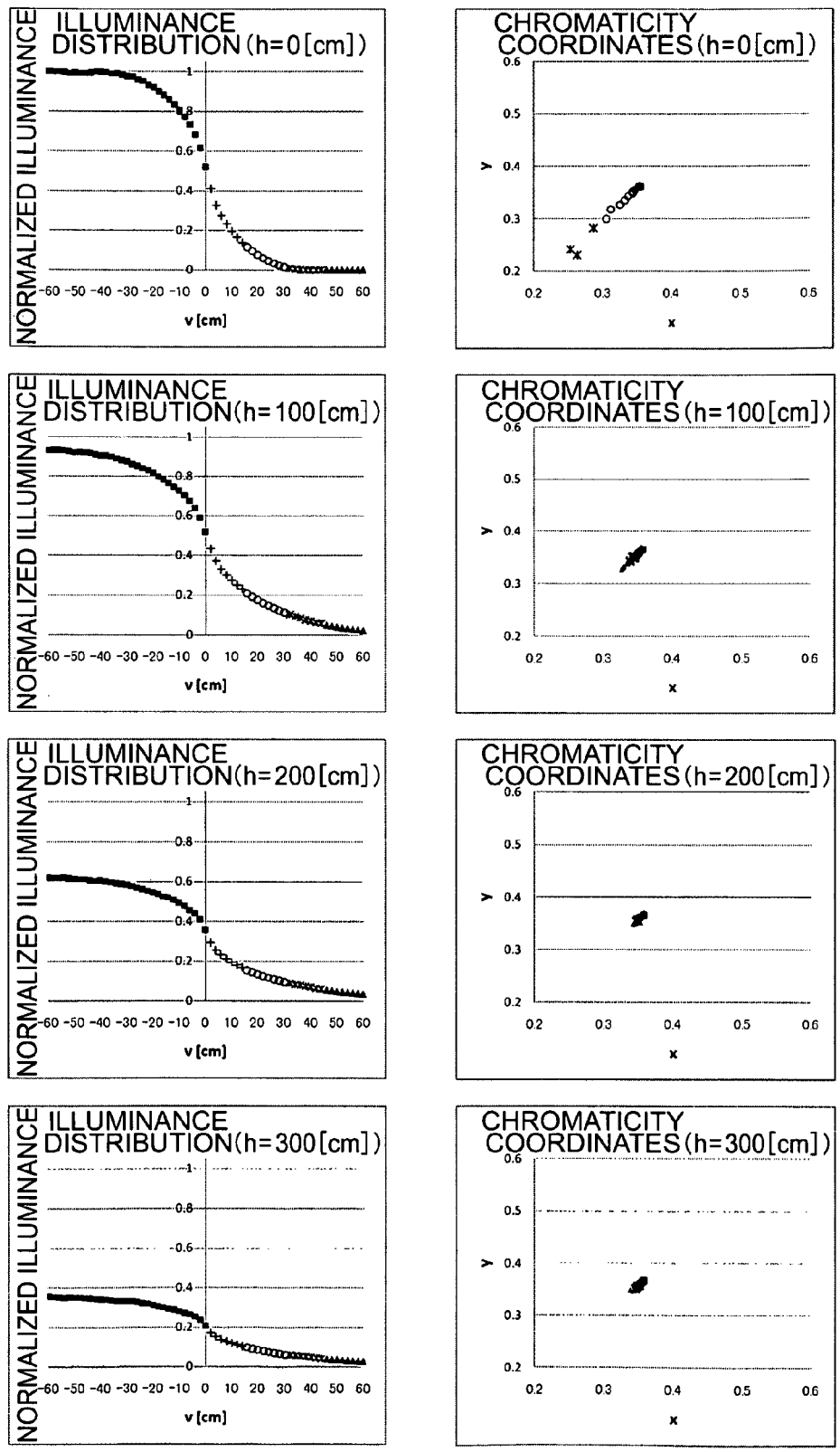
FIG. 58 illustrates light intensity distributions on the luminous intensity plane and distributions on the chromaticity coordinate plane of Example 30.

FIG. 58 illustrates light intensity distributions on the luminous intensity plane and distributions on the chromaticity coordinate plane of Example 30.

TABLE 42

LENS DATA

| | |
|---|---|
| DISTANCE BETWEEN SHADE SURFACE AND SOURCE SIDE SURFACE OF PROJECTOR LENS [mm] | 24.70 |
| PROJECTOR LENS MATERIAL | PC |
| PROJECTOR LENS CENTER THICKNESS [mm] | 12.89 |
| PROJECTOR LENS EFFECTIVE DIAMETER [mm] | 40.00 |

SHADE SURFACE sag

TABLE 42-continued

| R | k | $\alpha_4$ | $\alpha_6$ | $\alpha_8$ |
|---|---|---|---|---|
| 28.000 | 0.000 | 2.51E−05 | 1.63E−08 | −3.48E−10 |

| PROJECTOR LENS INCIDENT SURFACE |
|---|
| sag |
| R |
| 150.000 |

| PROJECTOR LENS OUTGOING SURFACE |
|---|
| sag |

| R | k | $\alpha_4$ | $\alpha_6$ | $\alpha_8$ | $\alpha_{10}$ |
|---|---|---|---|---|---|
| −23.601 | −0.544 | 2.34E−06 | 4.68E−09 | 5.01E−12 | −3.96E−15 |

| $\Phi$ | | | | |
|---|---|---|---|---|
| M | $\beta_2$ | $\beta_4$ | $\beta_6$ | $\beta_8$ |
| 1.000 | −15.172 | −3.54E−03 | −8.93E−06 | 1.63E−08 |

| PROJECTOR LENS FOCAL DISTANCE AND DIFFRACTION SURFACE FOCAL DISTANCE | | |
|---|---|---|
| f | $f_D$ | $f_D$/f/Abbe |
| 28.05 | 294.53 | 0.358 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0052 | 0.0104 | 0.0084 | 0.0049 | 0.0288 |

Example 31

Example 31 in which the low-temperature light source is used corresponds to Embodiment A.

Table 43 illustrates the specifications of the shade and projector lens and the evaluation function of Example 31.

Figure 59:
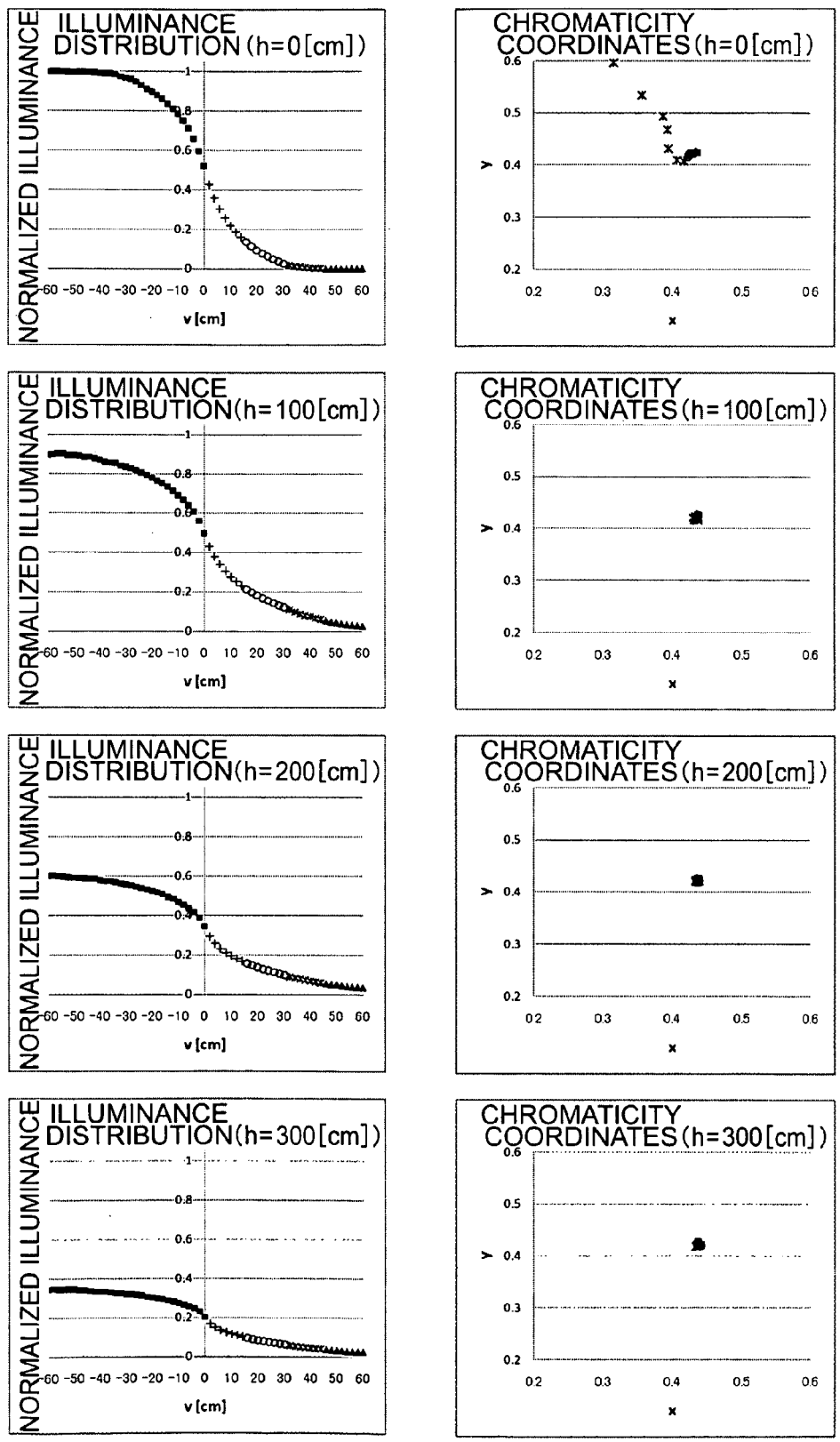
FIG. 59 illustrates light intensity distributions on the luminous intensity plane and distributions on the chromaticity coordinate plane of Example 31.

FIG. 59 illustrates light intensity distributions on the luminous intensity plane and distributions on the chromaticity coordinate plane of Example 31.

TABLE 43

| LENS DATA | |
|---|---|
| DISTANCE BETWEEN SHADE SURFACE AND SOURCE SIDE SURFACE OF PROJECTOR LENS [mm] | 24.30 |
| PROJECTOR LENS MATERIAL | PC |
| PROJECTOR LENS CENTER THICKNESS [mm] | 12.68 |
| PROJECTOR LENS EFFECTIVE DIAMETER [mm] | 40.00 |

| SHADE SURFACE |
|---|
| sag |

| R | k | $\alpha_4$ | $\alpha_6$ | $\alpha_8$ |
|---|---|---|---|---|
| 54.000 | 0.000 | 2.48E−05 | 1.77E−08 | −3.19E−10 |

| PROJECTOR LENS INCIDENT SURFACE |
|---|
| sag |
| R |
| 150.000 |

TABLE 43-continued

| PROJECTOR LENS OUTGOING SURFACE | | | | | |
|---|---|---|---|---|---|
| | | | sag | | |
| R | k | $\alpha_4$ | $\alpha_6$ | $\alpha_8$ | $\alpha_{10}$ |
| −24.065 | −0.520 | 2.54E−06 | 5.28E−09 | 4.24E−12 | −4.31E−15 |
| | | | $\Phi$ | | |
| M | $\beta_2$ | $\beta_4$ | | $\beta_6$ | $\beta_8$ |
| 1.000 | −19.311 | −4.03E−03 | | −1.23E−05 | 2.24E−08 |

| PROJECTOR LENS FOCAL DISTANCE AND DIFFRACTION SURFACE FOCAL DISTANCE | | |
|---|---|---|
| f | $f_D$ | $f_D$/f/Abbe |
| 27.78 | 234.62 | 0.288 |

| σ VALUE | | | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0043 | 0.0056 | 0.0039 | 0.0023 | 0.0161 |

Example 32

Example 30 in which the high-temperature light source is used corresponds to Embodiment F.

Table 44 illustrates the specifications of the shade and projector lens and the evaluation function of Example 32.

Figure 60:
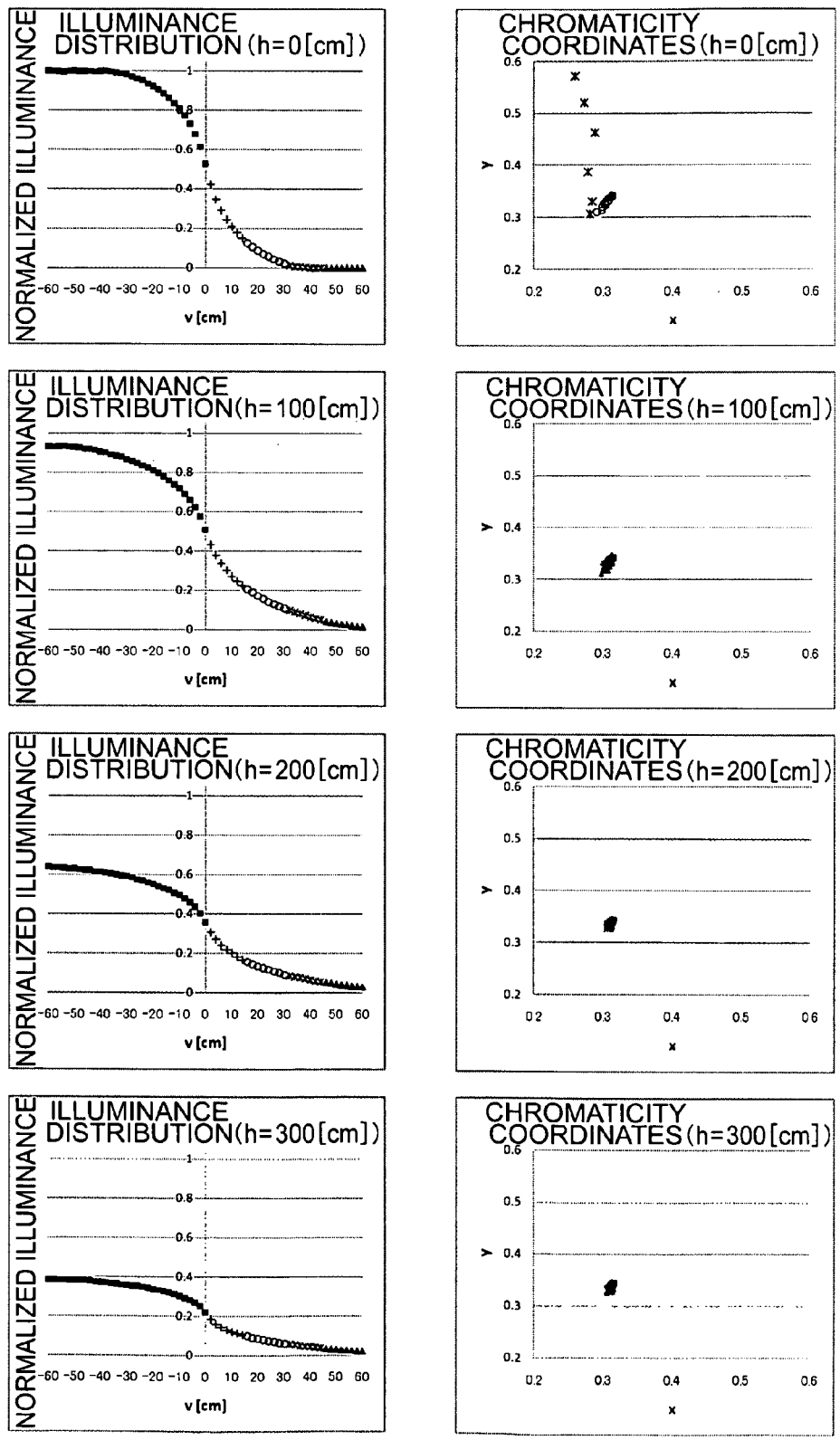
FIG. 60 illustrates light intensity distributions on the luminous intensity plane and distributions on the chromaticity coordinate plane of Example 32.

FIG. 60 illustrates light intensity distributions on the luminous intensity plane and distributions on the chromaticity coordinate plane of Example 32.

TABLE 44

| LENS DATA | |
|---|---|
| DISTANCE BETWEEN SHADE SURFACE AND SOURCE SIDE SURFACE OF PROJECTOR LENS [mm] | 24.80 |
| PROJECTOR LENS MATERIAL | PC |
| PROJECTOR LENS CENTER THICKNESS [mm] | 12.68 |
| PROJECTOR LENS EFFECTIVE DIAMETER [mm] | 40.00 |

| SHADE SURFACE | | | | |
|---|---|---|---|---|
| | | | sag | |
| R | k | $\alpha_4$ | $\alpha_6$ | $\alpha_8$ |
| 40.000 | 0.000 | 2.48E−05 | 1.77E−08 | −3.19E−10 |

| PROJECTOR LENS INCIDENT SURFACE |
|---|
| sag |
| R |
| 150.000 |

| PROJECTOR LENS OUTGOING SURFACE | | | | | |
|---|---|---|---|---|---|
| | | | sag | | |
| R | k | $\alpha_4$ | $\alpha_6$ | $\alpha_8$ | $\alpha_{10}$ |
| −24.065 | −0.520 | 2.54E−06 | 5.28E−09 | 4.24E−12 | −4.31E−15 |
| | | | $\Phi$ | | |

TABLE 44-continued

| M | $\beta_2$ | $\beta_4$ | $\beta_6$ | $\beta_8$ |
|---|---|---|---|---|
| 1.000 | −19.311 | −4.03E−03 | −1.23E−05 | 2.24E−08 |

| PROJECTOR LENS FOCAL DISTANCE AND DIFFRACTION SURFACE FOCAL DISTANCE | | |
|---|---|---|
| f | $f_D$ | $f_D$/f/Abbe |
| 27.78 | 234.62 | 0.288 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0088 | 0.0115 | 0.0090 | 0.0055 | 0.0347 |

Example 33

Example 33 in which the low-temperature light source is used corresponds to Embodiment D.

Table 44A illustrates the specifications of the shade and projector lens and the evaluation function of Example 33.

Figure 67:
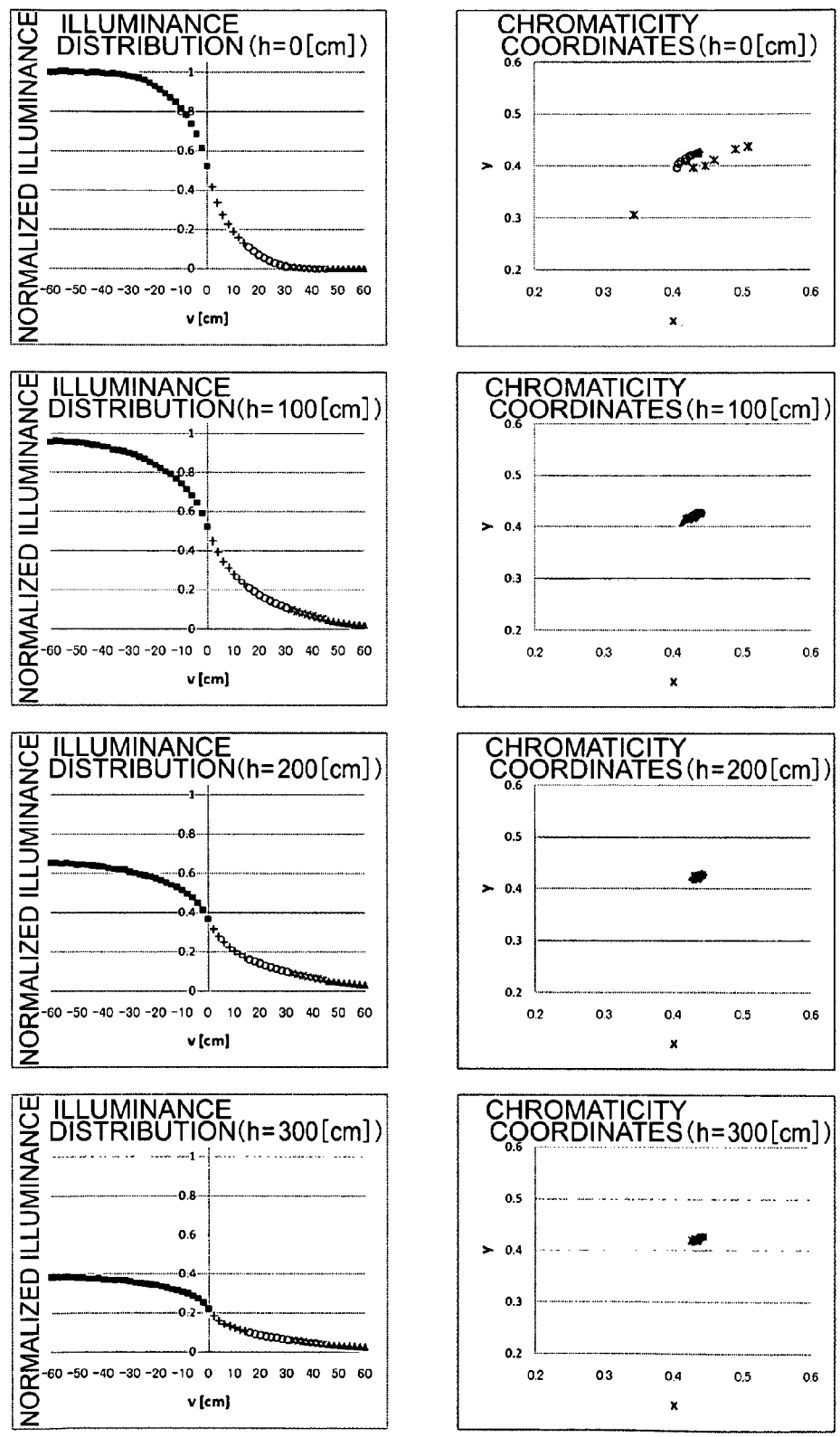
FIG. 67 illustrates light intensity distributions on the luminous intensity plane and distributions on the chromaticity coordinate plane of Example 33.

FIG. 67 illustrates light intensity distributions on the luminous intensity plane and distributions on the chromaticity coordinate plane of Example 33.

TABLE 44A

LENS DATA

| DISTANCE BETWEEN SHADE SURFACE AND SOURCE SIDE SURFACE OF PROJECTOR LENS [mm] | 24.85 |
|---|---|
| PROJECTOR LENS MATERIAL | PC |
| PROJECTOR LENS CENTER THICKNESS [mm] | 13.07 |
| PROJECTOR LENS EFFECTIVE DIAMETER [mm] | 40.00 |

SHADE SURFACE sag

| R | k | $\alpha_4$ | $\alpha_6$ | $\alpha_8$ |
|---|---|---|---|---|
| 38.000 | 0.000 | 2.49E−05 | 1.13E−08 | −3.59E−10 |

PROJECTOR LENS INCIDENT SURFACE sag

| R |
|---|
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −23.244 | −0.516 | 2.47E−06 | 5.30E−09 | 4.77E−12 | −3.02E−15 |

Φ

| M | $\beta_2$ | $\beta_4$ | $\beta_6$ | $\beta_8$ |
|---|---|---|---|---|
| 1.000 | −13.360 | −2.81E−03 | −9.95E−06 | 1.72E−08 |

| PROJECTOR LENS FOCAL DISTANCE AND DIFFRACTION SURFACE FOCAL DISTANCE | | |
|---|---|---|
| f | $f_D$ | $f_D$/f/Abbe |
| 27.85 | 333.78 | 0.409 |

σ VALUE

TABLE 44A-continued

| EVALUATION FUNCTION | h = 0 cm | h = 100 cm | h = 200 cm | h = 300 cm | TOTAL |
|---|---|---|---|---|---|
| $\sigma(h)^2$ | 0.0050 | 0.0068 | 0.0049 | 0.0029 | 0.0196 |

Example 34

Example 34 in which the low-temperature light source is used corresponds to Embodiment D.

Table 44B illustrates the specifications of the shade and projector lens and the evaluation function of Example 34.

Figure 68:
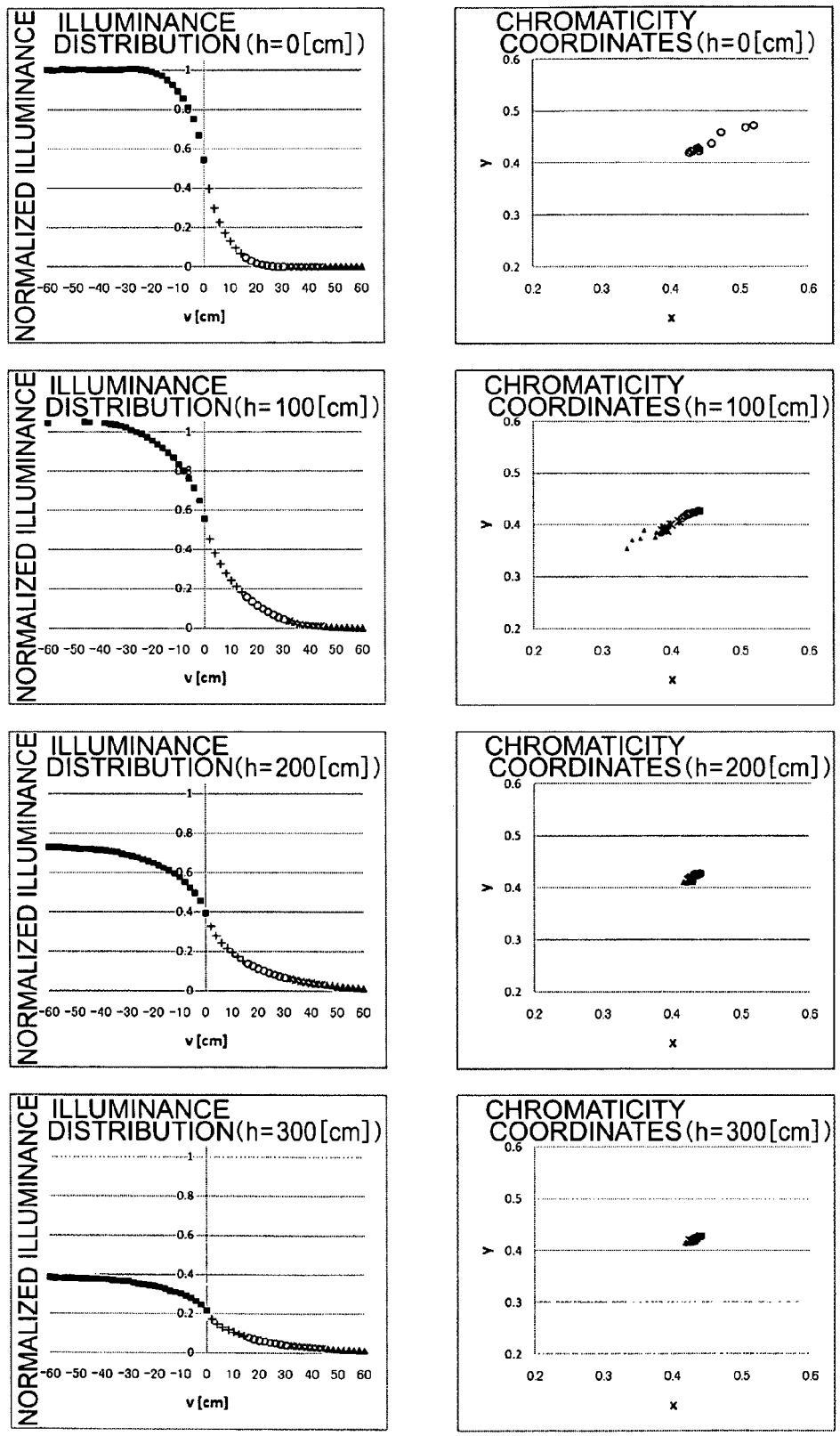
FIG. 68 illustrates light intensity distributions on the luminous intensity plane and distributions on the chromaticity coordinate plane of Example 34.

FIG. 68 illustrates light intensity distributions on the luminous intensity plane and distributions on the chromaticity coordinate plane of Example 34.

Comparative Example 7

Comparative Example 7 in which the intermediate-temperature light source is used is compared with the examples which correspond to Embodiment B (Examples 15, 16, 18 and 19).

Table 45 illustrates the specifications of the shade and projector lens and the evaluation function of Comparative Example 7.

TABLE 44B

| LENS DATA | |
|---|---|
| DISTANCE BETWEEN SHADE SURFACE AND SOURCE SIDE SURFACE OF PROJECTOR LENS [mm] | 30.00 |
| PROJECTOR LENS MATERIAL | PC |
| PROJECTOR LENS CENTER THICKNESS [mm] | 11.77 |
| PROJECTOR LENS EFFECTIVE DIAMETER [mm] | 40.00 |

SHADE SURFACE sag

| R | k | $\alpha_4$ | $\alpha_6$ | $\alpha_8$ |
|---|---|---|---|---|
| 38.000 | 0.000 | 1.38E−06 | 7.74E−08 | −3.88E−10 |

PROJECTOR LENS INCIDENT SURFACE sag

| R |
|---|
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −26.888 | −0.468 | 2.51E−06 | 3.51E−09 | 1.92E−12 | −1.93E−15 |

$\Phi$

| M | $\beta_2$ | $\beta_4$ | $\beta_6$ | $\beta_8$ |
|---|---|---|---|---|
| 1.000 | −12.069 | −1.88E−03 | −5.65E−06 | 1.01E−08 |

PROJECTOR LENS FOCAL DISTANCE AND DIFFRACTION SURFACE FOCAL DISTANCE

| f | $f_D$ | $f_D$/f/Abbe |
|---|---|---|
| 32.91 | 389.56 | 0.404 |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0057 | 0.0081 | 0.0060 | 0.0030 | 0.0229 |

Figure 61:
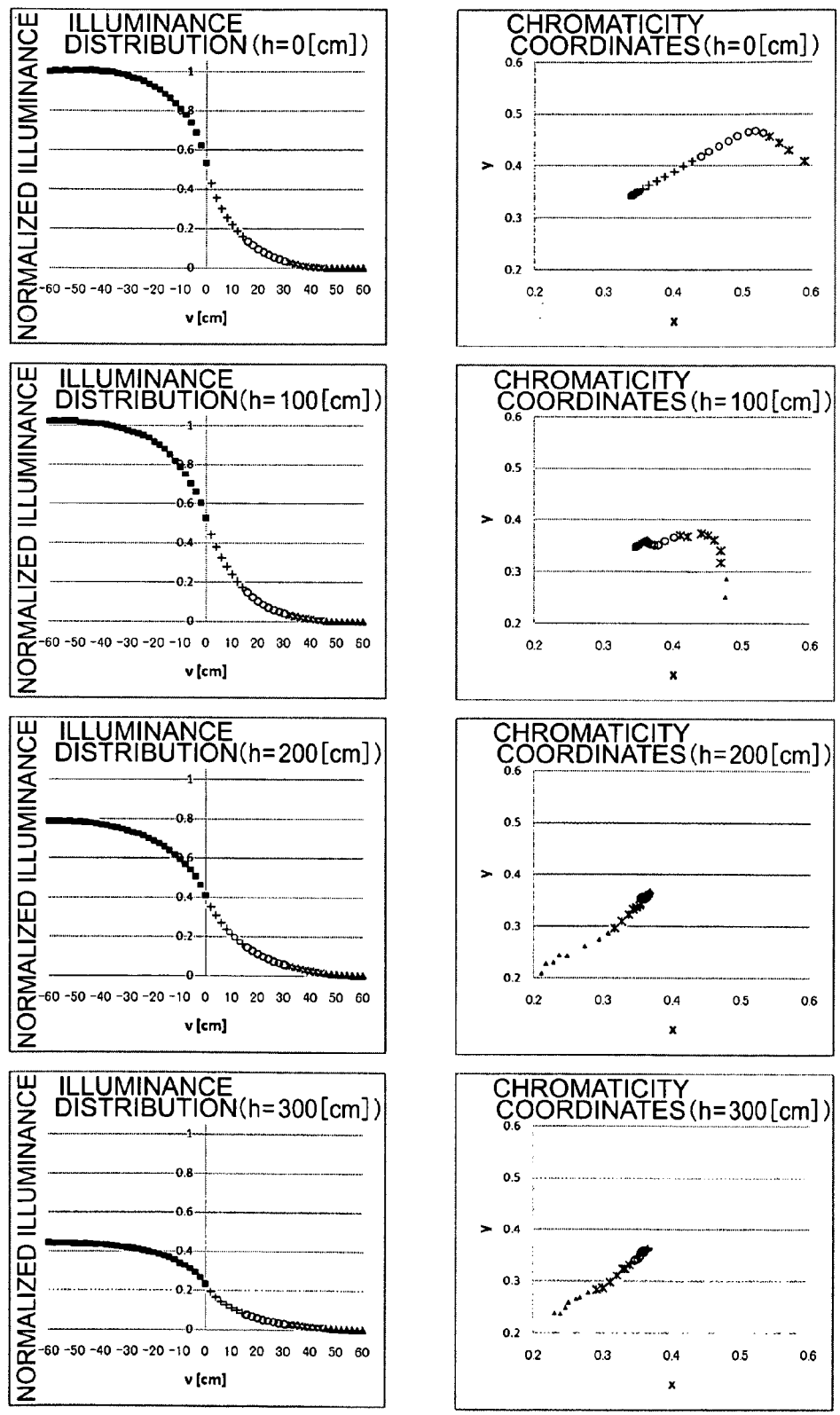
FIG. 61 illustrates light intensity distributions on the luminous intensity plane and distributions on the chromaticity coordinate plane of Comparative Example 7.

FIG. 61 illustrates light intensity distributions on the luminous intensity plane and distributions on the chromaticity coordinate plane of Comparative Example 7.

TABLE 45

| LENS DATA | |
|---|---|
| DISTANCE BETWEEN SHADE SURFACE AND SOURCE SIDE SURFACE OF PROJECTOR LENS [mm] | 29.00 |
| PROJECTOR LENS MATERIAL | PC |
| PROJECTOR LENS CENTER THICKNESS [mm] | 12.45 |
| PROJECTOR LENS EFFECTIVE DIAMETER [mm] | 40.00 |

| SHADE SURFACE | | | | |
|---|---|---|---|---|
| | | sag | | |
| R | k | $\alpha_4$ | $\alpha_6$ | $\alpha_8$ |
| 26.000 | 0.000 | 2.01E−05 | 3.07E−08 | −3.47E−10 |

| PROJECTOR LENS INCIDENT SURFACE |
|---|
| sag |
| R |
| 150.000 |

| PROJECTOR LENS OUTGOING SURFACE | | | | | |
|---|---|---|---|---|---|
| | | sag | | | |
| R | k | $\alpha_4$ | $\alpha_6$ | $\alpha_8$ | $\alpha_{10}$ |
| −24.988 | −0.896 | 1.71E−07 | −5.88E−09 | 2.56E−11 | −2.71E−14 |

| Φ | | | | |
|---|---|---|---|---|
| M | $\beta_2$ | $\beta_4$ | $\beta_6$ | $\beta_8$ |
| 1.000 | — | — | — | — |

| σ VALUE | | | | | |
|---|---|---|---|---|---|
| EVALUATION FUNCTION | h = 0 cm | h = 100 cm | h = 200 cm | h = 300 cm | TOTAL |
| $\sigma(h)^2$ | 0.0510 | 0.0044 | 0.0048 | 0.0042 | 0.0645 |

Comparative Example 8

Comparative Example 7 in which the intermediate-temperature light source is used is compared with the examples which correspond to Embodiment E (Examples 17 and 20).

Table 46 illustrates the specifications of the shade and projector lens and the evaluation function of Comparative Example 8.

Figure 62:
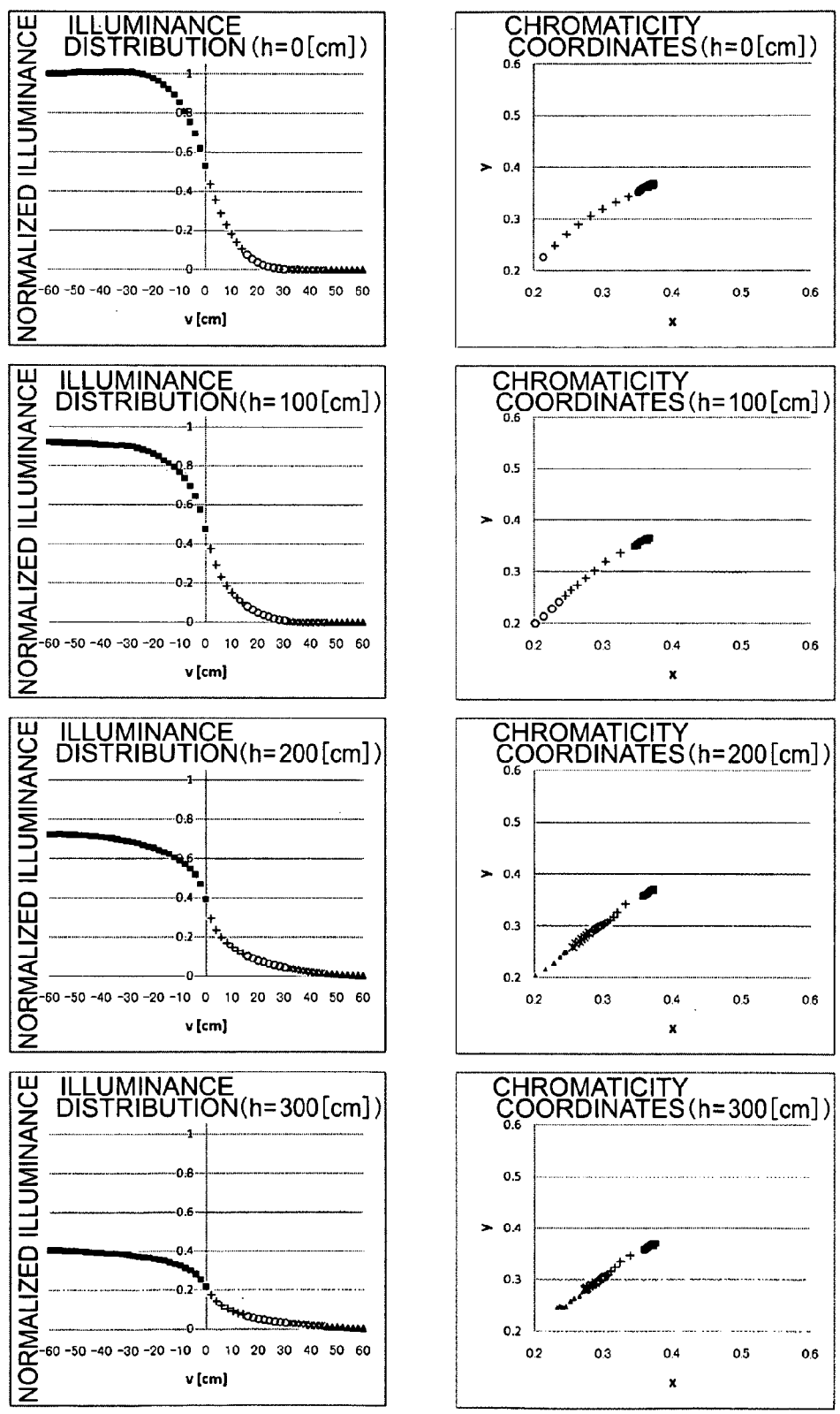
FIG. 62 illustrates light intensity distributions on the luminous intensity plane and distributions on the chromaticity coordinate plane of Comparative Example 8.

FIG. 62 illustrates light intensity distributions on the luminous intensity plane and distributions on the chromaticity coordinate plane of Comparative Example 8.

TABLE 46

| LENS DATA | |
|---|---|
| DISTANCE BETWEEN SHADE SURFACE AND SOURCE SIDE SURFACE OF PROJECTOR LENS [mm] | 32.20 |
| PROJECTOR LENS MATERIAL | PC |
| PROJECTOR LENS CENTER THICKNESS [mm] | 12.45 |
| PROJECTOR LENS EFFECTIVE DIAMETER [mm] | 40.00 |

| SHADE SURFACE |
|---|
| sag |

TABLE 46-continued

| R | k | $\alpha_4$ | $\alpha_6$ | $\alpha_8$ | |
|---|---|---|---|---|---|
| 23.000 | 0.000 | 2.01E−05 | 3.07E−08 | −3.47E−10 | |
| PROJECTOR LENS INCIDENT SURFACE | | | | | |
| sag | | | | | |
| R | | | | | |
| 150.000 | | | | | |
| PROJECTOR LENS OUTGOING SURFACE | | | | | |
| sag | | | | | |
| R | k | $\alpha_4$ | $\alpha_6$ | $\alpha_8$ | $\alpha_{10}$ |
| −24.988 | −0.896 | 1.71E−07 | −5.88E−09 | 2.56E−11 | −2.71E−14 |
| $\Phi$ | | | | | |
| M | $\beta_2$ | $\beta_4$ | $\beta_6$ | $\beta_8$ | |
| 1.000 | — | — | — | — | |
| $\sigma$ VALUE | | | | | |
| EVALUATION FUNCTION | h = 0 cm | h = 100 cm | h = 200 cm | h = 300 cm | TOTAL |
| $\sigma(h)^2$ | 0.0587 | 0.0535 | 0.0321 | 0.0189 | 0.1632 |

Comparative Example 9

Comparative Example 9 in which the low-temperature light source is used is compared with the examples which correspond to Embodiment A (Examples 21 and 23).

Table 47 illustrates the specifications of the shade and projector lens and the evaluation function of Comparative Example 9.

Figure 63:
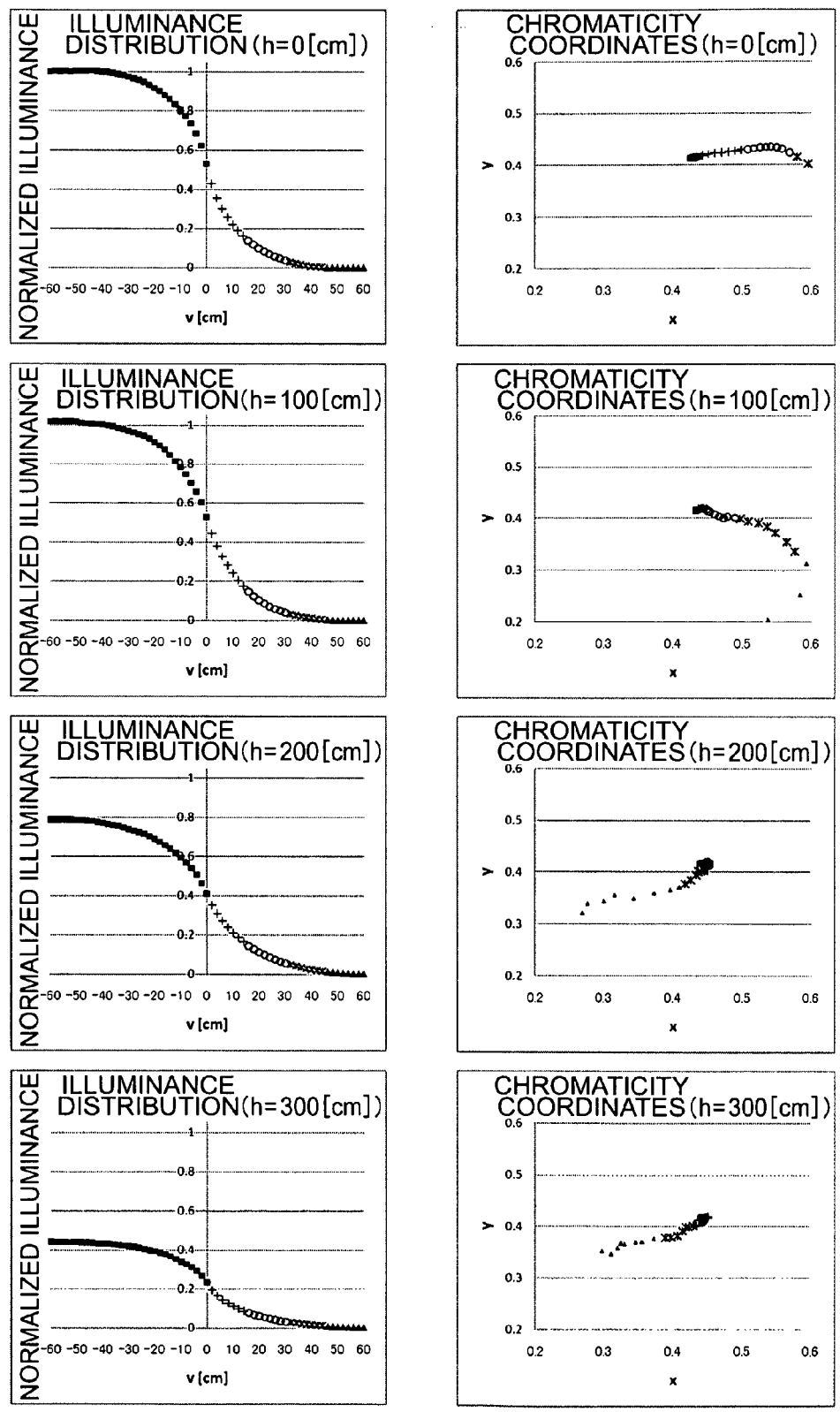
FIG. 63 illustrates light intensity distributions on the luminous intensity plane and distributions on the chromaticity coordinate plane of Comparative Example 9.

FIG. 63 illustrates light intensity distributions on the luminous intensity plane and distributions on the chromaticity coordinate plane of Comparative Example 9.

TABLE 47

| LENS DATA | |
|---|---|
| DISTANCE BETWEEN SHADE SURFACE AND SOURCE SIDE SURFACE OF PROJECTOR LENS [mm] | 29.00 |
| PROJECTOR LENS MATERIAL | PC |
| PROJECTOR LENS CENTER THICKNESS [mm] | 12.45 |
| PROJECTOR LENS EFFECTIVE DIAMETER [mm] | 40.00 |

| SHADE SURFACE | | | | | |
|---|---|---|---|---|---|
| sag | | | | | |
| R | k | $\alpha_4$ | $\alpha_6$ | $\alpha_8$ | |
| 26.000 | 0.000 | 2.01E−05 | 3.07E−08 | −3.47E−10 | |
| PROJECTOR LENS INCIDENT SURFACE | | | | | |
| sag | | | | | |
| R | | | | | |
| 150.000 | | | | | |
| PROJECTOR LENS OUTGOING SURFACE | | | | | |
| sag | | | | | |
| R | k | $\alpha_4$ | $\alpha_6$ | $\alpha_8$ | $\alpha_{10}$ |

TABLE 47-continued

| | | | | | |
|---|---|---|---|---|---|
| −24.988 | −0.896 | 1.71E−07 | −5.88E−09 | 2.56E−11 | −2.71E−14 |

Φ

| M | $\beta_2$ | $\beta_4$ | $\beta_6$ | $\beta_8$ |
|---|---|---|---|---|
| 1.000 | — | — | — | — |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0236 | 0.0050 | 0.0028 | 0.0024 | 0.0338 |

Comparative Example 10

Comparative Example 10 in which the low-temperature light source is used is compared with the examples which correspond to Embodiment D (Examples 26 and 28).

Table 48 illustrates the specifications of the shade and projector lens and the evaluation function of Comparative Example 10.

Figure 64:
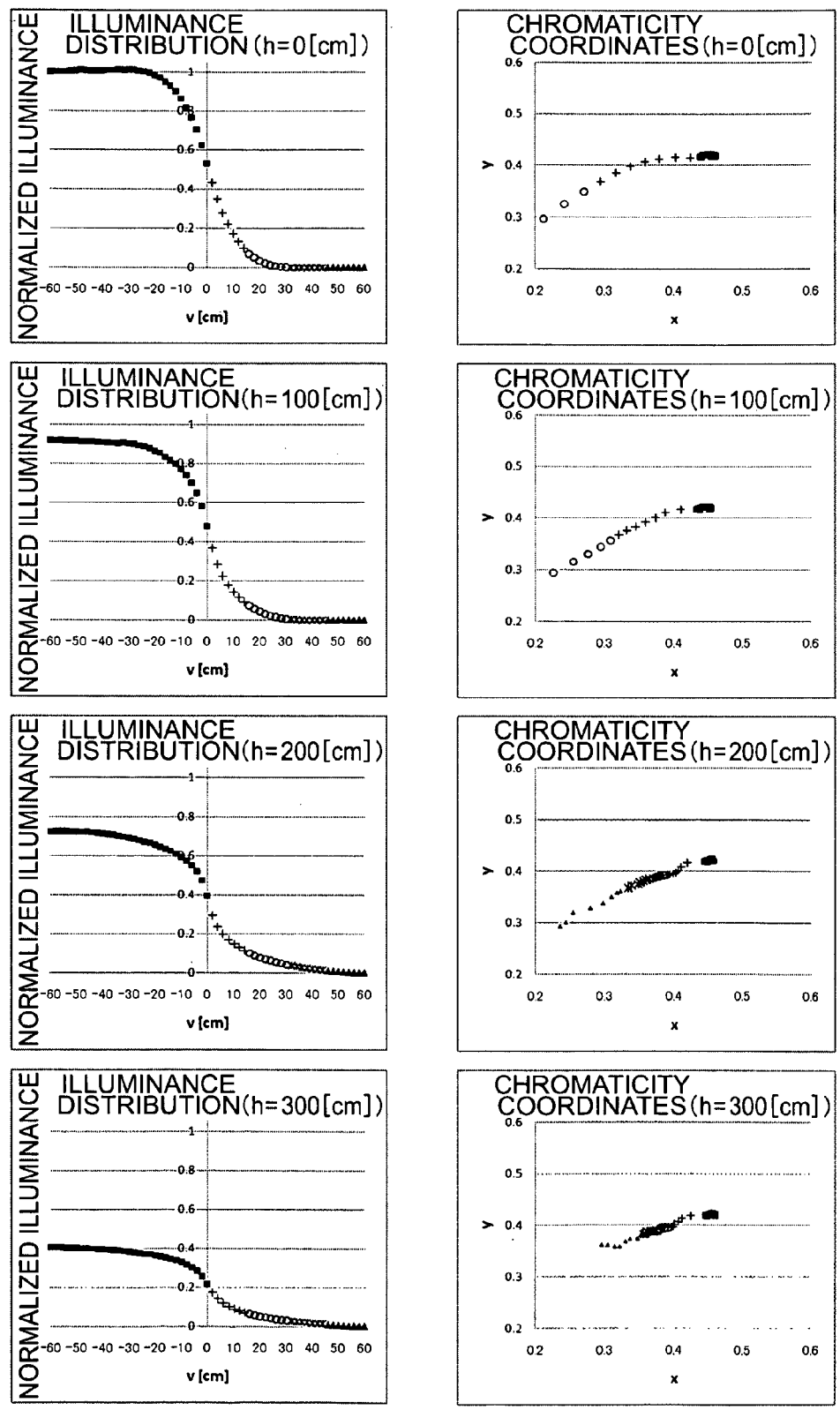
FIG. 64 illustrates light intensity distributions on the luminous intensity plane and distributions on the chromaticity coordinate plane of Comparative Example 10.

FIG. 64 illustrates light intensity distributions on the luminous intensity plane and distributions on the chromaticity coordinate plane of Comparative Example 10.

Comparative Example 11

Comparative Example 11 in which the high-temperature light source is used is compared with the examples which correspond to Embodiment C (Examples 25 and 27).

Table 49 illustrates the specifications of the shade and projector lens and the evaluation function of Comparative Example 11.

Figure 65:
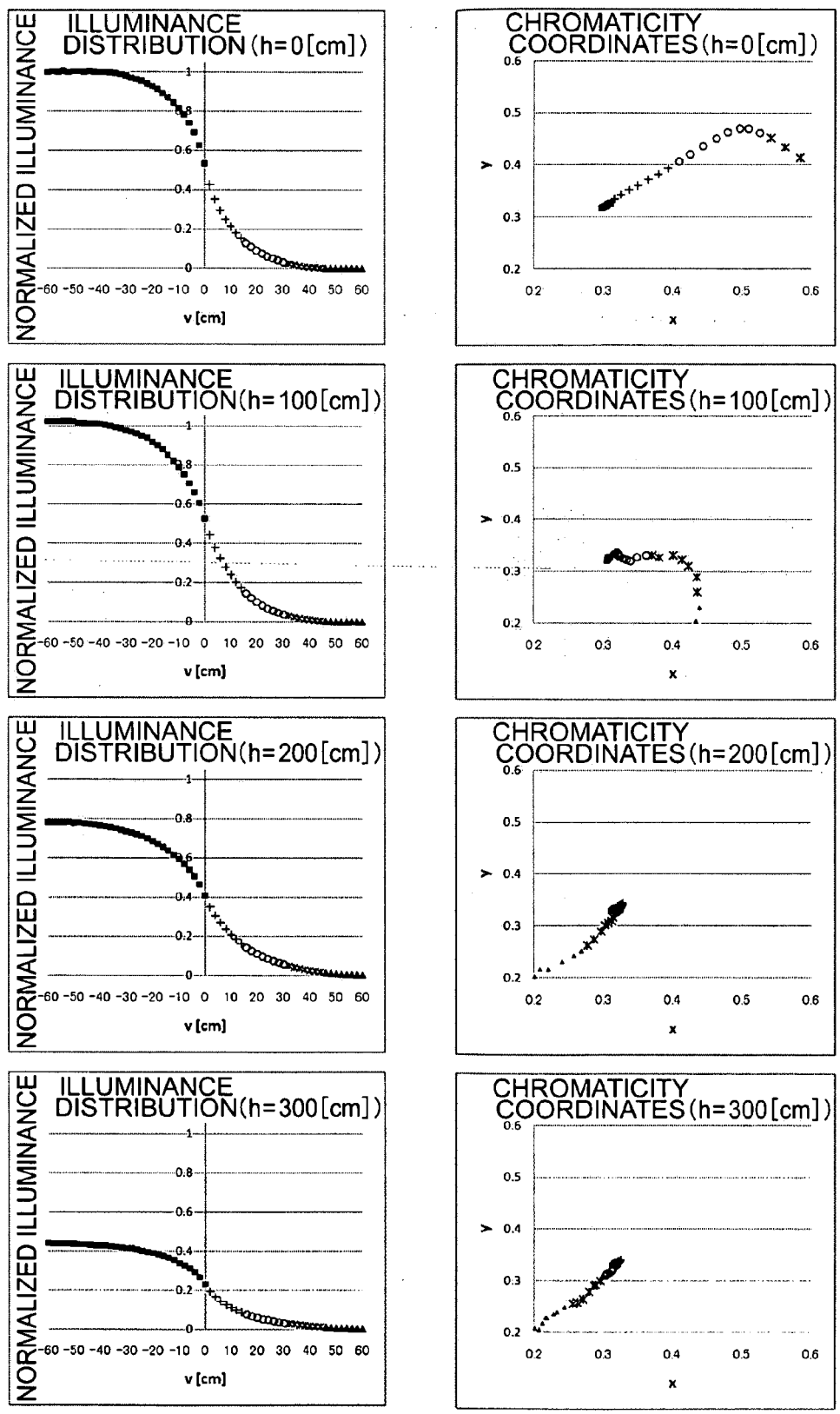
FIG. 65 illustrates light intensity distributions on the luminous intensity plane and distributions on the chromaticity coordinate plane of Comparative Example 11.

FIG. 65 illustrates light intensity distributions on the luminous intensity plane and distributions on the chromaticity coordinate plane of Comparative Example 11.

TABLE 48

LENS DATA

| | |
|---|---|
| DISTANCE BETWEEN SHADE SURFACE AND SOURCE SIDE SURFACE OF PROJECTOR LENS [mm] | 32.20 |
| PROJECTOR LENS MATERIAL | PC |
| PROJECTOR LENS CENTER THICKNESS [mm] | 12.45 |
| PROJECTOR LENS EFFECTIVE DIAMETER [mm] | 40.00 |

SHADE SURFACE sag

| R | k | $\alpha_4$ | $\alpha_6$ | $\alpha_8$ |
|---|---|---|---|---|
| 23.000 | 0.000 | 2.01E−05 | 3.07E−08 | −3.47E−10 |

PROJECTOR LENS INCIDENT SURFACE sag

| R |
|---|
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −24.988 | −0.896 | 1.71E−07 | −5.88E−09 | 2.56E−11 | −2.71E−14 |

Φ

| M | $\beta_2$ | $\beta_4$ | $\beta_6$ | $\beta_8$ |
|---|---|---|---|---|
| 1.000 | — | — | — | — |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0502 | 0.0424 | 0.0190 | 0.0113 | 0.1228 |

TABLE 49

LENS DATA

| | |
|---|---|
| DISTANCE BETWEEN SHADE SURFACE AND SOURCE SIDE SURFACE OF PROJECTOR LENS [mm] | 29.00 |
| PROJECTOR LENS MATERIAL | PC |
| PROJECTOR LENS CENTER THICKNESS [mm] | 12.45 |
| PROJECTOR LENS EFFECTIVE DIAMETER [mm] | 40.00 |

SHADE SURFACE sag

| R | k | $\alpha_4$ | $\alpha_6$ | $\alpha_8$ |
|---|---|---|---|---|
| 26.000 | 0.000 | 2.01E−05 | 3.07E−08 | −3.47E−10 |

PROJECTOR LENS INCIDENT SURFACE sag

| R |
|---|
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −24.988 | −0.896 | 1.71E−07 | −5.88E−09 | 2.56E−11 | −2.71E−14 |

Φ

| M | $\beta_2$ | $\beta_4$ | $\beta_6$ | $\beta_8$ |
|---|---|---|---|---|
| 1.000 | — | — | — | — |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0666 | 0.0046 | 0.0058 | 0.0050 | 0.0819 |

Comparative Example 12

Comparative Example 12 in which the high-temperature light source is used is compared with the examples which correspond to Embodiment F (Examples 22 and 24).

Table 50 illustrates the specifications of the shade and projector lens and the evaluation function of Comparative Example 12.

Figure 66:
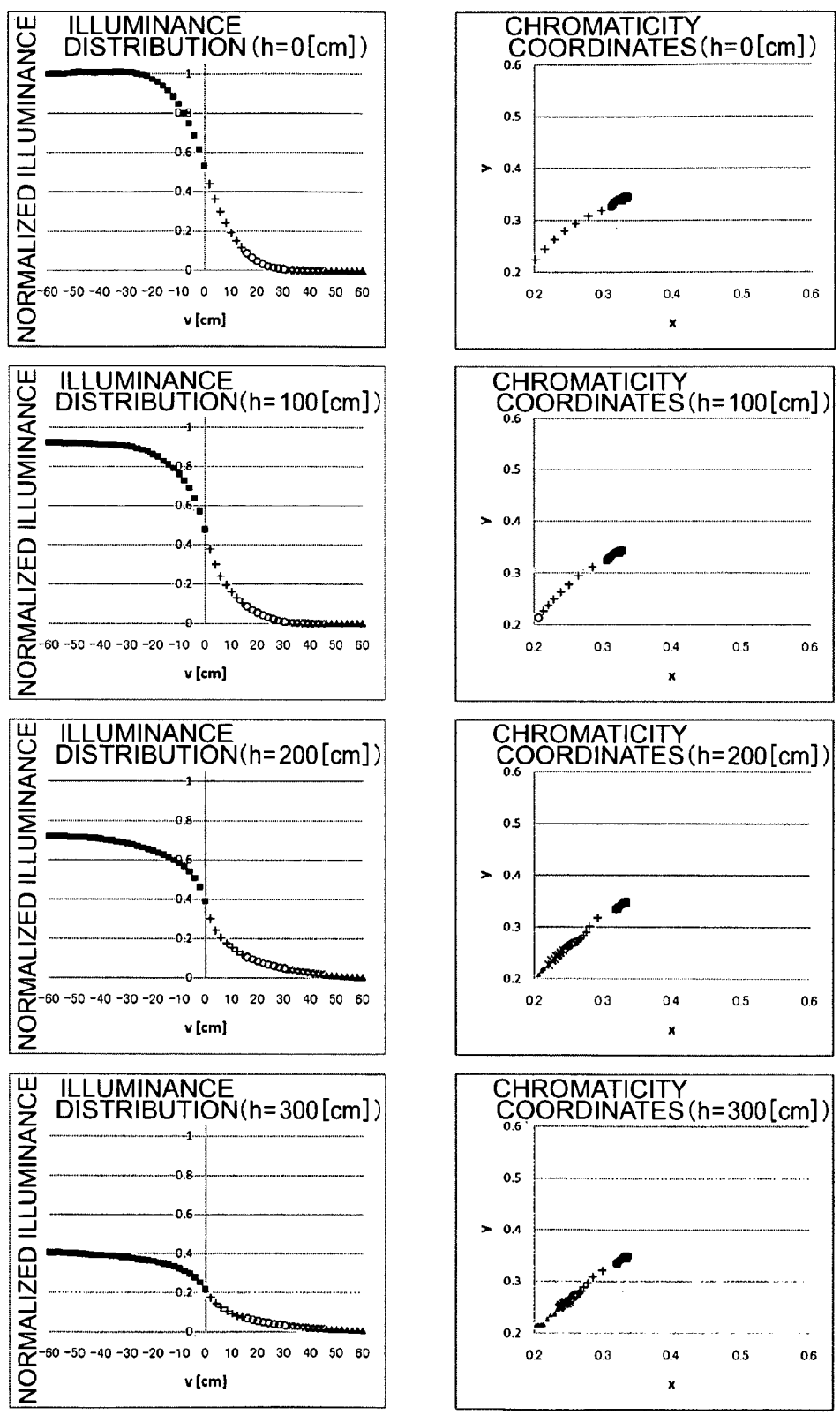
FIG. 66 illustrates light intensity distributions on the luminous intensity plane and distributions on the chromaticity coordinate plane of Comparative Example 12.

FIG. 66 illustrates light intensity distributions on the luminous intensity plane and distributions on the chromaticity coordinate plane of Comparative Example 12.

TABLE 50

LENS DATA

| | |
|---|---|
| DISTANCE BETWEEN SHADE SURFACE AND SOURCE SIDE SURFACE OF PROJECTOR LENS [mm] | 32.20 |
| PROJECTOR LENS MATERIAL | PC |
| PROJECTOR LENS CENTER THICKNESS [mm] | 12.45 |
| PROJECTOR LENS EFFECTIVE DIAMETER [mm] | 40.00 |

SHADE SURFACE sag

| R | k | $\alpha_4$ | $\alpha_6$ | $\alpha_8$ |
|---|---|---|---|---|
| 23.000 | 0.000 | 2.01E−05 | 3.07E−08 | −3.47E−10 |

PROJECTOR LENS INCIDENT SURFACE

TABLE 50-continued

| sag |
|---|
| R |
| 150.000 |

PROJECTOR LENS OUTGOING SURFACE sag

| R | k | $\alpha_4$ | $\alpha_6$ | $\alpha_8$ | $\alpha_{10}$ |
|---|---|---|---|---|---|
| −24.988 | −0.896 | 1.71E−07 | −5.88E−09 | 2.56E−11 | −2.71E−14 |

Φ

| M | $\beta_2$ | $\beta_4$ | $\beta_6$ | $\beta_8$ |
|---|---|---|---|---|
| 1.000 | — | — | — | — |

σ VALUE

| EVALUATION FUNCTION | h = 0 cm | h = 100 cm | h = 200 cm | h = 300 cm | TOTAL |
|---|---|---|---|---|---|
| $\sigma(h)^2$ | 0.0611 | 0.0555 | 0.0368 | 0.0218 | 0.1752 |

Evaluation of Examples

When the evaluation functions (total) of Examples 21, 23, and 31 corresponding to Embodiment A are compared to the evaluation function (total) of Comparative Example 9, the evaluation functions of Examples 21, 23, and 31 are lower than 55% of that of Comparative Example 9, and the evaluation functions of Examples 21, 23, and 31 are sufficiently reduced.

When the evaluation functions (total) of Examples 15, 16, 18, 19, 29, and 30 corresponding to Embodiment B are compared to the evaluation function (total) of Comparative Example 7, the evaluation functions of Examples 15, 16, 18, 19, 29, and 30 are lower than 45% of that of Comparative Example 9, and the evaluation functions of Examples 15, 16, 18, 19, 29, and 30 are sufficiently reduced.

When the evaluation function (total) of Example 25 corresponding to Embodiment C is compared to the evaluation function (total) of Comparative Example 11, the evaluation function of Example 25 is lower than 45% of that of Comparative Example 11, and the evaluation function of Example 25 is sufficiently reduced.

When the evaluation functions (total) of Examples 26, 28, 33, and 34 corresponding to Embodiment D are compared to the evaluation function (total) of Comparative Example 10, the evaluation functions of Examples 26, 28, 33, and 34 are lower than 25% of that of Comparative Example 10, and the evaluation functions of Examples 26, 28, 33, and 34 are sufficiently reduced.

When the evaluation functions (total) of Examples 17, 20, and 27 corresponding to Embodiment E are compared to the evaluation function (total) of Comparative Example 8, the evaluation functions of Examples 17, 20, and 27 are lower than 20% of that of Comparative Example 8, and the evaluation functions of Examples 17, 20, and 27 are sufficiently reduced.

When the evaluation functions (total) of Examples 22, 24, and 32 corresponding to Embodiment F are compared to the evaluation function (total) of Comparative Example 12, the evaluation functions of Examples 22, 24, and 32 are lower than 25% of that of Comparative Example 12, and the evaluation functions of Examples 22, 24, and 32 are sufficiently reduced.

Thus, according to the embodiments of the invention, the color separation can largely reduced in consideration of the characteristic of the light source.

Diffraction Grating Region

FIG. 7 illustrates a diffraction grating region on the condition (corresponding to Embodiments A to C) that the light is not collected.

$Y_0$ is set to a non-negative constant that is smaller than the effective radius of the projector lens, and the diffraction grating is provided in the region of $Y \geq Y_0$ of the surface in which the diffraction grating of the projector lens is provided in the coordinate system, in which the optical axis of the projector lens is set to the Z-axis and the horizontal direction and the vertical direction are set to the X-axis and the Y-axis.

On the condition (corresponding to Embodiments D to F) that the light is collected, the diffraction grating is provided in the region of $Y \leq -Y_0$ of the surface in which the diffraction grating of the projector lens is provided.

As can be seen from the simulation results, in order to sufficiently perform the achromatism, preferably $Y_0$ is set such that the light quantity of the light passing through the diffraction grating region is equal to or more than 5% of the light quantity of the light passing through the projector lens. It is assumed that the light passes evenly through the whole surface of the projector lens. In the case of $Y_0 \geq 0.8054 r_0$, the light quantity of the light passing through the diffraction grating region is equal to or more than 5% of the light quantity of the light passing through the projector lens.

Features of Embodiments of the Invention

The features of the embodiments of the invention will be described below.

A vehicular lamp according to an embodiment of the invention is characterized in that the end portion is the upper end portion, the correlated color temperature of the light source is lower than 3200 K, the expression of $f_D/f/\text{Abbe} < 0.29$ holds, and the position of the shade on the optical axis is brought closer to the projector lens than the focal position closest to the projector lens in the focal positions to the lights that pass through the upper end portion and have the wavelength of 450 nm to 700 nm.

In the embodiment, the blue ray is generated in the circumferential portion of the light flux with which the object ahead is irradiated through the projector lens. Although the low-temperature light source is reddish, the color separation toward the red side can be prevented by generating the blue ray in the circumferential portion.

A vehicular lamp according to an embodiment of the invention is characterized in that the end portion is the upper end portion, the correlated color temperature of the light source ranges from 3200 K to 6500 K, the expression of $0.28 < f_D/f/\text{Abbe} < 0.36$ holds, and the position of the shade on the optical axis is brought closer to the projector lens than the focal position closest to the projector lens in the focal positions to the lights that pass through the upper end portion and have the wavelength of 450 nm to 700 nm.

In the embodiment, the intermediate-temperature light source is seemed to be substantially white, so that the color separation can be reduced by suppressing the color aberration of the projector lens as much as possible.

A vehicular lamp according to an embodiment of the invention is characterized in that the end portion is the upper end portion, the correlated color temperature of the light source is higher than 6500 K, the expression of $0.33 < f_D/f/\text{Abbe}$ holds, and the position of the shade on the optical axis is brought closer to the projector lens than the focal position closest to the projector lens in the focal positions to the lights that pass through the upper end portion and have the wavelength of 450 nm to 700 nm.

In the embodiment, the red ray is generated in the circumferential portion of the light flux with which the object ahead is irradiated through the projector lens. Although the high-temperature light source is bluish, the color separation toward the blue side can be prevented by generating the red ray in the circumferential portion.

A vehicular lamp according to an embodiment of the invention is characterized in that the end portion is the lower end portion, the correlated color temperature of light source is lower than 3200 K, the expression of $0.34 < f_D/f/\text{Abbe}$ holds, and the position of the shade on the optical axis is kept farther away from the projector lens than the focal position farthest away from the projector lens in the focal positions to the lights that pass through the lower end portion and have the wavelength of 450 nm to 700 nm.

In the embodiment, the blue ray is generated in the circumferential portion of the light flux with which the object ahead is irradiated through the projector lens. Although the low-temperature light source is reddish, the color separation toward the red side can be prevented by generating the blue ray in the circumferential portion.

A vehicular lamp according to an embodiment of the invention is characterized in that the end portion is the lower end portion, the correlated color temperature of the light source ranges from 3200 K to 6500 K, the expression of $0.28 < f_D/f/\text{Abbe} < 0.36$ holds, and the position of the shade on the optical axis is kept farther away from the projector lens than the focal position farthest away from the projector lens in the focal positions to the lights that pass through the lower end portion and have the wavelength of 450 nm to 700 nm.

In the embodiment, the intermediate-temperature light source is seemed to be substantially white, so that the color separation can be reduced by suppressing the color aberration of the projector lens as much as possible.

A vehicular lamp according to an embodiment of the invention is characterized in that the end portion is the lower end portion, the correlated color temperature of the light source is higher than 6500 K, the expression of $f_D/f/\text{Abbe} < 0.29$ holds, and the position of the shade on the optical axis is kept farther away from the projector lens than the focal position farthest away from the projector lens in the focal positions to the lights that pass through the lower end portion and have the wavelength of 450 nm to 700 nm.

In the embodiment, the red ray is generated in the circumferential portion of the light flux with which the object ahead is irradiated through the projector lens. Although the high-temperature light source is bluish, the color separation toward the blue side can be prevented by generating the red ray in the circumferential portion.

A vehicular lamp according to an embodiment of the invention is characterized in that $Y_0$ is set to the non-negative constant that is smaller than the effective radius of the projector lens and the diffraction grating is provided in the region of $Y \geq Y_0$ of the surface in which the diffraction grating of the projector lens is provided in the coordinate system, in which the optical axis of the projector lens is set to the Z-axis and the horizontal direction and the vertical direction are set to the X-axis and the Y-axis.

The vehicular lamp of the embodiment can easily be produced at low cost.

A vehicular lamp according to an embodiment of the invention is characterized in that $Y_0$ is set to the non-negative constant that is smaller than the effective radius of the projector lens and the diffraction grating is provided in the region of $Y \leq -Y_0$ of the surface in which the diffraction grating of the projector lens is provided in the coordinate system, in which the optical axis of the projector lens is set to the Z-axis and the horizontal direction and the vertical direction are set to the X-axis and the Y-axis.

The vehicular lamp of the embodiment can easily be produced at low cost.

A vehicular lamp according to an embodiment of the invention is characterized in that the projector lens is a Fresnel lens and the diffraction grating is provided on the Fresnel lens.

The vehicular lamp of the embodiment can easily be produced at low cost.

A vehicular lamp according to an embodiment of the invention is characterized in that the projector lens is a cylindrical lens and the diffraction grating is provided in the cylindrical lens.

The vehicular lamp of the embodiment has an advantage that the color separation is easily reduced near the end of the luminous intensity in the horizontal direction.

A vehicular lamp according to an embodiment of the invention is characterized in that the light source is an LED.

The vehicular lamp of the embodiment has an advantage that the optical system is easy to miniaturize.

What is claimed is:

1. A vehicular lamp comprising a light source, a reflector, a shade, and a projector lens,
    wherein light emitted from the light source is reflected by the reflector, the light is partially blocked by the shade, the light not blocked is transmitted through the projector lens, and an object ahead a vehicle is irradiated with the light,
    a diffraction grating is provided in a region including an end portion of a light passing region of at least one surface in the projector lens in order to reduce color separation, and
    magnitude of $f_D/f/\text{Abbe}$ and a position of the shade on an optical axis are determined according to a correlated color temperature of the light source so as to reduce the color separation caused by a characteristic of the light source, where f is a focal distance of the projector lens, the focal distance of the projector lens being determined by a marginal ray passing through the end portion, $f_D$ is a focal distance caused by a grating pitch of a diffraction surface, the focal distance caused by the grating pitch being determined by the marginal ray passing through the end portion, and Abbe is an Abbe number.

2. The vehicular lamp according to claim 1, wherein the end portion is an upper end portion, the correlated color temperature of the light source is lower than 3200 K, an expression of $f_D/f/Abbe<0.29$ holds, and the position of the shade on the optical axis is brought closer to the projector lens than the focal position closest to the projector lens in focal positions to lights that pass through the upper end portion and have a wavelength of 450 nm to 700 nm.

3. The vehicular lamp according to claim 1, wherein the end portion is an upper end portion, the correlated color temperature of the light source ranges from 3200 K to 6500 K, an expression of $0.28<f_D/f/Abbe<0.36$ holds, and the position of the shade on the optical axis is brought closer to the projector lens than the focal position closest to the projector lens in focal positions to lights that pass through the upper end portion and have the wavelength of 450 nm to 700 nm.

4. The vehicular lamp according to claim 1, wherein the end portion is an upper end portion, the correlated color temperature of the light source is higher than 6500 K, and an expression of $0.33<f_D/f/Abbe$, and the position of the shade on the optical axis is brought closer to the projector lens than the focal position closest to the projector lens in focal positions to lights that pass through the upper end portion and have a wavelength of 450 nm to 700 nm.

5. The vehicular lamp according to claim 1, wherein the end portion is a lower end portion, the correlated color temperature of the light source is lower than 3200 K, an expression of $0.34<f_D/f/Abbe$, and the position of the shade on the optical axis is kept farther away from the projector lens than the focal position farthest away from the projector lens in focal positions to lights that pass through the lower end portion and have a wavelength of 450 nm to 700 nm.

6. The vehicular lamp according to claim 1, wherein the end portion is a lower end portion, the correlated color temperature of the light source ranges from 3200 K to 6500 K, an expression of $0.28<f_D/f/Abbe<0.36$ holds, and the position of the shade on the optical axis is kept farther away from the projector lens than the focal position farthest away from the projector lens in focal positions to lights that pass through the lower end portion and have a wavelength of 450 nm to 700 nm.

7. The vehicular lamp according to claim 1, wherein the end portion is a lower end portion, the correlated color temperature of the light source is higher than 6500 K, an expression of $f_D/f/Abbe<0.29$ holds, and the position of the shade on the optical axis is kept farther away from the projector lens than the focal position farthest away from the projector lens in focal positions to 1 lights that pass through the lower end portion and have a wavelength of 450 nm to 700 nm.

8. A vehicular lamp comprising a light source having a substantial surface shape and a projector lens,
wherein light emitted from the light source is transmitted through the projector lens, and an object ahead a vehicle is irradiated with the light,
a diffraction grating is provided in a region including an end portion of a light passing region of at least one surface in the projector lens in order to reduce color separation, and
magnitude of $f_D/f/Abbe$ and a position of a surface of the light source on an optical axis are determined according to a correlated color temperature of the light source so as to reduce the color separation caused by a characteristic of the light source, where f is a focal distance of the projector lens, the focal distance of the projector lens being determined by a marginal ray passing through the end portion, $f_D$ is a focal distance caused by a grating pitch of a diffraction surface, the focal distance caused by the grating pitch being determined by the marginal ray passing through the end portion, and Abbe is an Abbe number.

9. The vehicular lamp according to claim 8, wherein the end portion is an upper end portion, the correlated color temperature of the light source is lower than 3200 K, an expression of $f_D/f/Abbe<0.29$ holds, and the position of the surface of the light source on the optical axis is brought closer to the projector lens than the focal position closest to the projector lens in focal positions to lights that pass through the upper end portion and have a wavelength of 450 nm to 700 nm.

10. The vehicular lamp according to claim 8, wherein the end portion is an upper end portion, the correlated color temperature of the light source ranges from 3200 K to 6500 K, an expression of $0.28<f_D/f/Abbe<0.36$ holds, and the position of the surface of the light source on the optical axis is brought closer to the projector lens than the focal position closest to the projector lens in focal positions to lights that pass through the upper end portion and have the wavelength of 450 nm to 700 nm.

11. The vehicular lamp according to claim 8, wherein the end portion is an upper end portion, the correlated color temperature of the light source is higher than 6500 K, and an expression of $0.33<f_D/f/Abbe$, and the position of the surface of the light source on the optical axis is brought closer to the projector lens than the focal position closest to the projector lens in focal positions to lights that pass through the upper end portion and have a wavelength of 450 nm to 700 nm.

12. The vehicular lamp according to claim 8, wherein the end portion is a lower end portion, the correlated color temperature of the light source is lower than 3200 K, an expression of $0.34<f_D/f/Abbe$, and the position of the surface of the light source on the optical axis is kept farther away from the projector lens than the focal position farthest away from the projector lens in focal positions to lights that pass through the lower end portion and have a wavelength of 450 nm to 700 nm.

13. The vehicular lamp according to claim 8, wherein the end portion is a lower end portion, the correlated color temperature of the light source ranges from 3200 K to 6500 K, an expression of $0.28<f_D/f/Abbe<0.36$ holds, and the position of the surface of the light source on the optical axis is kept farther away from the projector lens than the focal position farthest away from the projector lens in focal positions to lights that pass through the lower end portion and have a wavelength of 450 nm to 700 nm.

14. The vehicular lamp according to claim 8, wherein the end portion is a lower end portion, the correlated color temperature of the light source is higher than 6500 K, an expression of $f_D/f/Abbe<0.29$ holds, and the position of the surface of the light source on the optical axis is kept farther away from the projector lens than the focal position farthest away from the projector lens in focal positions to lights that pass through the lower end portion and have a wavelength of 450 nm to 700 nm.

15. The vehicular lamp according to claim 1, wherein $Y_0$ is set to a non-negative constant that is smaller than an effective radius of the projector lens and the diffraction grating is provided in a region of $Y \geq Y_0$ of a surface in which the diffraction grating of the projector lens is provided in a coordinate system, in which the optical axis of the projector lens is set to a Z-axis and a horizontal direction and a vertical direction are set to an X-axis and a Y-axis.

16. The vehicular lamp according to claim 1, wherein $Y_0$ is set to a non-negative constant that is smaller than an effective radius of the projector lens and the diffraction grating is provided in a region of $Y \leqq -Y_0$ of a surface in which the diffraction grating of the projector lens is provided in a coordinate system, in which the optical axis of the projector lens is set to a Z-axis and a horizontal direction and a vertical direction are set to an X-axis and a Y-axis.

17. The vehicular lamp according to claim 1, wherein the projector lens is a Fresnel lens and the diffraction grating is provided on the Fresnel lens.

18. The vehicular lamp according to claim 1, wherein the projector lens is a cylindrical lens and the diffraction grating is provided in the cylindrical lens.

19. The vehicular lamp according to claim 1, wherein the light source is an LED.

20. A vehicle comprising the vehicular lamp according to claim 1.

* * * * *